US010685223B2

(12) United States Patent
Nepomniachtchi et al.

(10) Patent No.: US 10,685,223 B2
(45) Date of Patent: Jun. 16, 2020

(54) SYSTEMS AND METHODS FOR MOBILE IMAGE CAPTURE AND CONTENT PROCESSING OF DRIVER'S LICENSES

(71) Applicant: MITEK SYSTEMS, INC., San Diego, CA (US)

(72) Inventors: Grigori Nepomniachtchi, San Diego, CA (US); Mike Strange, San Diego, CA (US)

(73) Assignee: Mitek Systems, Inc., San Diego, CA (US)

( * ) Notice: Subject to any disclaimer, the term of this patent is extended or adjusted under 35 U.S.C. 154(b) by 0 days.

(21) Appl. No.: 16/422,713

(22) Filed: May 24, 2019

(65) Prior Publication Data

US 2019/0278986 A1  Sep. 12, 2019

Related U.S. Application Data

(63) Continuation of application No. 15/888,484, filed on Feb. 5, 2018, now Pat. No. 10,303,937, which is a (Continued)

(51) Int. Cl.
*G06K 9/62* (2006.01)
*G06K 9/00* (2006.01)
(Continued)

(52) U.S. Cl.
CPC ....... *G06K 9/00442* (2013.01); *G06K 9/3275* (2013.01); *G06K 9/38* (2013.01);
(Continued)

(58) Field of Classification Search
CPC .. G07C 9/00; H04N 1/00708; H04N 1/00718; H04N 1/00734; G06Q 20/3276; G06T 7/10–194; G06K 9/00442–00483
See application file for complete search history.

(56) References Cited

U.S. PATENT DOCUMENTS 5,600,732 A   2/1997 Ott et al.
5,751,841 A   5/1998 Leong et al.
(Continued)

FOREIGN PATENT DOCUMENTS

KR   20040076131 A   8/2004
KR   2011/056593 A   12/2007
(Continued)

OTHER PUBLICATIONS

International Search Report issued in related International Application No. PCT/US2011/056593 dated May 30, 2012 (3 pages).

*Primary Examiner* — Sean T Motsinger
(74) *Attorney, Agent, or Firm* — Procopio, Cory, Hargreaves & Savitch LLP; Jonathan D. Cheng

(57) ABSTRACT

Systems and methods are provided for processing and extracting content from an image captured using a mobile device. In one embodiment, an image is captured by a mobile device and corrected to improve the quality of the image. The corrected image is then further processed by adjusting the image, identifying the format and layout of the document, binarizing the image and extracting the content using optical character recognition (OCR). Multiple methods of image adjusting may be implemented to accurately assess features of the document, and a secondary layout identification process may be performed to ensure that the content being extracted is properly classified.

6 Claims, 51 Drawing Sheets

Related U.S. Application Data continuation of application No. 15/652,126, filed on Jul. 17, 2017, now Pat. No. 9,886,628, which is a continuation of application No. 15/083,177, filed on Mar. 28, 2016, now Pat. No. 9,710,702, which is a continuation of application No. 13/844,476, filed on Mar. 15, 2013, now Pat. No. 9,298,979, which is a continuation-in-part of application No. 12/906,036, filed on Oct. 15, 2010, now Pat. No. 8,577,118, which is a continuation-in-part of application No. 12/778,943, filed on May 12, 2010, now Pat. No. 8,582,862, which is a continuation-in-part of application No. 12/346,026, filed on Dec. 30, 2008, now Pat. No. 7,978,900.

(60) Provisional application No. 61/022,279, filed on Jan. 18, 2008.

(51) Int. Cl.
| | |
|---|---|
| *G07C 9/00* | (2020.01) |
| *H04N 1/00* | (2006.01) |
| *G06Q 20/32* | (2012.01) |
| *G06K 9/32* | (2006.01) |
| *G06K 9/38* | (2006.01) |
| *G06K 9/42* | (2006.01) |
| *H04N 101/00* | (2006.01) |

(52) U.S. Cl.
CPC ........... *G06K 9/42* (2013.01); *G06Q 20/3276* (2013.01); *G07C 9/00* (2013.01); *H04N 1/00708* (2013.01); *H04N 1/00718* (2013.01); *H04N 1/00734* (2013.01); *G06K 2209/01* (2013.01); *G07C 2209/41* (2013.01); *H04N 1/00244* (2013.01); *H04N 1/00307* (2013.01); *H04N 2101/00* (2013.01); *H04N 2201/001* (2013.01); *H04N 2201/0084* (2013.01)

(56) References Cited

U.S. PATENT DOCUMENTS

| | | | |
|---|---|---|---|
| 5,761,686 A | 6/1998 | Bloomberg | |
| 6,038,553 A | 3/2000 | Hyde, Jr. | |
| 6,345,130 B1 | 2/2002 | Dahl | |
| 6,621,919 B2 | 9/2003 | Mennie et al. | |
| 6,735,341 B1 | 5/2004 | Horie et al. | |
| 6,807,294 B2 | 10/2004 | Yamazaki | |
| 6,947,610 B2 | 9/2005 | Sun | |
| 6,985,631 B2 | 1/2006 | Zhang | |
| 7,133,558 B1* | 11/2006 | Ohara | G06K 9/00449 |
| | | | 382/199 |
| 7,283,656 B2 | 10/2007 | Blake et al. | |
| 7,301,564 B2 | 11/2007 | Fan | |
| 7,331,523 B2 | 2/2008 | Meier et al. | |
| 7,376,258 B2 | 5/2008 | Klein et al. | |
| 7,377,425 B1 | 5/2008 | Ma et al. | |
| 7,426,316 B2 | 9/2008 | Vehvilainen et al. | |
| 7,433,098 B2 | 10/2008 | Klein et al. | |
| 7,548,641 B2 | 6/2009 | Gilson et al. | |
| 7,558,418 B2 | 7/2009 | Verma et al. | |
| 7,584,128 B2 | 9/2009 | Mason et al. | |
| 7,593,595 B2 | 9/2009 | Heaney, Jr. et al. | |
| 7,606,741 B2 | 10/2009 | King et al. | |
| 7,735,721 B1 | 6/2010 | Ma et al. | |
| 7,778,457 B2 | 8/2010 | Nepomniachtchi et al. | |
| 7,793,831 B2 | 9/2010 | Beskitt | |
| 7,869,098 B2 | 1/2011 | Corso et al. | |
| 7,949,176 B2 | 5/2011 | Nepomniachtchi | |
| 7,950,698 B2 | 5/2011 | Popadic et al. | |
| 7,953,268 B2 | 5/2011 | Nepomniachtchi | |
| 7,978,900 B2 | 7/2011 | Nepomniachtchi et al. | |
| 8,000,514 B2 | 8/2011 | Nepomniachtchi et al. | |
| 8,023,155 B2 | 9/2011 | Jiang | |
| 8,126,252 B2 | 2/2012 | Abernethy et al. | |
| 8,300,917 B2 | 10/2012 | Borgia et al. | |
| 8,326,015 B2 | 12/2012 | Nepomniachtchi | |
| 8,340,452 B2 | 12/2012 | Marchesotti | |
| 8,379,914 B2 | 2/2013 | Nepomniachtchi et al. | |
| 8,837,833 B1* | 9/2014 | Wang | G06K 9/3283 |
| | | | 382/182 |
| 9,710,702 B2* | 7/2017 | Nepomniachtchi | |
| | | | G06K 9/00442 |
| 2001/0019334 A1* | 9/2001 | Carrai | G06T 3/403 |
| | | | 345/670 |
| 2002/0012462 A1 | 1/2002 | Fujiwara | |
| 2002/0037097 A1* | 3/2002 | Hoyos | G06K 9/00449 |
| | | | 382/137 |
| 2002/0041717 A1 | 4/2002 | Murata et al. | |
| 2002/0044689 A1 | 4/2002 | Roustaei et al. | |
| 2002/0067846 A1 | 6/2002 | Foley | |
| 2002/0150279 A1 | 10/2002 | Scott et al. | |
| 2003/0009420 A1 | 1/2003 | Jones | |
| 2003/0086615 A1 | 5/2003 | Dance et al. | |
| 2003/0156201 A1 | 8/2003 | Zhang | |
| 2004/0012679 A1 | 1/2004 | Fan | |
| 2004/0017947 A1 | 1/2004 | Yang | |
| 2004/0205474 A1 | 10/2004 | Eskin et al. | |
| 2004/0213434 A1 | 10/2004 | Emerson et al. | |
| 2004/0218799 A1 | 11/2004 | Mastie et al. | |
| 2005/0071283 A1* | 3/2005 | Randle | G06Q 20/04 |
| | | | 705/75 |
| 2005/0097046 A1 | 5/2005 | Singfield | |
| 2005/0100216 A1 | 5/2005 | Myers et al. | |
| 2005/0143136 A1 | 6/2005 | Lev et al. | |
| 2005/0180661 A1 | 8/2005 | El Bernoussi et al. | |
| 2005/0196069 A1* | 9/2005 | Yonaha | H04N 1/3871 |
| | | | 382/282 |
| 2005/0213805 A1 | 9/2005 | Blake et al. | |
| 2005/0242186 A1 | 11/2005 | Ohbuchi | |
| 2005/0261990 A1 | 11/2005 | Gocht et al. | |
| 2006/0039629 A1* | 2/2006 | Li | H04N 1/00681 |
| | | | 1/681 |
| 2006/0045322 A1 | 3/2006 | Clarke et al. | |
| 2006/0045344 A1 | 3/2006 | Paxton et al. | |
| 2006/0045379 A1 | 3/2006 | Heaney et al. | |
| 2006/0072822 A1 | 4/2006 | Hatzav et al. | |
| 2006/0140504 A1 | 6/2006 | Fujimoto et al. | |
| 2006/0164682 A1 | 7/2006 | Lev | |
| 2006/0182331 A1 | 8/2006 | Gilson et al. | |
| 2006/0210192 A1 | 9/2006 | Orhun | |
| 2006/0221415 A1 | 10/2006 | Kawamoto | |
| 2006/0280354 A1 | 12/2006 | Murray | |
| 2006/0291727 A1 | 12/2006 | Bargeron | |
| 2007/0009155 A1 | 1/2007 | Potts et al. | |
| 2007/0053574 A1 | 3/2007 | Verma et al. | |
| 2007/0058851 A1 | 3/2007 | Quine et al. | |
| 2007/0071324 A1* | 3/2007 | Thakur | G06K 9/3275 |
| | | | 382/199 |
| 2007/0084911 A1 | 4/2007 | Crowell | |
| 2007/0156438 A1 | 7/2007 | Popadic et al. | |
| 2007/0171288 A1 | 7/2007 | Inoue et al. | |
| 2007/0206877 A1 | 9/2007 | Wu et al. | |
| 2007/0297664 A1 | 12/2007 | Blaikie | |
| 2008/0062437 A1 | 3/2008 | Rizzo | |
| 2008/0089573 A1 | 4/2008 | Mori et al. | |
| 2008/0183576 A1 | 7/2008 | Kim et al. | |
| 2008/0247629 A1 | 10/2008 | Gilder et al. | |
| 2008/0267510 A1 | 10/2008 | Paul et al. | |
| 2009/0063431 A1 | 3/2009 | Erol et al. | |
| 2009/0092322 A1 | 4/2009 | Erol et al. | |
| 2009/0141962 A1 | 6/2009 | Borgia et al. | |
| 2009/0185241 A1 | 7/2009 | Nepomniachtchi | |
| 2009/0185736 A1 | 7/2009 | Nepomniachtchi | |
| 2009/0185737 A1 | 7/2009 | Nepomniachtchi | |
| 2009/0185738 A1 | 7/2009 | Nepomniachtchi | |
| 2009/0185752 A1* | 7/2009 | Dwivedula | G06K 9/3233 |
| | | | 382/256 |
| 2009/0190830 A1* | 7/2009 | Hasegawa | G06K 9/00456 |
| | | | 382/165 |
| 2009/0198493 A1 | 8/2009 | Hakkani-Tur et al. | |

(56) References Cited

U.S. PATENT DOCUMENTS

| | | |
|---|---|---|
| 2009/0261158 A1 | 10/2009 | Lawson |
| 2010/0073735 A1 | 3/2010 | Hunt et al. |
| 2010/0074547 A1 | 3/2010 | Yu et al. |
| 2010/0080471 A1 | 4/2010 | Haas et al. |
| 2010/0104171 A1 | 4/2010 | Faulkner et al. |
| 2010/0150424 A1 | 6/2010 | Nepomniachtchi et al. |
| 2010/0239160 A1* | 9/2010 | Enomoto ............ G06F 17/2205 382/165 |
| 2010/0246972 A1* | 9/2010 | Koyama .............. G06K 9/3283 382/199 |
| 2010/0284611 A1* | 11/2010 | Lee ...................... G06K 9/3258 382/165 |
| 2011/0052065 A1 | 3/2011 | Nepomniachtchi et al. |
| 2011/0091092 A1 | 4/2011 | Nepomniachtchi et al. |
| 2011/0194750 A1 | 8/2011 | Nepomniachtchi |
| 2011/0280450 A1 | 11/2011 | Nepomniachtchi et al. |
| 2012/0010885 A1 | 1/2012 | Hakkani-Tur et al. |
| 2012/0033892 A1 | 2/2012 | Blenkhorn et al. |
| 2012/0113489 A1 | 5/2012 | Heit et al. |
| 2012/0150773 A1 | 6/2012 | DiCorpo et al. |
| 2012/0197640 A1 | 8/2012 | Hakkani-Tur et al. |
| 2012/0226600 A1* | 9/2012 | Dolev ................. G06K 9/6203 705/38 |
| 2012/0278336 A1 | 11/2012 | Malik et al. |
| 2013/0004076 A1* | 1/2013 | Koo ....................... G06K 9/228 382/176 |
| 2013/0022231 A1* | 1/2013 | Nepomniachtchi .. G06Q 20/042 382/102 |
| 2013/0051610 A1 | 2/2013 | Roach et al. |
| 2013/0058531 A1 | 3/2013 | Hedley et al. |
| 2013/0085935 A1* | 4/2013 | Nepomniachtchi .. G06Q 20/322 705/40 |
| 2013/0120595 A1* | 5/2013 | Roach ................... H04N 5/225 348/207.1 |
| 2013/0155474 A1* | 6/2013 | Roach ................. G06Q 20/322 358/505 |
| 2013/0182002 A1* | 7/2013 | Macciola ........... G06K 9/00463 345/589 |
| 2013/0182951 A1* | 7/2013 | Shustorovich ....... H04N 1/3878 382/167 |
| 2013/0182973 A1* | 7/2013 | Macciola ........... H04N 1/00403 382/293 |
| 2013/0202185 A1* | 8/2013 | Irwin, Jr. ................. G06K 9/18 382/137 |
| 2013/0204777 A1* | 8/2013 | Irwin, Jr. ................. G06K 9/18 705/39 |
| 2014/0032406 A1* | 1/2014 | Roach ................. G06Q 20/042 705/42 |
| 2014/0044303 A1* | 2/2014 | Chakraborti .......... G06T 7/0002 382/100 |
| 2014/0108456 A1* | 4/2014 | Ramachandrula .... G06F 16/583 707/779 |
| 2014/0126790 A1 | 5/2014 | Duchesne et al. |
| 2014/0133767 A1 | 5/2014 | Lund et al. |
| 2014/0270540 A1* | 9/2014 | Spector ..................... G06T 7/60 382/199 |
| 2015/0040001 A1* | 2/2015 | Kannan ................ G06F 17/248 715/243 |
| 2017/0316263 A1* | 11/2017 | Nepomniachtchi ......................... G06K 9/00442 |

FOREIGN PATENT DOCUMENTS

| | | |
|---|---|---|
| WO | 2006075967 A1 | 7/2006 |
| WO | 2006136958 A2 | 12/2006 |

* cited by examiner

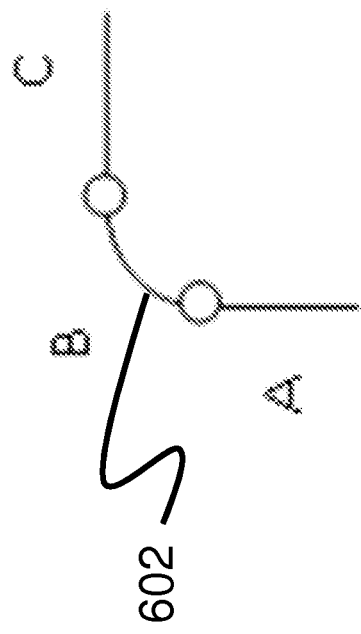
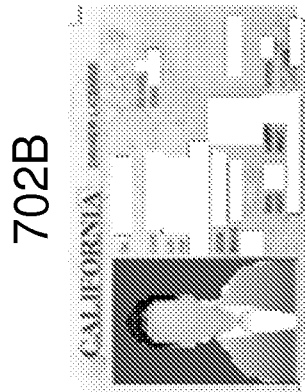
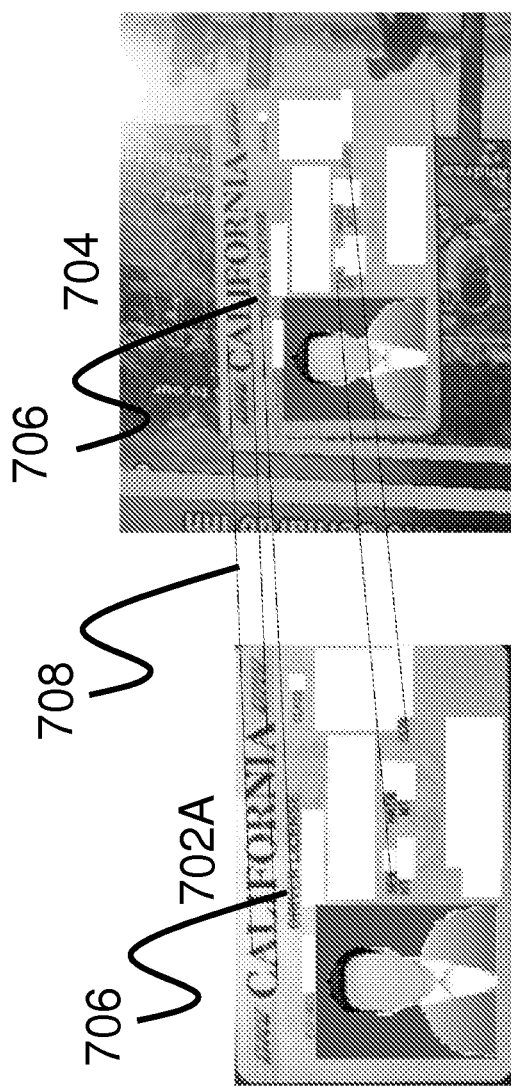
FIG. 6
FIG. 7A
FIG. 7B
FIG. 7C

Image Correction Module

Detect Document in Image

Convert original color image into smaller color image (color "icon" image)

The check in this image is intentionally depicted in landscape orientation.

Check Processing

This figure is intentionally blurry.

This figure is intentionally blurry.

This figure is intentionally blurry.

Test Document Contrast

This figure is intentionally blurry.

Test Document Skew

Cut-Off Corner Test

Cut-Off Corner Test

This figure is intentionally blurry.

Image Size Test

Code line Test

Aspect Ratio Test
For Two-Side Documents

Form Identification
and Data Extraction

Dynamic Data Capture

SYSTEMS AND METHODS FOR MOBILE IMAGE CAPTURE AND CONTENT PROCESSING OF DRIVER'S LICENSES

RELATED APPLICATIONS INFORMATION

This application is a continuation of U.S. patent application Ser. No. 15/888,484, filed on Feb. 5, 2018, which is a continuation of U.S. patent application Ser. No. 15/652,126, filed on Jul. 17, 2017, now U.S. Pat. No. 9,886,628, which is a continuation of U.S. patent application Ser. No. 15/083,177, filed on Mar. 28, 2016, now U.S. Pat. No. 9,710,702; which is a continuation of U.S. patent application Ser. No. 13/844,476, filed on Mar. 15, 2013, now U.S. Pat. No. 9,298,979; which is a continuation in part of U.S. patent application Ser. No. 12/906,036, filed on Oct. 15, 2010, now U.S. Pat. No. 8,577,118; which in turn claims priority as a continuation-in-part of U.S. patent application Ser. No. 12/778,943, filed on filed May 12, 2010, now U.S. Pat. No. 8,582,862; as well as a continuation in part of U.S. patent application Ser. No. 12/346,026 filed on Dec. 30, 2008, now U.S. Pat. No. 7,978,900, which in turn claims the benefit of U.S. Provisional Application No. 61/022,279, filed Jan. 18, 2008, all of which are incorporated herein by reference in their entirety as if set forth in full. This application is also related to U.S. patent application Ser. No. 12/717,080 filed Mar. 3, 2010, which is now U.S. Pat. No. 7,778,457, which is incorporated herein by reference in its entirety as if set forth in full.

BACKGROUND

1. Technical Field

The embodiments described herein generally relate to automated processing of images captured by a mobile device, and more particularly to processing mobile images of driver's licenses and extracting content therefrom.

2. Related Art

A driver's license (DL) or government-issued identification card is ubiquitous in modern society. The DL is the most widely used form of personal identification and finds most of its uses outside of its original purpose as a license to operate an automobile. The popularity of the DL as an identification card is largely due to the security of the card and the measures taken by the issuing entity to prevent it from being duplicated or faked. A typical DL has a multitude of protections built into the design, layout, material, font and shape of the card which make it difficult to replicate. These security measures become ever more complicated.

A large reason for the popularity of the DL is the information that it contains. A DL usually contains at least the owner's name, picture, address, date of birth, and a license number, with some DLs also containing a phone number, signature and physical description of the owner (eye and hair color, weight, height). This information is invaluable when the identity of the owner needs to be verified.

Verifying a person's identity with the DL is easy to accomplish when the person is physically present, as the DL information can be compared with the actual person to match their physical description and picture, or when verifying whether a method of payment (such as a credit card or check) is authentic. However, when completing an electronic payment transaction, the DL is much less useful, as there are no methods for a vendor accepting an electronic payment to use the DL to verify the identity of the payor. Other circumstances exist where a person may want to use their DL, such as submitting an online application for car insurance, a bank account or a credit card.

Therefore, there is a need for obtaining information from a driver's license for use in an electronic transaction.

SUMMARY

Systems and methods are provided for capturing an image of a driver's license using a mobile device and processing the image to extract content. In one embodiment, an image of a driver's license (DL) is captured by a mobile device and corrected to improve the quality of the image. The corrected image is then further processed by cropping the image, identifying the format and layout of the DL, binarizing the image and then extracting the content using optical character recognition (OCR). Multiple methods of cropping may be implemented to correctly crop the image of the DL, and a secondary layout identification step may be performed to ensure that the content being extracted is properly classified.

In one embodiment, a method of processing an image of a driver's license captured by a mobile device comprises: receiving a first image of a driver's license captured by a mobile device; identifying the driver's license within the image to produce a cropped image; determining a format of the identified driver's license; identifying a layout of the identified driver's license; binarizing the cropped image to produce a binarized image; and outputting the binarized image of the driver's license.

In another embodiment, a system of processing an image of a driver's license captured by a mobile device comprises: a receiving unit which receives a first image of a driver's license captured by a mobile device; a cropping unit which identifies the driver's license within the image and produces a cropped image; a format determination unit which determines a format of the identified driver's license; a layout identification unit which identifies a layout of the identified driver's license; a binarization unit which binarizes the cropped image to produce a binarized image; and an output unit which outputs the binarized image of the driver's license.

Other features and advantages of the present invention should become apparent from the following description of the preferred embodiments, taken in conjunction with the accompanying drawings, which illustrate, by way of example, the principles of the invention.

BRIEF DESCRIPTION OF THE DRAWINGS

The various embodiments provided herein are described in detail with reference to the following figures. The drawings are provided for purposes of illustration only and merely depict typical or example embodiments. These drawings are provided to facilitate the reader's understanding of the invention and shall not be considered limiting of the breadth, scope, or applicability of the embodiments. It should be noted that for clarity and ease of illustration these drawings are not necessarily made to scale.

FIG. 6 illustrates a shape of a detected contour of a rounded corner on a DL which is identified during a contour tracing step, according to one embodiment of the invention.

FIGS. 7A-7C illustrate a method of template matching using multiple template layouts, according to an embodiment.

DETAILED DESCRIPTION

The embodiments described herein are directed to image processing and content extraction of an image of a driver's license captured using a mobile device. When an image of a driver's license (DL) is captured using the mobile device, one or more image correction steps are performed to improve the quality of the image and ensure that the content of the DL can be extracted. The image is then further processed by cropping the image, identifying the format and layout of the DL, binarizing the image and then extracting the content using optical character recognition (OCR). Multiple methods of cropping may be implemented to correctly crop the image of the DL, and a secondary layout identification step may be performed to ensure that the content being extracted is properly classified.

The methods described herein provide for accurate, extraction of important content from an image of a DL captured by a mobile device. Applications for enrollment, electronic payments, identity verification, car insurance applications or others which rely on information from a person's DL will achieve better accuracy in capturing needed content and provide a better user experience for users by allowing the user to simply take a picture of the DL in order to provide the content from the DL to a third party. While some descriptions below will refer to image processing of remittance coupons or other types of documents, the principles are equally applicable to driver's licenses.

I. Driver's License Processing System

Figure 1:
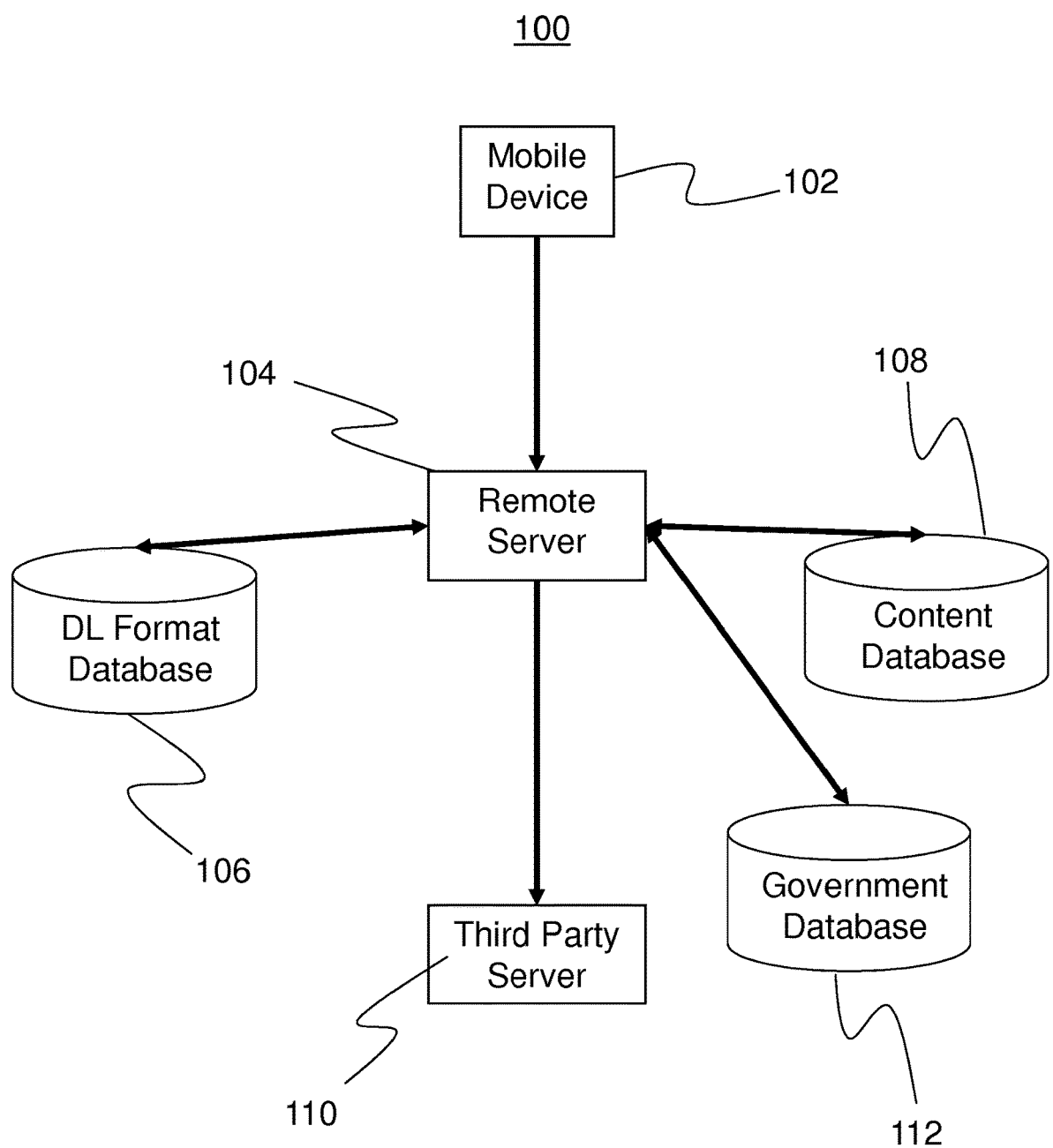
FIG. 1 is a block diagram which illustrates one embodiment of a system for mobile image capture and processing of a driver's license (DL), according to one embodiment of the invention.

FIG. 1 illustrates one embodiment of a system 100 for capturing an image of a driver's license (DL) with a mobile device and processing the image to extract content. The system 100 includes a mobile device 102, such as a cellular phone, smartphone, tablet, personal digital assistant (PDA) or other portable electronic device that may be connected with a communications network. The mobile device 102 will include an image capture device (not shown), such as a digital camera or a portable scanning device, that uses an image sensor to capture an image of a document. The mobile device 102 is connected with a remote server 104 over the communications network so that the mobile device 102 can transmit captured images or extracted data to the remote server 104. In one embodiment, the remote server 104 may send information to the mobile device 102 (and specifically an application running on the mobile device) regarding the parameters that should be measured and the values of the thresholds required to capture an image of a DL. The mobile device 102 or the remote server 104 may perform image processing and data extraction steps, as will be described in further detail below, in order to improve the image quality and identify content from the driver's license.

In one embodiment, the remote server 104 may be connected with a DL format database 106 which stores format information on known types of DLs used to identify a DL in a captured image, as will be described in further detail below. Once the mobile device 102 or remote server 104 has extracted and identified all of the relevant data from the image of the DL, the extracted data and the captured and processed images may be stored in a content database 108 connected with the mobile device 102 or remote server 104. The extracted data may then be transmitted to a third party server 110 which will use the content from the DL for any one of many different applications.

The mobile device 102 may comprise a mobile telephone handset, tablet, smartphone, Personal Digital Assistant, or other mobile communication device. The mobile device may include an image capture device that is integrated with the mobile device, such as a camera, or might include functionality that allows it to connect with an external camera or other imaging device, such as a scanner. The connection with an external camera or other imaging device can comprise a wired or wireless connection. In this way, the mobile device can connect to an external camera or other imaging device and receive images from the camera or other imaging device.

Images of the documents taken using the mobile device or downloaded to the mobile device can be transmitted to the remote server via a network. The network can comprise one or more wireless and/or wired network connections. For example, in some cases, the images can be transmitted over a mobile communication device network, such as a code division multiple access ("CDMA") telephone network, or other mobile telephone network. The network can also comprise one or more connections across the Internet. Images taken using, for example, the mobile device's camera can be 24 bit per pixel (24 bit/pixel) JPG images. It will be understood, however, that many other types of images might also be taken using different cameras, mobile devices, etc.

Either the mobile device or the remote server may be configured to perform various image processing techniques on images of the DL captured by the mobile device. Either the mobile device or remote server may be configured to perform various image quality assurance tests on images of the DL captured by the mobile device to ensure that the quality of the captured images is sufficient to enable the content in the image to be extracted. Examples of various processing techniques and testing techniques that can be implemented on the mobile device or remote server are described in detail below.

According to one embodiment, the mobile device 102 or the remote server 104 can be configured to communicate to one or more third party servers 110 via the network. The mobile device 104 may be configured to communicate with a third party server 110 through the remote server 104, as illustrated in FIG. 1, or directly with the third party server 110 (not illustrated). The third party server 110 can be configured to utilize content from a DL, for example, by taking the information extracted from the images and matching it with information obtained about the person or submitting the information as verification of the person's identity. In some embodiments, the third party server 110 and the remote server 104 can be implemented on the same server or same set of servers.

In other embodiments, the remote server 104 may interact with a government database 112 which contains stored DL information in order to match extracted content with information in the government database 112 to verify the authenticity of the extracted content.

II. Driver's License Processing Workflow

Figure 2:
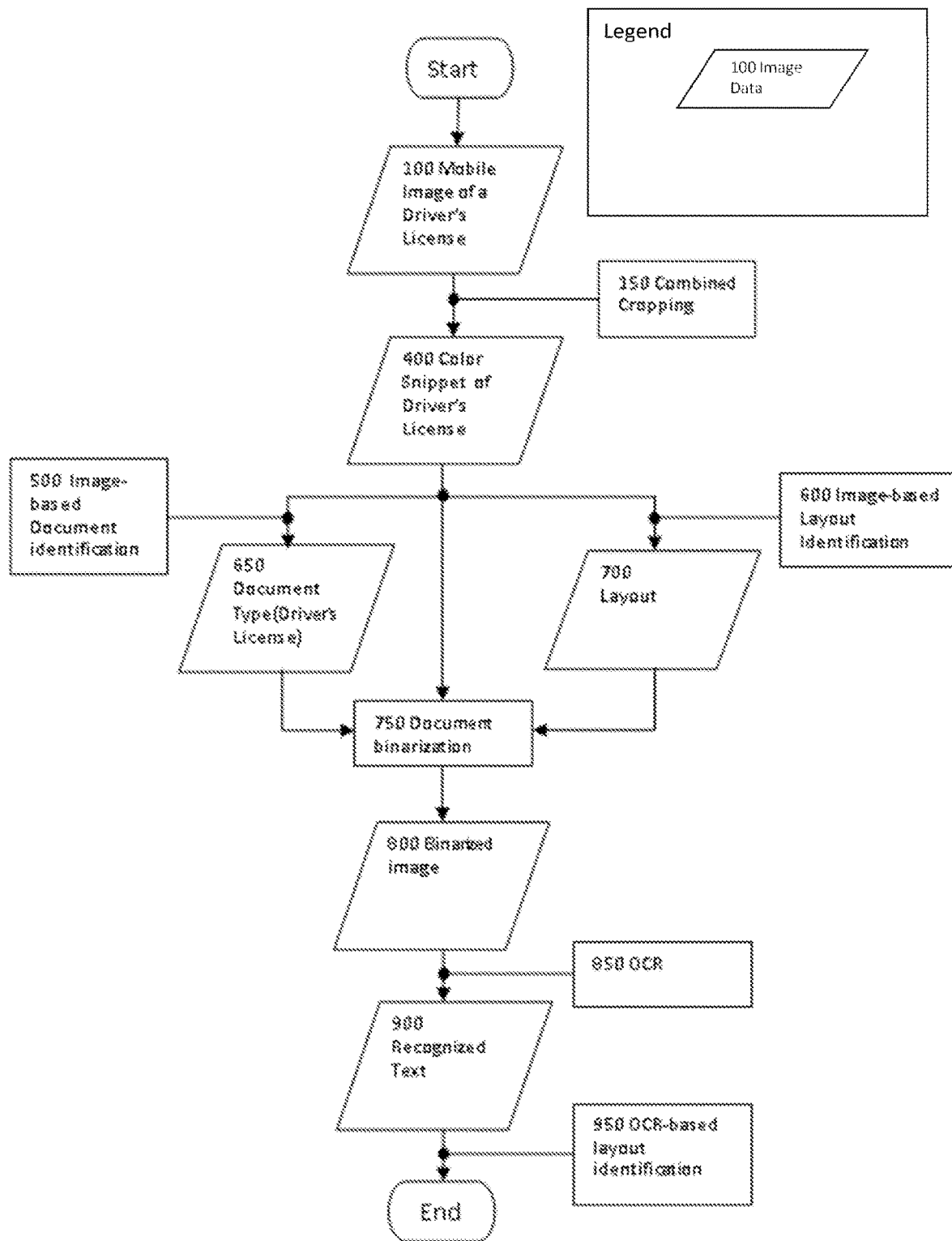
FIG. 2 is a flow chart illustrating one embodiment of a method of capturing and processing an image of a DL, according to one embodiment of the invention.

FIG. 2 illustrates a method submitting an insurance claim using images captured by the mobile device, in accordance with one embodiment of the invention. In a first step S202, an application on the mobile device is launched by the user. The application may be a software application or a combination of software and hardware. As shown in FIG. 3B, the user may be presented with a menu 300 on the mobile device screen with numerous options relating to their insurance policy when launching the application. In step S204, the user selects an option to file a claim for an insurance policy. The user may then be asked to classify the claim in step S206, such as by selecting the type of property that was damaged. In step S208, information about the claim can be gathered by manual user input of information or by detecting information gathered by sensors and other components of the mobile device. More specifically, the claim information may be manually entered through interactive user interfaces on the mobile device, In step S210, the user may use the image capture device on the mobile device to take one or more pictures of one or more documents or objects needed for initiating and submitting the insurance claim. The user may take a picture of an automobile insurance card (AIC), personal identification card such as a driver's license, VIN, vehicle registration card, license plate, police report, repair estimates and invoices, etc. The images will be used to extract information needed for the claim (step S212), such as the names and contact information of the involved parties, the vehicles or other property that were damaged, time and location information of the incident that led to the claim, cost estimates and amounts for repairing the damaged property, etc. The vehicle information may be obtained from several different documents and locations which can be captured by an image capture device on the mobile device, including an insurance card, a vehicle registration card or a vehicle identification number (VIN) on the vehicle itself. If the mobile device captures an image of the insurance card, registration paper or VIN, the image will be processed immediately to extract all relevant vehicle information, preventing the user from having to painstakingly type in the long VIN and other data required during the insurance application process.

Once the information extracted from the captured images and obtained from the user and mobile device is collected, the application on the mobile device determines whether all of the needed information has been obtained and whether the claim is ready to be submitted in step S214. This step may also involve displaying all of the information to the user to verify everything about the claim before it is submitted. In step S216, the completed claim request is transmitted to the insurance server 112 for processing by an insurance company, which will then process the claim. In one embodiment, the insurance company may transmit messages to the user at the mobile device to indicate that the claim has been received, verify that the claim information is complete, or indicate that additional information is needed.

The process for initiating and submitting the claim may be completed in a short period of time, or it may be completed in several different phases over a longer period of time. For example, an initial claim submission for a car accident may include information on the drivers involved and their insurance information, while a repair estimate for the damage may be submitted several hours or days later. Similarly, a final invoice for repairs may also be submitted at the end of a claims process. In this situation, the application will keep the claim status "pending" and either hold or suspend the claim until all steps are completed. The user may receive audio or visual alerts or notifications from the application indicating the status of the claim, such as when a claim needs additional information or when the claim has been paid.

III. Image Cropping Combinations

The first stage of driver's license (DL) image processing is image cropping, where an original image captured by the mobile device is cropped on one or more sides to remove extraneous portions of the image that are outside the borders of the DL. Cropping the image to eliminate the extraneous portions means that only the content from the DL will be extracted during the content extraction steps. Also, if the image of the DL needs to be transmitted across the network for processing at the remote server or any other location on the network, cropping will reduce the file size and improve the speed of the entire process.

Figure 3A:
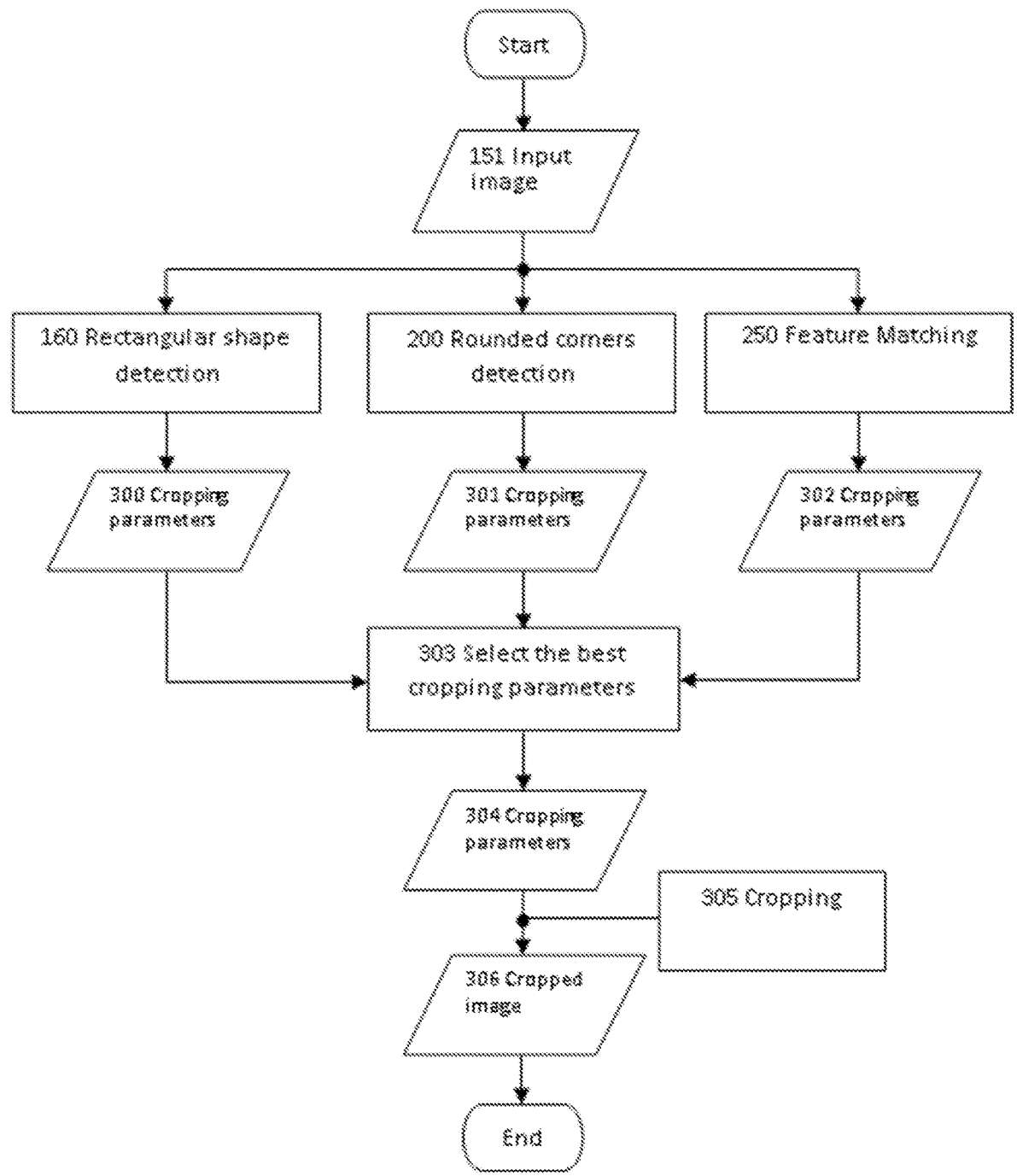
FIG. 3A is a flow chart illustrating a method of cropping the image of the DL, according to one embodiment of the invention.
Figure 3B:
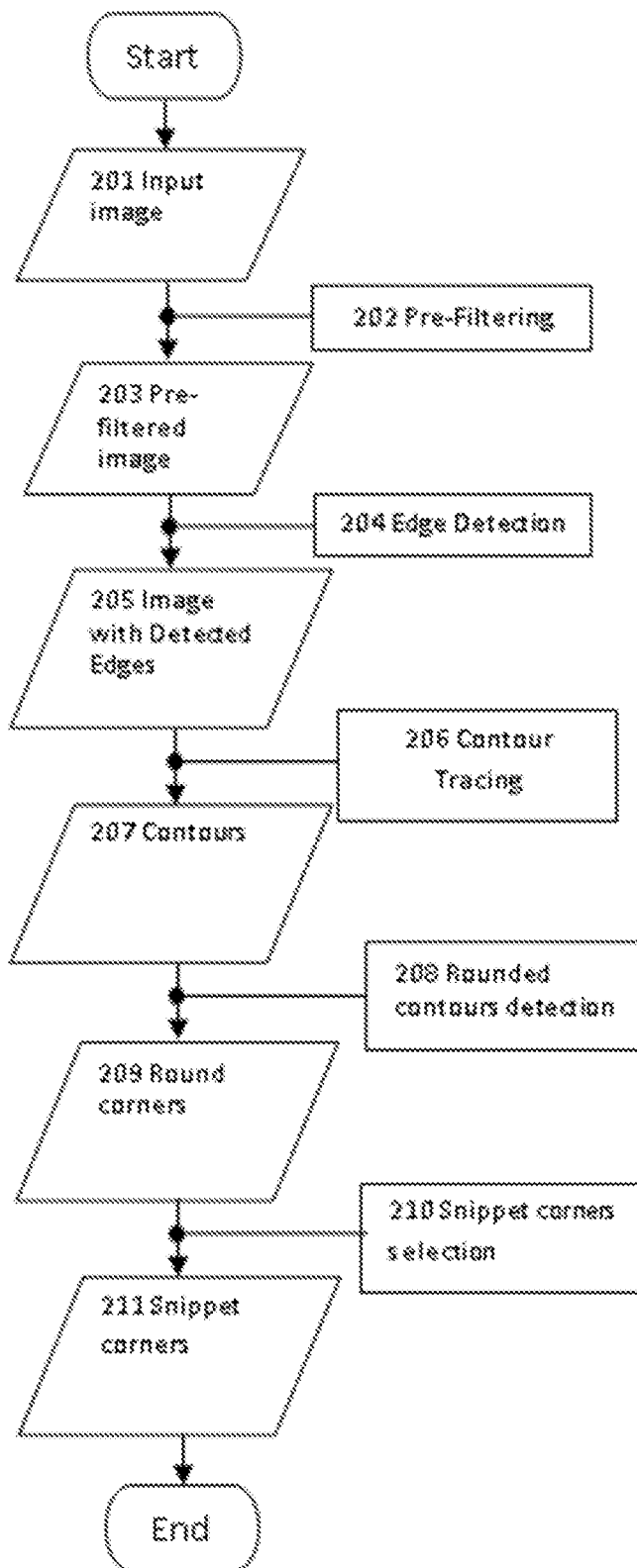
FIG. 3B is a flow chart illustrating a method of cropping an image based on detection of rounded corners of the DL, according to one embodiment.

FIG. 3A illustrates the workflow that is performed when carrying out multiple varying types of image cropping, in accordance with one embodiment of the invention. Three different methods of image cropping may be used, either separately or in combination: rectangular shape detection, rounded corner detection and feature matching. In some embodiments, the quality of cropping depends on how prior information about the DL is used. Cropping based on rectangular shape detection (block 160 on FIG. 3A) is the proper method for a certain class of images of documents, as described in U.S. Pat. No. 7,953,268, entitled "Methods for Mobile Image Capture and Processing of Documents," the content of which is incorporated herein by reference in its entirety. However, in some cases, lines representing edges of the DL can be interrupted by other objects, making it difficult to detect the rectangular shape, even though corners of the DL are still visible. For this situation, cropping based on detection of four rounded corners is used, as illustrated by block 200 in FIG. 3. The workflow of rounded corner detection is presented in FIG. 6.

Even with detecting lines using rectangular shape detection and detecting rounded corners as will be described further below, it is difficult to crop the image with high accuracy in cases when a DL is on a non-distinct background 406 (see FIG. 4C) or on a cluttered background 406 (see FIG. 4D). In these cases, a process of feature matching may be used, which relies on prior knowledge of logos, text or pictures on a DL that can be used for matching across templates and then enhancement of cropping. For example, for a DL, prior knowledge of key words can be used as a template image, as shown by the template image in FIG. 7A. Direct template matching may require a large amount of computational resources, which makes feature matching more preferable.

Each cropping method may use some kind of prior information (rectangular shape, rounded corners, local templates) and works only in the certain limited conditions. To broaden these working conditions, a combined cropping approach of merging these three cropping processes is provided and illustrated in FIG. 3A. All three cropping methods may be used in parallel, as a subset or individually, depending on the document quality. After the multiple cropping methods are applied, the OCR results might have the highest overall data quality (confidence) are used in the final output. The result is an overall increase in quality.

As illustrated in FIG. 3A, a method of combined cropping begins with an input image 151, after which three copies of the image are created and processed separately by rectangular shape detection 160, rounded corner detection 200 and feature matching 250 methodologies. Next, in steps 300, 301 and 302, each of the respective cropping methodologies produces coordinates of their proposed corners. In step 303, the best cropping parameters are selected, for example by combining the results of the three coordinates using prior information about the DL size and aspect ratio. This produces the cropping parameters 304, which are then used to crop the image (step 305) by cutting a snippet from the input image, where borders of the snippet are defined by the coordinates of the four corners of the DL, to produce a cropped image (306)

Figure 4A:
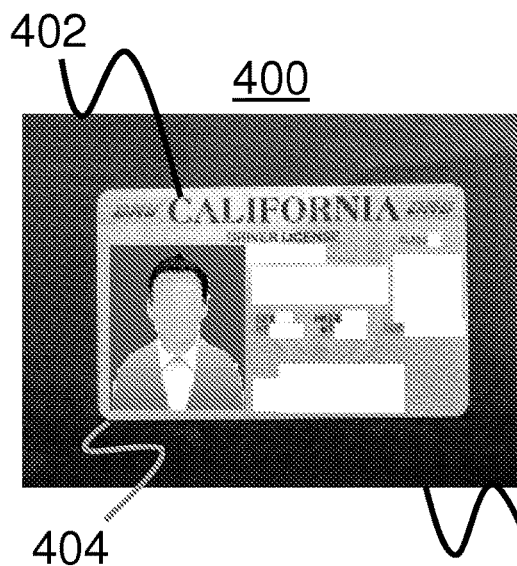
FIG. 4A is an illustration of an image of a DL captured by a mobile device, according to an embodiment.
Figure 4B:
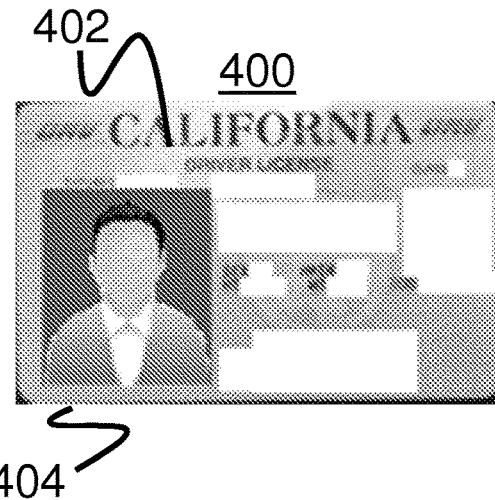
FIG. 4B is an illustration of the image of the DL after it has been cropped, according to an embodiment.
Figure 4C:
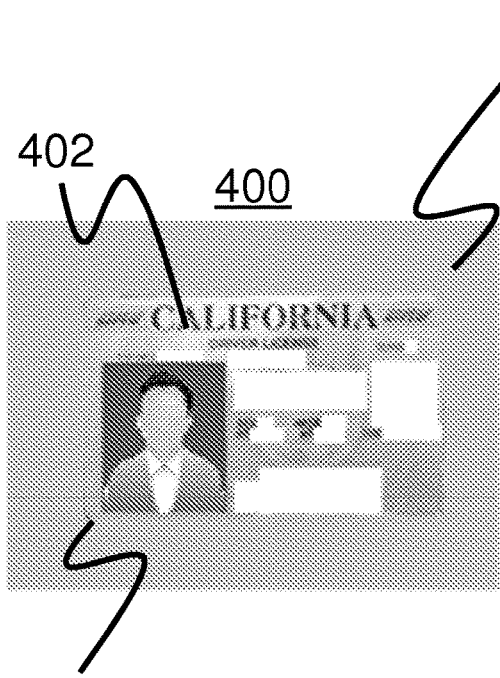
FIG. 4C is an illustration of an image of a DL with a non-distinct background, according to one embodiment.
Figure 4D:
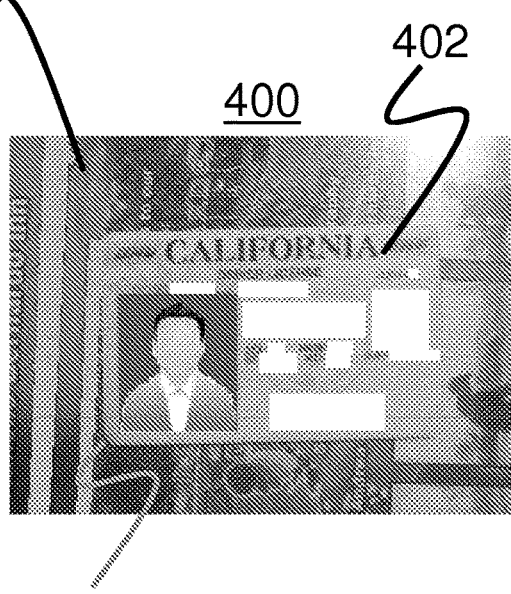
FIG. 4D is an illustration of an image of a DL with a cluttered background, according to one embodiment.

FIG. 4A illustrates an image 400 of a DL 402 captured by a mobile device before the image 400 has been cropped, and FIG. 4B illustrates the image of the DL after the combined cropping methods described herein. The combined cropping has properly identified the boundaries 404 of the DL and removes the background portions 406 of the image surrounding the DL. The size of the image file is also reduced, allowing it to be more quickly transmitted across a network and reducing the time required to extract content from the image during the optical character recognition steps (described below).

Cropping by Rounded Corner Detection

One of the methods of cropping used is a method configured to detect rounded corners. While many printed documents have sharp, right-angled corners, many DLs have rounded corners whose edges may not be identified using the cropping methods and image processing techniques that are sufficient for detecting a right-angle corner. FIG. 3B illustrates one embodiment of a method of cropping an image by detecting rounded corners of a document such as a DL. In step 201, an input image is received and pre-filtered in step 202 using a low-pass filter for noise suppression, while still maintaining wide borders. A median filter or local max filter is able to perform the pre-filtering to create a pre-filtered image (203), which can be color or gray-scale. In step 204, an edge detection process is performed to detect edges on the image, where every pixel of the image is encoded by a number as either an edge pixel ("1") or non-edge pixel ("0"). A contour tracing step (206) is performed to determine connected points [X(i), Y(i)], where i=0 ... N−1, and where N is a number of binarized points on the image 205. Contours are then created (207), after which a rounded corners detector scans connected points [X(i), Y(i)] in a local window (208) and detects contours which have a rounded shape, as illustrated in FIG. 6. A rounded corner 602 is then identified (step 209).

The local area of connected points [X(j), Y(j)], with j= N1 ... N2, is approximated by a spline which consists of three segments illustrated in FIG. 6: "A" is a straight line segment, "B" is a parabola, and "C" is a straight line. A rounded corner is detected if several conditions are true:

1. The estimated curvature "K" (1) of segment B is limited by a range K1 ... K2.
2. The angle between lines A and C falls within a range A1 ... A2.
3. The spline which is defined by segments A, B and C is convex.
4. A standard deviation between data points [X(i), Y(i)] and spline is less than an established threshold.

An estimation of the contour curvature is defined by:

$$K = |X(i)'*Y(i)'' - Y(i)'*X(i)''|/(X(i)'*X(i)' + Y(i)'*Y(i)')^{1.5} \quad (1)$$

where $X(i)'$, $Y(i)'$ are first derivatives of $X(i)$ and $Y(i)$ correspondingly relative to i; $X(i)''$, $Y(i)''$ are second derivatives of $X(i)$ and $Y(i)$ correspondingly relative to I; and first and second derivatives can be estimated using second order Taylor series approximation of the local area $X(j)$, $Y(j)$, with j=N1 ... N2. In step 210, four snippet corners are selected from the identified rounded corners 209 to produce the snippet corners of the DL.

Cropping by Feature Matching

Figure 3C:
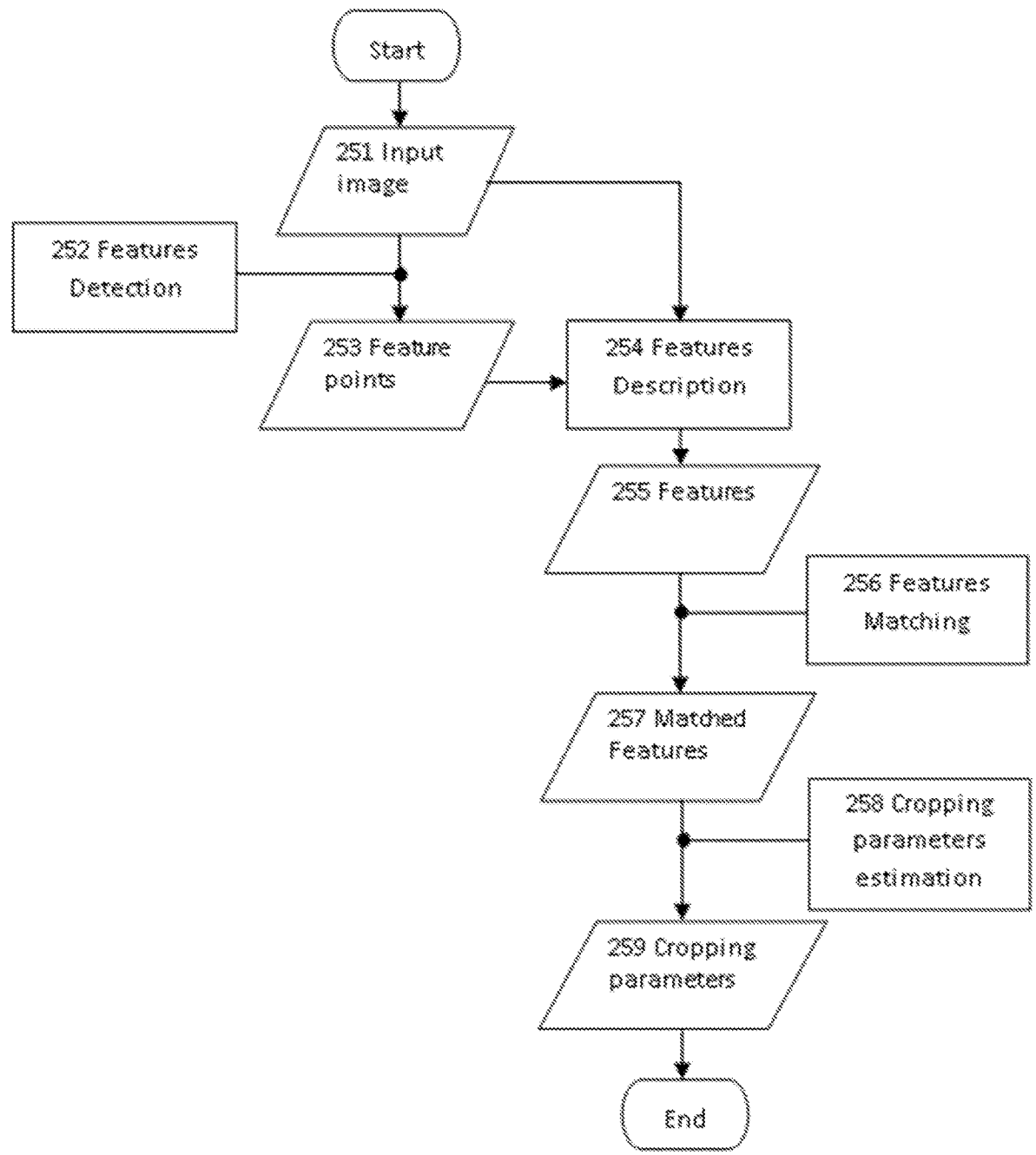
FIG. 3C is a flow chart illustrating a process of cropping the image of the DL using feature matching, according to one embodiment of the invention.

A second method of cropping based on feature matching is illustrated by the flow diagram in FIG. 3C. In step 251, an input image of a DL is received from a mobile device. It should be noted that the input image in either of the three cropping methodologies described herein use the same input image and process the input image separately. Feature detection is then performed (252), which may include a multi-scale Hessian operator and local maxima of Hessian operator output. Feature points are then identified (253) as an array of two-dimensional ("2D") coordinates, where local maxima of multi-scale Hessian outputs were found. Feature descriptions are then built in step 254, where the distributions of local gradients are calculated in the area of feature points. As a rule, the DL can have some distinct colors (such as with red and blue key words), so local color distribution may be added to feature point descriptors for enhancing feature matching performance.

An array of feature descriptions is produced in 255, which includes local gradient and color distributions, after which features matching 256 is performed by finding a correspondence between input image features and pre-calculated features of a template DL. Examples of template DLs are illustrated in FIG. 7A and FIG. 7C, with matched features 706 between a first template image 702A in FIG. 7A an input image 704 in FIG. 7B marked by black lines 708 connecting the matched features between the images. In some instances, DLs within a state have several different layouts, as shown by comparing the first template 702A with a first layout in FIG. 7A and a second template image 702B with a second layout in FIG. 7C. In this case, feature matching should be performed for both layouts, after which the best cropping parameters are selected based on an analysis of the output transformation matrixes, feature matching errors and prior information about document size and aspect ratio. In step

258, cropping parameters are estimated. This estimation includes calculation of a transformation matrix T (which is calculated based on matched feature points) and estimation of four corners of the DL. Once the cropping parameters are determined (259), the four corners of a DL can be identified and the image cropped.

IV. Image-Based Document Identification

After an image of the driver's license (DL) is cropped (step 400 in FIG. 2), an image-based document identification is performed, as previously described in step 500 of FIG. 2. Image-based document identification helps to determine whether the document in the image is a DL.

Image-Based Document Identification

Figure 5A:
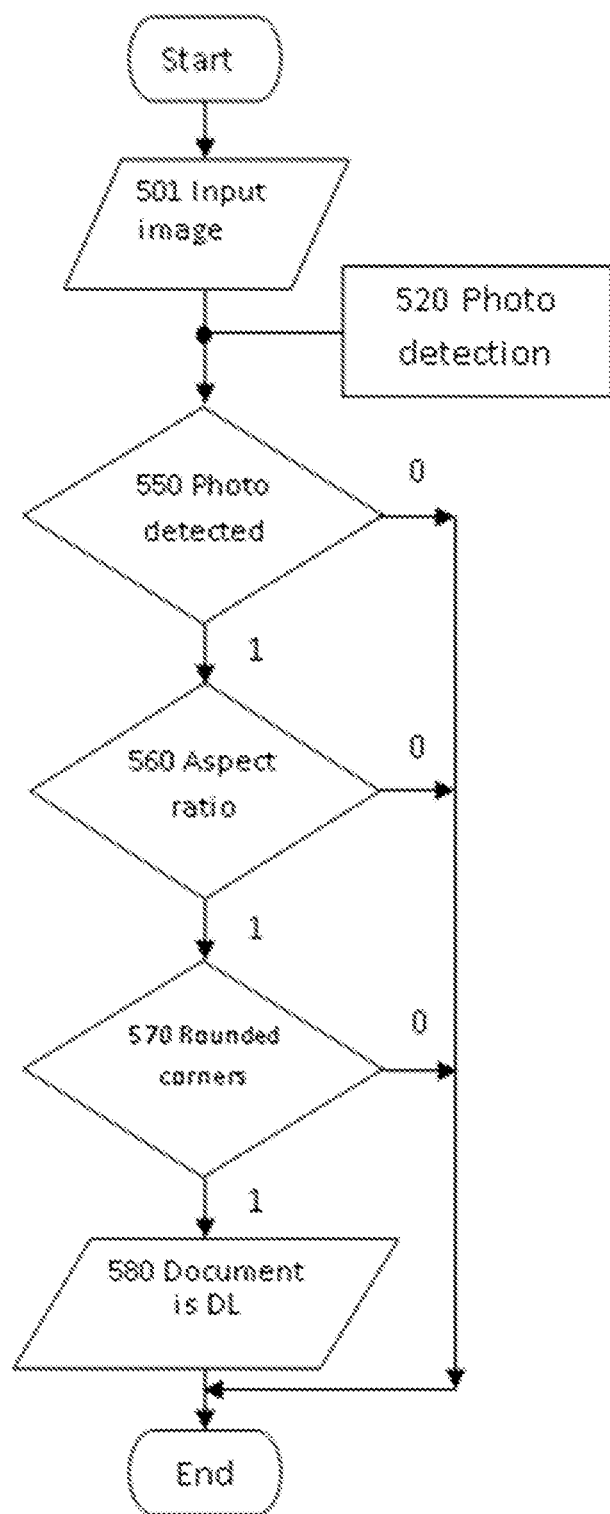
FIG. 5A is a flow chart illustrating a method of image-based document identification, according to an embodiment.

One embodiment of a workflow of image-based document identification is presented on FIG. 5A. Photo detection (520) is performed on the input image 501, which is the cropped image output of the combined cropping methods previously described. Photo detection identifies a photo area on the cropped image 501. Further details of the workflow for identifying the photo area are described below and illustrated in FIG. 5B. In step 550, a determination is made as to whether a photo is detected. If a photo is detected, an aspect ratio of the photo is determined in step 560 using data points on the height and width of the image from cropping. The aspect ratio may indicate whether the DL in the image belongs to a predefined DL size. Next, in 570, a determination is made as to whether rounded corners were identified during the cropping processing.

The results of the previous steps indicate whether the document in the image is a DL, and a result of a positive or negative identification of the document (580) is provided.

Photo Detection

Figure 5B:
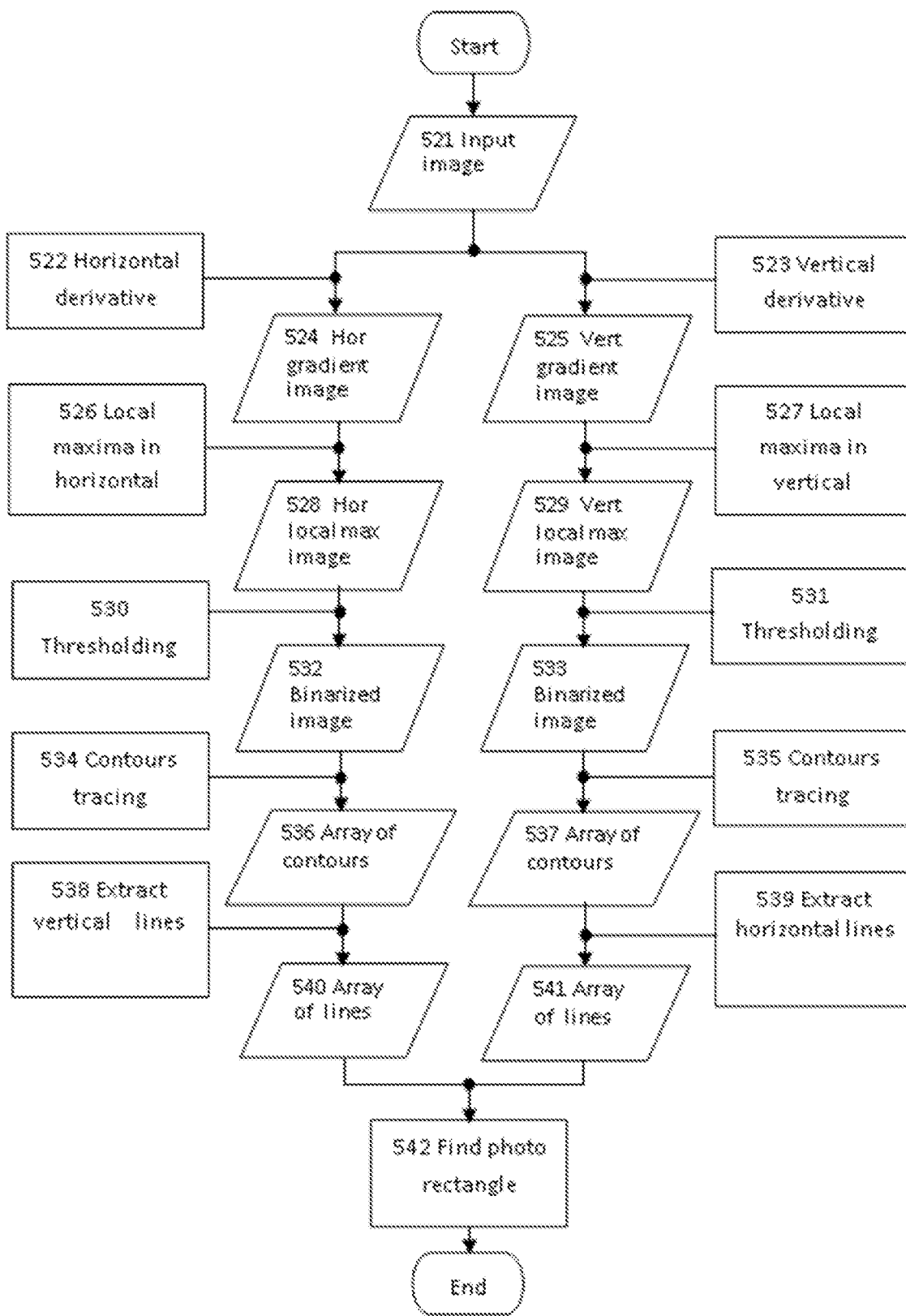
FIG. 5B is a flow chart illustrating a process of detecting a photo block on the image of the DL, according to one embodiment of the invention.

In one embodiment, a process of detecting a photo block on the image of the DL is provided, as illustrated by the workflow in FIG. 5B. Detection beings with an input image (521), which is a cropped image output from the combined cropping steps described above. In step 522, a horizontal derivative is determined, which involves calculating a derivative in a horizontal direction on the input image. A Sobel filter can be used for derivative approximation. An absolute value of the derivative is then calculated. In step 523, a vertical derivative is determined using the same steps as with the horizontal derivative—just in a vertical direction. A horizontal gradient image is then determined (step 524) using an output image $lx(y, x)$ of step 522, while a vertical gradient image is determined (step 525) using an output image of $ly(y, x)$ of step 523. The remaining steps are also described as being conducted in parallel for both horizontal and vertical aspects.

Next, in step 526, a local maximum in horizontal is determined by calculating a local maxima in a horizontal direction:

if $(Ix(y,x)>=Ix(y,x-1)$ and $Ix(y,x)>=Ix(y,x+1))$ $Lx(y,x)=Ix(y,x)$ else $Lx(y,x)=0$.

In step 527, a local maxima in vertical is computed by calculating a local maxima in vertical direction:

if $(Iy(y,x)>=Iy(y-1,x)$ and $Iy(y,x)>=Iy(y+1,x))$ $Ly(y,x)=Iy(y,x)$ else $Ly(y,x)=0$.

A horizontal local max image 528 and a vertical local max image 529 are the result of the local maxima determinations. The horizontal local max image is an image with local maxima in the horizontal direction $Lx(y,x)$, while the vertical local max image 529 is an image with a local maxima in a vertical direction $Ly(y,x)$. Next, in a horizontal thresholding step 530, the $Lx(y,x)$ is compared with a threshold, while in a vertical in a thresholding step 531, the $Ly(y,x)$ is compared with a threshold. Binarized images 532 and 533 are produced as a result of the thresholding step, such that for a horizontal binarized image 532, an image with binary data equals 1 if $Lx(y,x)>$threshold, and otherwise=0. Similarly, for a vertical binarzied image 533, the image with binary equals 1 if $Ly(y,x)$ is greater than a threshold, and otherwise=0.

In steps 534 and 535, contour tracing is performed on the binarized images to extract an array of connected points on the horizontal binarized image 532 and vertical binarized image 533. This contour tracing produces corresponding horizontal and vertical arrays of contours 536 and 537, where contour is represented as an array of coordinates of connected points.

Next, in steps 538 and 539, respective vertical and horizontal lines are extracted by calculating parameters (such as slope, starting and ending coordinates) of the contours. If the slope belongs to a predefined range, then that contour is added to an output array of contours. Arrays of vertical lines and horizontal lines are then produced in steps 540 and 541, which are simply arrays of vertical and horizontal contours with the parameters described above, such as slope, starting and ending coordinates. Finally, in step 542, the photo rectangle is identified by finding the best rectangle from the combined vertical and horizontal lines.

V. Image-Based Layout Identification

In one embodiment, a layout of the driver's license may be determined by comparing the cropped image of the driver's license with template images of driver's licenses stored in the DL format database 106. The closest match is determined, and information on the format of the driver's license stored in the DL format database 106 can then be used to identify exact locations where specific content will be located, such as names, addresses, etc. Further information regarding form and layout identification, as well as related steps of dynamic data capture, can be found below.

VI. Document Binarization

In one embodiment, once the format and the layout of the DL is determined, the cropped image may undergo a binarization step which will detect areas where text is located on the DL. Further details on the binarization step are provided below. The binarization step may also include removing a photo area from the image by detecting the photo area as described above, to create a binarized image without the photo area, which will enhance the performance of optical character recognition (OCR) in detecting the usable text by eliminating graphical "noise" which might be present in the photo, potentially affecting OCR output.

VII. Optical Character Recognition

Once the binarized image is produced, it may be outputted for processing via optical character recognition (OCR) or other related processes which will detect and extract text and other characters from the image of the DL. As a result of the processing steps described above, the image of the DL in the outputted binarized image will provide a high confidence level extraction for OCR. The content of the DL can therefore be quickly and accurately obtained even from a mobile image of the DL.

VIII. Pre-Processing of Mobile Image

The term "standard scanners" as used herein, but is not limited to, transport scanners, flat-bed scanners, and specialized check-scanners. Some manufacturers of transport scanners include UNISYS®, BancTec®, IBM®, and Canon®. With respect to specialized check-scanners, some models include the TellerScan® TS200 and the Panini® My Vision X. Generally, standard scanners have the ability to scan and produce high quality images, support resolutions from 200 dots per inch to 300 dots per inch (DPI), produce gray-scale and bi-tonal images, and crop an image of a check from a larger full-page size image. Standard scanners for other types of documents may have similar capabilities with even higher resolutions and higher color-depth.

The term "color images" as used herein, pertains to, but is not limited to, images having a color depth of 24 bits per a pixel (24 bit/pixel), thereby providing each pixel with one of 16 million possible colors. Each color image is represented by pixels and the dimensions W (width in pixels) and H (height in pixels). An intensity function I maps each pixel in the [W×H] area to its RGB-value. The RGB-value is a triple (R,G,B) that determines the color the pixel represents. Within the triple, each of the R(Red), G(Green) and B(Blue) values are integers between 0 and 255 that determine each respective color's intensity for the pixel.

The term "gray-scale images" as used herein may be considered, but is not limited to, images having a color depth of 8 bits per a pixel (8 bit/pixel), thereby providing each pixel with one of 256 shades of gray. As a person of ordinary skill in the art would appreciate, gray-scale images also include images with color depths of other various bit levels (e.g. 4 bit/pixel or 2 bit/pixel). Each gray-scale image is represented by pixels and the dimensions W (width in pixels) and H (height in pixels). An intensity function I maps each pixel in the [W×H] area onto a range of gray shades. More specifically, each pixel has a value between 0 and 255 which determines that pixel's shade of gray.

Bi-tonal images are similar to gray-scale images in that they are represented by pixels and the dimensions W (width in pixels) and H (height in pixels). However, each pixel within a bi-tonal image has one of two colors: black or white. Accordingly, a bi-tonal image has a color depth of 1 bit per a pixel (1 bit/pixel). The similarity transformation, as utilized by some embodiments of the invention, is based off the assumption that there are two images of [W×H] and [W'×H'] dimensions, respectively, and that the dimensions are proportional (i.e. W/W'=H/H'). The term "similarity transformation" may refer to a transformation ST from [W×H] area onto [W'×H'] area such that ST maps pixel p=p(x,y) on pixel p'=p'(x',y') with x'=x*W'/W and y=y*H'/H.

Figure 8:
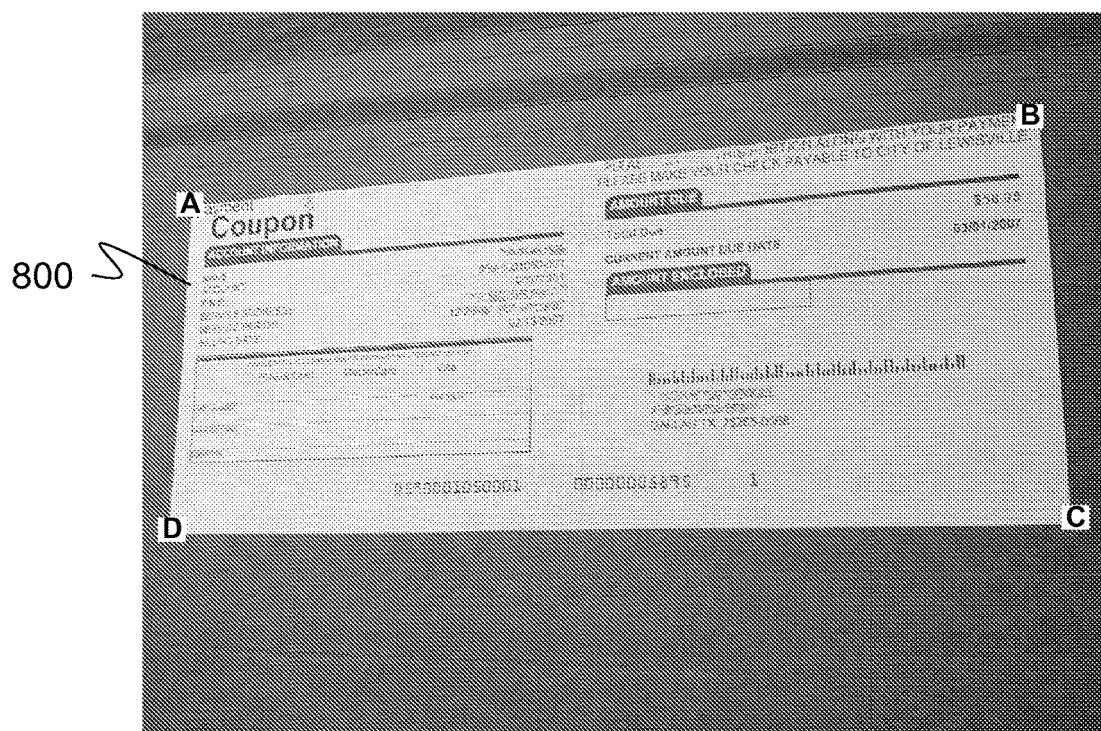
FIG. 8 is an image of a remittance coupon captured by a mobile device, according to an embodiment.

FIG. 8 is an image illustrating an example remittance coupon 800 that can be imaged with the systems and methods described herein. The mobile image capture and processing systems and methods described herein can be used with a variety of documents, including financial documents such as personal checks, business checks, cashier's checks, certified checks, and warrants. By using an image of the remittance coupon 800, the remittance process can be automated and performed more efficiently. As would be appreciated by those of skill in the art, remittance coupons are not the only types of documents that might be processed using the system and methods described herein. For example, in some embodiments, a user can capture an image of a remittance coupon and an image of a check associated with a checking account from which the remittance payment will be funded.

Figure 9:
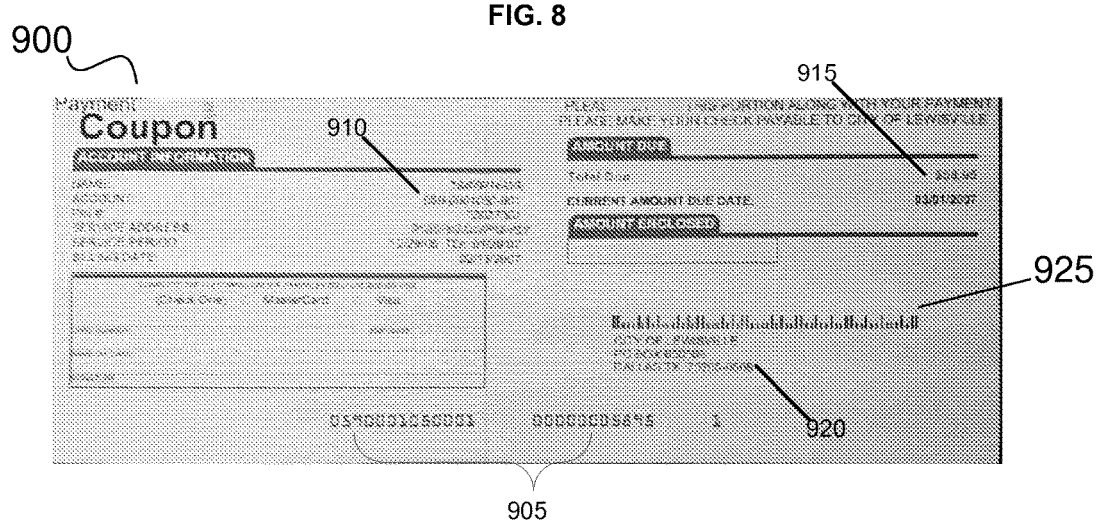
FIG. 9 is a geometrically corrected image created using image processing techniques disclosed herein using the mobile image of the remittance coupon illustrated in FIG. 8.

FIG. 9 is a geometrically corrected image 900 created using image processing techniques disclosed herein and using the mobile image of the remittance coupon 800 illustrated in FIG. 8. A remittance coupon may include various fields, and some fields in the documents might be considered "primary" fields. For example, some remittance coupons also include computer-readable bar codes or code lines 905 that include text or other computer-readable symbols that can be used to encode account-related information. The account-related information can be used to reconcile a payment received with the account for which the payment is being made. Code line 905 can be detected and decoded by a computer system to extract the information encoded therein. The remittance coupon can also include an account number field 910 and an amount due field 915. Remittance coupons can also include other fields, such as the billing company name and address 920, a total outstanding balance, a minimum payment amount, a billing date, and payment due date. The examples are merely illustrative of the types of information that may be included on a remittance coupon and it will be understood that other types of information can be included on other types of remittance coupons.

Once the image is captured and corrected, and the data is extracted and adjusted, then the image, data, and any required credential information, such as username, password, and phone or device identifier, can be transmitted to the remote server for further processing. This further processing is described in detail with respect to the remaining figures in the description below.

Image Processing

Mobile device and remote server can be configured to perform various processing on a mobile image to correct various defects in the image quality that could prevent the remote server or the banking server from being able to process the remittance due to poor image quality.

For example, an out of focus image of a remittance coupon or check, in embodiments where the mobile device can also be used to capture check images for payment processing, can be impossible to read and process electronically. For example, optical character recognition of the contents of the imaged document based on a blurry mobile image could result in incorrect payment information being extracted from the document. As a result, the wrong account could be credited for the payment or an incorrect payment amount could be credited. This may be especially true if a check and a payment coupon are both difficult to read or the scan quality is poor.

Many different factors may affect the quality of an image and the ability of a mobile device based image capture and processing system. Optical defects, such as out-of-focus images (as discussed above), unequal contrast or brightness, or other optical defects, can make it difficult to process an image of a document, e.g., a check, payment coupon, deposit slip, etc. The quality of an image can also be affected by the document position on a surface when photographed or the angle at which the document was photographed. This affects the image quality by causing the document to appear, for example, right side up, upside down, skewed, etc. Further, if a document is imaged while upside-down it might be impossible or nearly impossible to for the system to determine the information contained on the document.

In some cases, the type of surface might affect the final image. For example, if a document is sitting on a rough surface when an image is taken, that rough surface might show through. In some cases the surface of the document might be rough because of the surface below it. Additionally, the rough surface may cause shadows or other problems that might be picked up by the camera. These problems might make it difficult or impossible to read the information contained on the document.

Lighting may also affect the quality of an image, for example, the location of a light source and light source distortions. Using a light source above a document can light the document in a way that improves the image quality, while a light source to the side of the document might produce an image that is more difficult to process. Lighting from the side can, for example, cause shadows or other lighting distortions. The type of light might also be a factor, for example, sun, electric bulb, florescent lighting, etc. If the lighting is too bright, the document can be washed out in the image. On the other hand, if the lighting is too dark, it might be difficult to read the image.

The quality of the image can also be affected by document features, such as, the type of document, the fonts used, the colors selected, etc. For example, an image of a white document with black lettering may be easier to process than a dark colored document with black letters. Image quality may also be affected by the mobile device used. Some mobile camera phones, for example, might have cameras that save an image using a greater number of mega pixels. Other mobile cameras phones might have an auto-focus feature, automatic flash, etc. Generally, these features may improve an image when compared to mobile devices that do not include such features.

A document image taken using a mobile device might have one or more of the defects discussed above. These defects or others may cause low accuracy when processing the image, for example, when processing one or more of the fields on a document. Accordingly, in some embodiments, systems and methods using a mobile device to create images of documents can include the ability to identify poor quality images. If the quality of an image is determined to be poor, a user may be prompted to take another image.

Detecting an Out of Focus Image

Mobile device and remote server can be configured to detect an out of focus image. A variety of metrics might be used to detect an out-of-focus image. For example, a focus measure can be employed. The focus measure can be the ratio of the maximum video gradient between adjacent pixels measured over the entire image and normalized with respect to an image's gray level dynamic range and "pixel pitch". The pixel pitch may be the distance between dots on the image. In some embodiments a focus score might be used to determine if an image is adequately focused. If an image is not adequately focused, a user might be prompted to take another image.

According to an embodiment, the mobile device can be configured to detect whether an image is out of focus using the techniques disclosed herein. In an embodiment, the remote server can be configured to detect out of focus images. In some embodiments, the remote server can be configured to detect out of focus images and reject these images before performing mobile image quality assurance testing on the image. In other embodiments, detecting and out of focus image can be part of the mobile image quality assurance testing.

According to an embodiment, an image focus score can be calculated as a function of maximum video gradient, gray level dynamic range and pixel pitch. For example, in one embodiment:

$$\text{Image Focus Score} = (\text{Maximum Video Gradient}) * (\text{Gray Level Dynamic Range}) * (\text{Pixel Pitch}) \quad \text{(eq. 1)}$$

The video gradient may be the absolute value of the gray level for a first pixel "i" minus the gray level for a second pixel "i+1". For example:

$$\text{Video Gradient} = ABS[(\text{Grey level for pixel ``i''}) - (\text{Gray level for pixel ``i+1''})] \quad \text{(eq. 2)}$$

The gray level dynamic range may be the average of the "n" lightest pixels minus the average of the "n" darkest pixels. For example:

$$\text{Gray Level Dynamic Range} = [AVE(\text{``}N\text{'' lightest pixels}) - AVE(\text{``}N\text{'' darkest pixels})] \quad \text{(eq. 3)}$$

In equation 3 above, N can be defined as the number of pixels used to determine the average darkest and lightest pixel gray levels in the image. In some embodiments, N can be chosen to be 64. Accordingly, in some embodiments, the 64 darkest pixels are averaged together and the 64 lightest pixels are averaged together to compute the gray level dynamic range value.

The pixel pitch can be the reciprocal of the image resolution, for example, in dots per inch.

In other words, as defined above, the pixel pitch is the distance between dots on the image because the Image Resolution is the reciprocal of the distance between dots on an image.

$$\text{Pixel Pitch} = [1/\text{Image Resolution}] \quad \text{(eq. 4)}$$

In other words, as defined above, the pixel pitch is the distance between dots on the image because the Image Resolution is the reciprocal of the distance between dots on an image.

Detecting and Correcting Perspective Distortion

Figure 10:
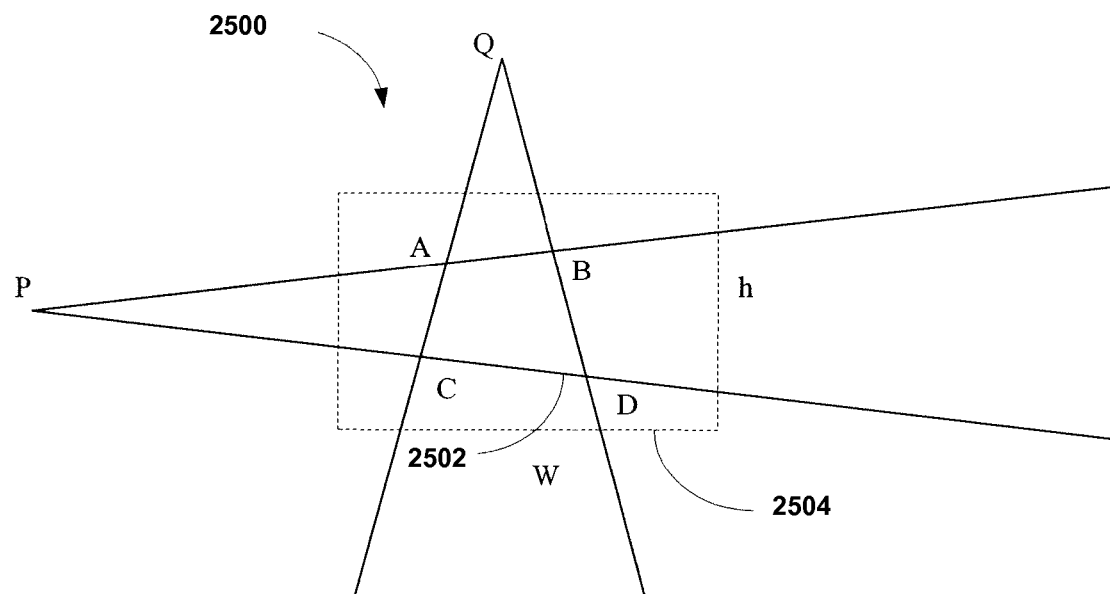
FIG. 10 and its related description above provide some examples of how a perspective transformation can be constructed for a quadrangle defined by the corners A, B, C, and D according to an embodiment.

FIG. 10 is a diagram illustrating an example of perspective distortion in an image of a rectangular shaped document. An image can contain perspective transformation distortions 2500 such that a rectangle can become a quadrangle ABCD 2502, as illustrated in the figure. The perspective distortion can occur because an image is taken using a camera that is placed at an angle to a document rather than directly above the document. When directly above a rectangular document it will generally appear to be rectangular. As the imaging device moves from directly above the surface, the document distorts until it can no longer be seen and only the edge of the page can be seen.

The dotted frame 2504 comprises the image frame obtained by the camera. The image frame is be sized h×w, as illustrated in the figure. Generally, it can be preferable to contain an entire document within the h×w frame of a single image. It will be understood, however, that some documents are too large or include too many pages for this to be preferable or even feasible.

In some embodiments, an image can be processed, or preprocessed, to automatically find and "lift" the quadrangle 2502. In other words, the document that forms quadrangle 502 can be separated from the rest of the image so that the document alone can be processed. By separating quadrangle 2502 from any background in an image, it can then be further processed.

The quadrangle 2502 can be mapped onto a rectangular bitmap in order to remove or decrease the perspective distortion. Additionally, image sharpening can be used to improve the out-of-focus score of the image. The resolution of the image can then be increased and the image converted to a black-and-white image. In some cases, a black-and-white image can have a higher recognition rate when processed using an automated document processing system in accordance with the systems and methods described herein.

An image that is bi-tonal, e.g., black-and-white, can be used in some systems. Such systems can require an image that is at least 200 dots per inch resolution. Accordingly, a color image taken using a mobile device can need to be high enough quality so that the image can successfully be converted from, for example, a 24 bit per pixel (24 bit/pixel) RGB image to a bi-tonal image. The image can be sized as if the document, e.g., check, payment coupon, etc., was scanned at 200 dots per inch.

Figure 11:
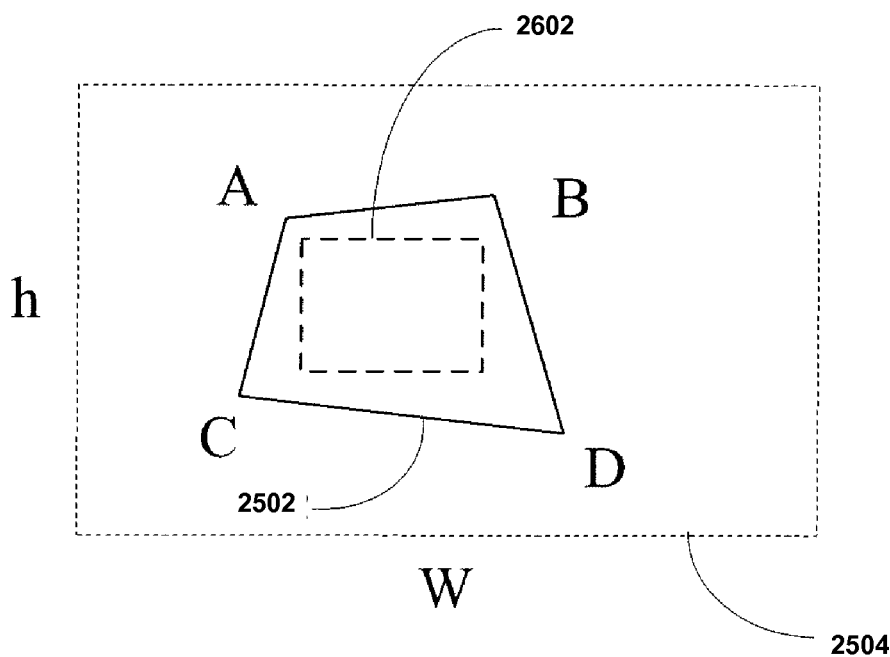
FIG. 11 is a diagram illustrating an example original image, focus rectangle and document quadrangle ABCD in accordance with the example of FIG. 10.

FIG. 11 is a diagram illustrating an example original image, focus rectangle and document quadrangle ABCD in accordance with the example of FIG. 10. In some embodiments it can be necessary to place a document for processing at or near the center of an input image close to the camera. All points A, B, C and D are located in the image, and the focus rectangle 2602 is located inside quadrangle ABCD 2502. The document can also have a low out-of-focus score and the background surrounding the document can be selected to be darker than the document. In this way, the lighter document will stand out from the darker background.

Image Correction

Figure 12:
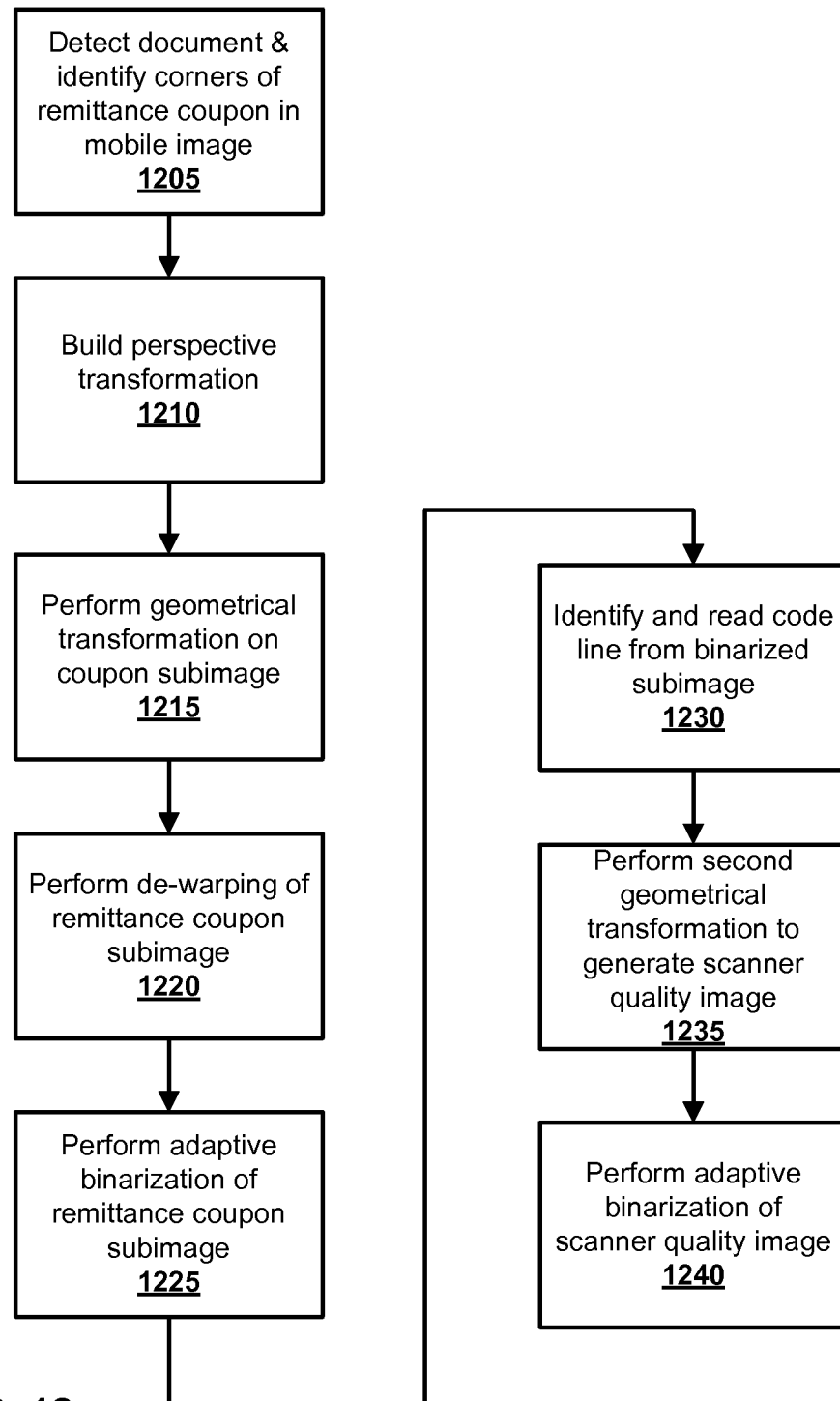
FIG. 12 is a flow diagram illustrating a method for correcting defects to mobile image according to an embodiment.

FIG. 12 is a flow diagram illustrating a method for correcting defects to mobile image according to an embodiment. According to an embodiment, the method illustrated in FIG. 12 can be performed by the image correction unit 404 implemented on the remote server. The method illustrated in FIG. 12 can be implemented as part of step S210 of the method illustrated in FIG. 2. The image correction unit can also receive a mobile image and processing parameters from the mobile device. According to some embodiments, some or all of the image correction functionality of the image correction unit can be implemented on the mobile device, and the mobile device can be configured to send a corrected mobile image to the remote server for further processing.

According to an embodiment, the image correction unit can also be configured to detect an out of focus image using the technique described above and to reject the mobile image if the image focus score for the image falls below a predetermined threshold without attempting to perform other image correction techniques on the image. According to an embodiment, the image correction unit can send a message to the mobile device 340 indicating that the mobile image was too out of focus to be used and requesting that the user retake the image.

The image correction unit can be configured to first identify the corners of a coupon or other document within a mobile image (step 1205). One technique that can be used to identify the corners of the remittance coupon in a color image is illustrated in FIG. 12 and is described in detail below. The corners of the document can be defined by a set of points A, B, C, and D that represent the corners of the document and define a quadrangle.

The image correction unit can be configured to then build a perspective transformation for the remittance coupon (step 1210). As can be seen in FIG. 8, the angle at which an image of a document is taken can cause the rectangular shape of the remittance coupon to appear distorted. FIG. 10 and its related description above provide some examples of how a perspective transformation can be constructed for a quadrangle defined by the corners A, B, C, and D according to an embodiment. For example, the quadrangle identified in step 1210 can be mapped onto a same-sized rectangle in order to build a perspective transformation that can be applied to the document subimage, i.e. the portion of the mobile image that corresponds to the remittance coupon, in order to correct perspective distortion present in the image.

A geometrical transformation of the document subimage can be performed using the perspective transformation built in step 1210 (step 1215). The geometrical transformation corrects the perspective distortion present in the document subimage. An example of results of geometrical transformation can be seen in FIG. 9 where a document subimage of the remittance coupon pictured in FIG. 8 has been geometrically corrected to remove perspective distortion.

A "dewarping" operation can also be performed on the document subimage (step 1220). An example of a warping of a document in a mobile image is provided in FIG. 38. Warping can occur when a document to be imaged is not perfectly flat or is placed on a surface that is not perfectly flat, causing distortions in the document subimage. A technique for identifying warping in a document subimage is illustrated in FIG. 39.

Figure 15:
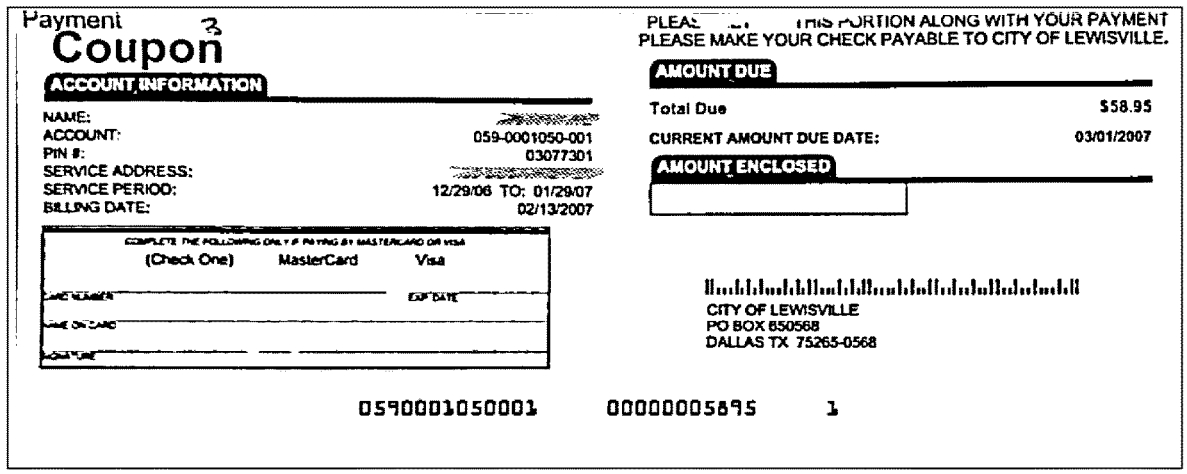
FIG. 15 illustrates a binarized image of a remittance coupon generated from the geometrically corrected remittance coupon image illustrated in FIG. 9, according to one embodiment.

According to an embodiment, the document subimage can also binarized (step 1225). A binarization operation can generate a bi-tonal image with color depth of 1 bit per a pixel (1 bit/pixel). Some automated processing systems, such as some Remote Deposit systems require bi-tonal images as inputs. A technique for generating a bi-tonal image is described below with respect to FIG. 13. FIG. 15 illustrates a binarized version of the geometrically corrected mobile document image of the remittance coupon illustrated in FIG. 9. As illustrated, in the bi-tonal image of FIG. 15, the necessary information, such as payees, amounts, account number, etc., has been preserved, while extra information has been removed. For example, background patterns that might be printed on the coupon are not present in the bi-tonal image of the remittance coupon. Binarization of the subimage also can be used to remove shadows and other defects caused by unequal brightness of the subimage.

Once the image has been binarized, the code line of the remittance coupon can be identified and read (step 1230). As described above, many remittance coupons include a code line that comprises computer-readable text that can be used to encode account-related information that can be used to reconcile a payment received with the account for which the payment is being made. Code line 905 of FIG. 9 illustrates an example of code line on a remittance coupon.

Figure 23:
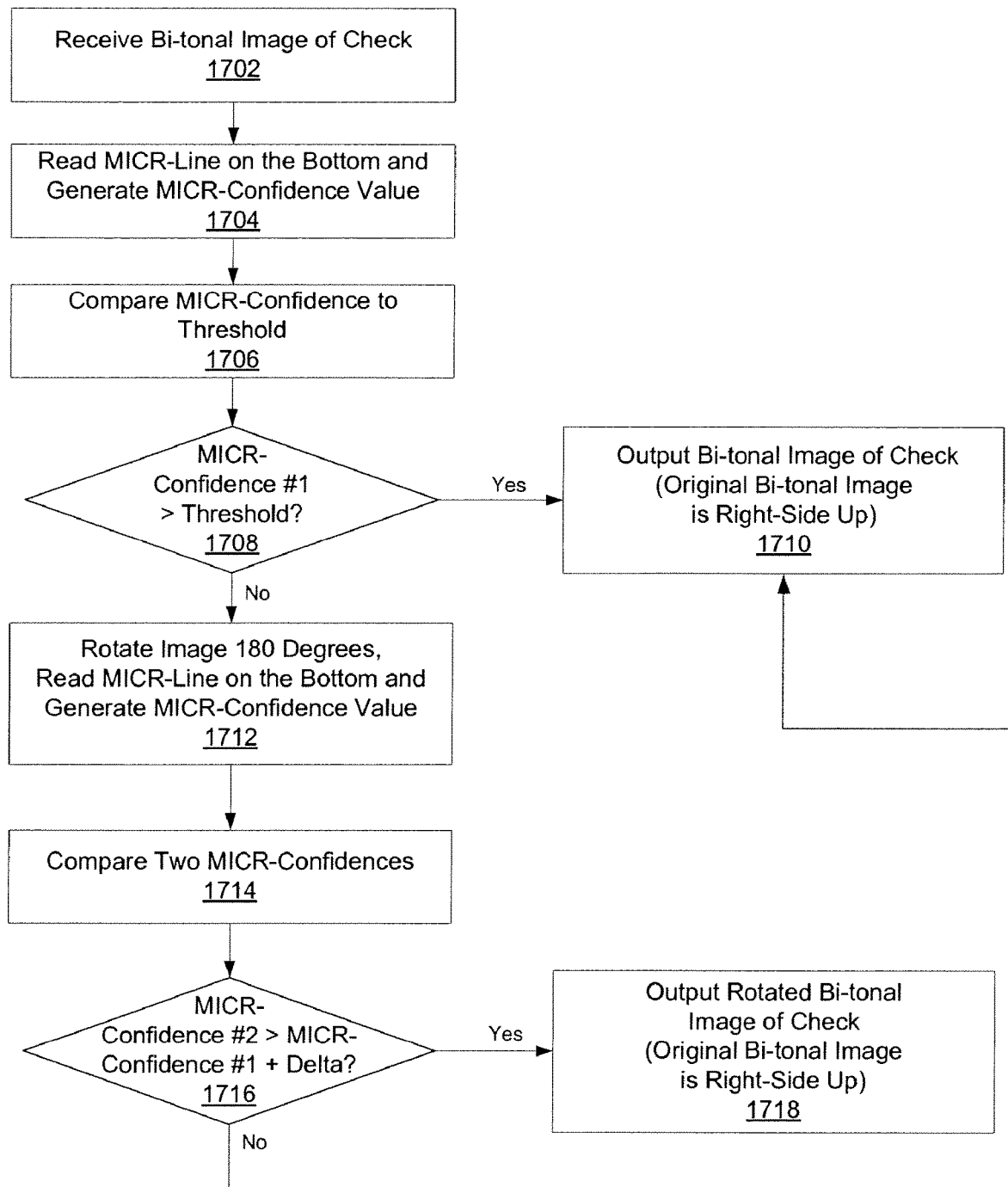
FIG. 23 is a flow chart illustrating a method for correcting landscape orientation of a document image according to an embodiment.

Often, a standard optical character recognition font, the OCR-A font, is used for printing the characters comprising the code line. The OCR-A font is a fixed-width font where the characters are typically spaced 0.10 inches apart. Because the OCR-A font is a standardized fixed-width font, the image correction unit can use this information to determining a scaling factor for the image of the remittance coupon. The scaling factor to be used can vary from image to image, because the scaling is dependent upon the position of the camera or other image capture device relative to the document being imaged and can also be dependent upon optical characteristics of the device used to capture the image of the document. FIG. 23 illustrates a scaling method that can be used to determine a scaling factor to be applied according to an embodiment. The method illustrated in FIG. 23 is related to scaling performed on a MICR-line of a check, but can be used to determined a scaling factor for an image of a remittance coupon based on the size of the text in the code line of the image of the remittance coupon.

Once the scaling factor for the image has been determined, a final geometrical transformation of the document image can be performed using the scaling factor (step 1235). This step is similar to that in step 1215, except the scaling factor is used to create a geometrically altered subimage that represents the actual size of the coupon at a given resolution. According to an embodiment, the dimensions of the geometrically corrected image produced by set 635 are identical to the dimensions of an image produced by a flat bed scanner at the same resolution.

During step 1235, other geometrical corrections can also be made, such as correcting orientation of the coupon subimage. The orientation of the coupon subimage can be determined based on the orientation of the text of the code line.

Once the final geometrical transformation has been applied, a final adaptive binarization can be performed on the grayscale image generated in step 1235 (step 1240). The bi-tonal image output by this step will have the correct dimensions for the remittance coupon because the bi-tonal image is generated using the geometrically corrected image generated in step 1235.

According to an embodiment, the image correction unit can be configured to use several different binarization parameters to generate two or more bi-tonal images of the remittance coupon. The use of multiple images can improve data capture results. The use of multiple bi-tonal images to improve data captures results is described in greater detail below.

Detecting Document within Color Mobile Image

Figure 13:
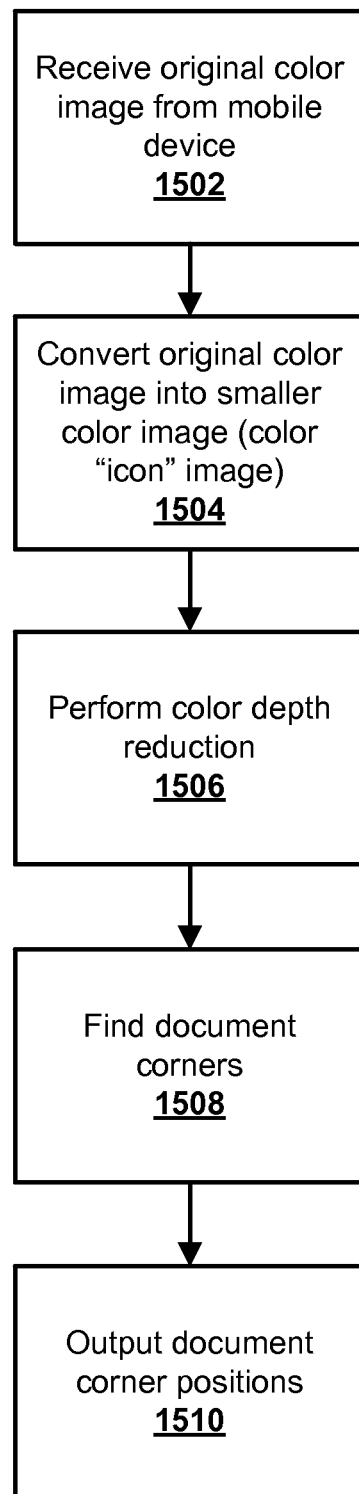
FIG. 13 is a flow chart for a method that can be used to identify the corners of the remittance coupon in a color image according to an embodiment.

Referring now to FIG. 13, a flowchart is provided illustrating an example method for automatic document detection within a color image from a mobile device. According to an embodiment, the method illustrated in FIG. 13 can be used to implement step 1205 of the method illustrated in FIG. 12. Typically, the operations described within method of FIG. 13 are performed within an automatic document detection unit of the remote server; however, embodiments exist where the operations reside in multiple units. In addition, generally the automatic document detection unit takes a variety of factors into consideration when detecting the document in the mobile image. The automatic document detection unit can take into consideration arbitrary location of the document within the mobile image, the 3-D distortions within the mobile image, the unknown size of the document, the unknown color of the document, the unknown color(s) of the background, and various other characteristics of the mobile engine, e.g. resolution, dimensions, etc.

The method of FIG. 13 begins at step 1502 by receiving the original color image from the mobile device. Upon receipt, this original color image is converted into a smaller color image, also referred to as a color "icon" image, at operation 1504. This color "icon" image preserves the color contrasts between the document and the background, while suppressing contrasts inside the document. A detailed description of an example conversion process is provided with respect to FIG. 16.

A color reduction operation is then applied to the color "icon" image at step 1506. During the operation, the overall color of the image can be reduced, while the contrast between the document and its background can be preserved within the image. Specifically, the color "icon" image of operation 1504 can be converted into a gray "icon" image (also known as a gray-scale "icon" image) having the same size. An example, color depth reduction process is described with further detail with respect to FIG. 18.

The corners of the document are then identified within the gray "icon" image (step 1310). As previously noted above with respect to FIG. 10, these corners A, B, C, and D make up the quadrangle ABCD (e.g. quadrangle ABCD 2502). Quadrangle ABCD, in turn, makes up the perimeter of the document. Upon detection of the corners, the location of the corners is outputted (step 1310).

Binarization

Figure 14:
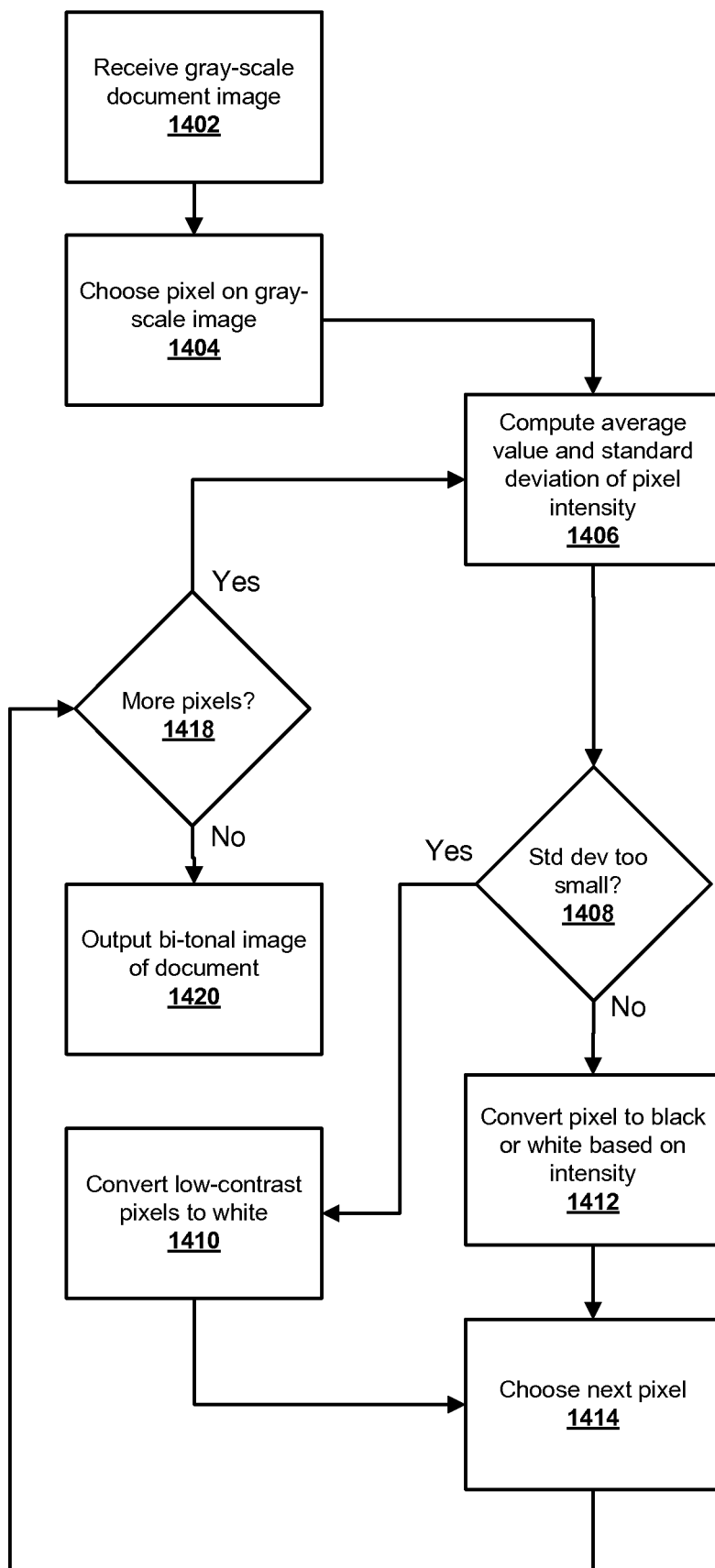
FIG. 14 is a flow diagram of a method for generating a bi-tonal image according to an embodiment.

FIG. 14 illustrates a binarization method that can be used to generate a bi-tonal image from a document image according to an embodiment. The method illustrated in FIG. 10 can be used to implement the binarization step 1225 of the method illustrated in FIG. 12. In an embodiment, the steps of the method illustrated in FIG. 14 can be performed within unit of the remote server.

A binarization operation generates a bi-tonal image with color depth of 1 bit per a pixel (1 bit/pixel). In the case of documents, such as checks and deposit coupons, a bi-tonal image is required for processing by automated systems, such as Remote Deposit systems. In addition, many image processing engines require such an image as input. The method of FIG. 14 illustrates binarization of a gray-scale image of a document as produced by geometrical operation 1004. This particular embodiment uses a novel variation of well-known Niblack's method of binarization. As such, there is an assumption that the gray-scale image received has a the dimensions W pixel×H pixels and an intensity function I(x,y) gives the intensity of a pixel at location (x,y) in terms one of 256 possible gray-shade values (8 bit/pixel). The binarization operation will convert the 256 gray-shade value to a 2 shade value (1 bit/pixel), using an intensity function B(x,y). In addition, to apply the method, a sliding window with dimensions w pixels×h pixels is defined and a threshold T for local (in-window) standard deviation of gray image intensity I(x,y) is defined. The values of w, h, and T are all experimentally determined.

A gray-scale image of the document is received at step 1402, the method 1400 chooses a pixel p(x,y) within the image at step 1404. In FIG. 14, the average (mean) value ave and standard deviation σ of the chosen pixel's intensity I(x,y) within the w×h current window location (neighborhood) of pixel p(x,y) are computed (step 1406). If the standard deviation σ is determined to be too small at operation 1408 (i.e. σ<T), pixel p(x,y) is considered to low-contrast and, thus, part of the background. Accordingly, at step 1410, low-contrast pixels are converted to white, i.e. set B(x,y) set to 1, which is white; however, if the deviation σ is determined to be larger or equal to the threshold T, i.e. σ≥T, the pixel p(x,y) is considered to be part of the foreground. In step 1412, if I(p)<ave−k*σ, pixel p is considered to be a foreground pixel and therefore B(x,y) is set to 0 (black). Otherwise, the pixel is treated as background and therefore B(x,y) is set to 1. In the formula above, k is an experimentally established coefficient.

Subsequent to the conversion of the pixel at either step 1410 or operation 1412, the next pixel is chosen at step 1414, and operation 1406 is repeated until all the gray-scale pixels (8 bit/pixel) are converted to a bi-tonal pixel (1 bit/pixel). However, if no more pixels remain to be converted 1418, the bi-tonal image of the document is then outputted at step 1420.

Conversion of Color Image to Icon Image

Figure 16:
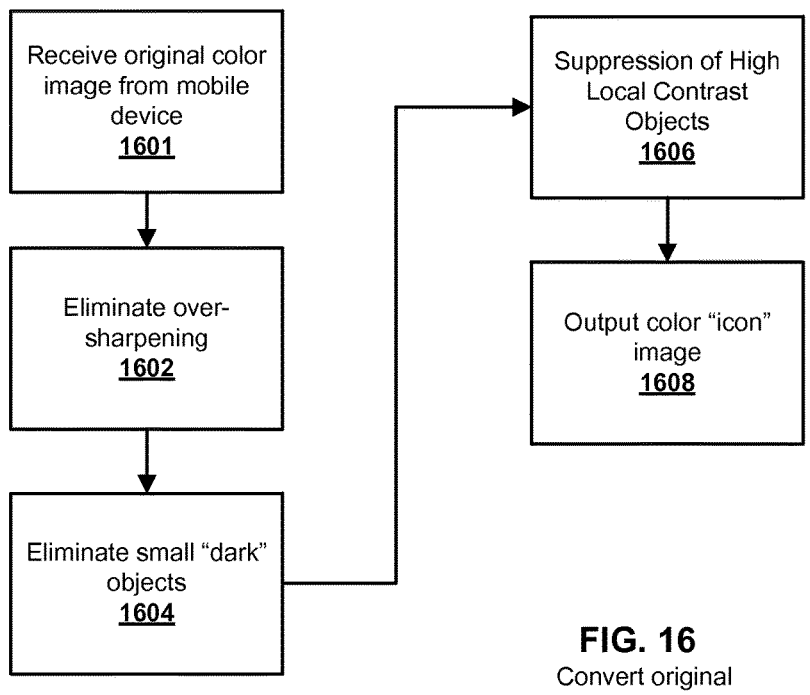
FIG. 16 is a flow diagram of a method for converting a document image into a smaller color icon image according to an embodiment.

Referring now to FIG. 16, a flowchart is provided describing an example method for conversion of a color image to a smaller "icon" image according to an embodiment. This method can be used to implement step 1304 of the method illustrated FIG. 13. The smaller "icon" image preserves the color contrasts between the document depicted therein and its background, while suppressing contrasts inside the document. Upon receipt of the original color image from the mobile device (step 1601), over-sharpening is eliminated within the image (step 1602). Accordingly, assuming the color input image I has the dimensions of W×H pixels, operation 1602 averages the intensity of image I and downscales image I to image I', such that image I' has dimensions that are half that of image I (i.e. W'=W/2 and H'=H/2). Under certain embodiments, the color transformation formula can be described as the following:

$$C(p')=ave\{C(q):q \text{ in } S \times S\text{-window of } p\}, \text{ where} \quad (eq. 5)$$

C is any of red, green or blue components of color intensity;

p' is any arbitrary pixel on image I' with coordinates (x',y');

p is a corresponding pixel on image I:p=p(x,y), where x=2*x' and y=2*y';

q is any pixel included into S×S-window centered in p;

S is established experimentally; and ave is averaging over all q in the S×S-window.

Small "dark" objects within the image can then be eliminated (step 1604). Examples of such small "dark" objects include, but are not limited to, machine-printed characters and hand-printed characters inside the document. Hence, assuming operation 1604 receives image I' from step 1602, step 1604 creates a new color image I" referred to as an "icon" with width W" set to a fixed small value and height H" set to W"*(H/W), thereby preserving the original aspect ratio of image I. In some embodiments, the transformation formula can be described as the following:

$$C(p'')=\max\{C(q'):q' \text{ in } S' \times S'\text{-window of } p'\}, \text{ where} \quad (eq. 6)$$

C is any of red, green or blue components of color intensity;

p" is an arbitrary pixel on image I";

p' is a pixel on image I' which corresponds to p" under similarity transformation, as previously defined;

q is any pixel on image I' included into S'×S'-window centered in p';

max is maximum over all q' in the S'×S'-window;

W" is established experimentally;

S' is established experimentally for computing the intensity I"; and

I"(p") is the intensity value defined by maximizing the intensity function I' (p') within the window of corresponding pixel p' on image I', separately for each color plane.

The reason for using the "maximum" rather than "average" is to make the "icon" whiter (white pixels have a RGB-value of (255,255,255)).

Figure 17A:
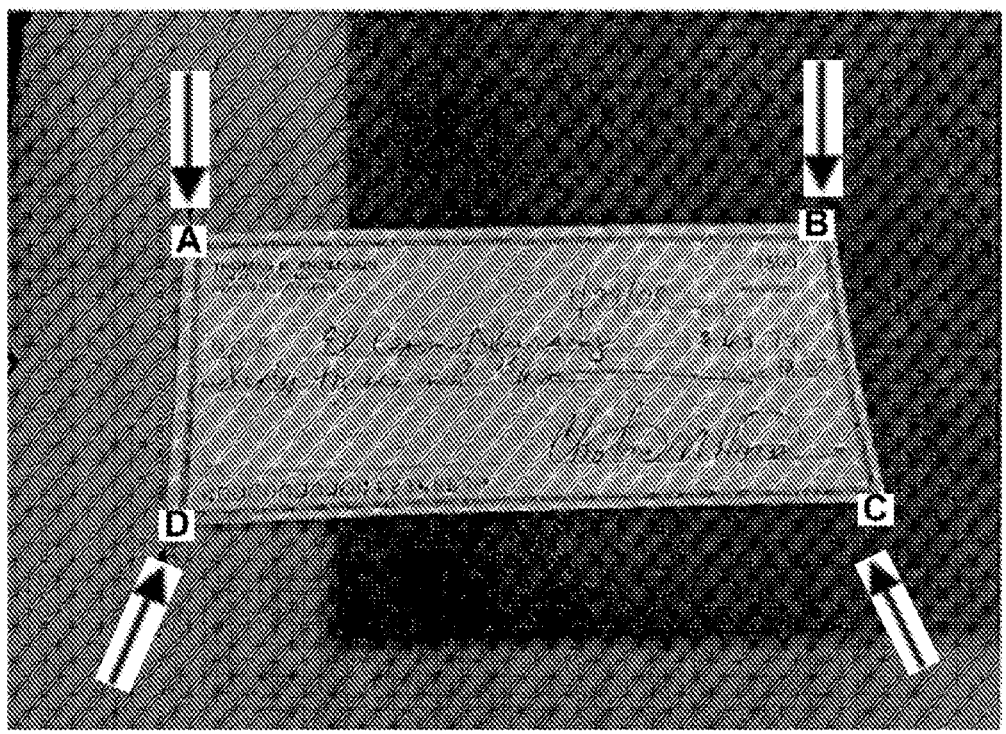
FIG. 17A is a mobile image of a check according to an embodiment.
Figure 17B:
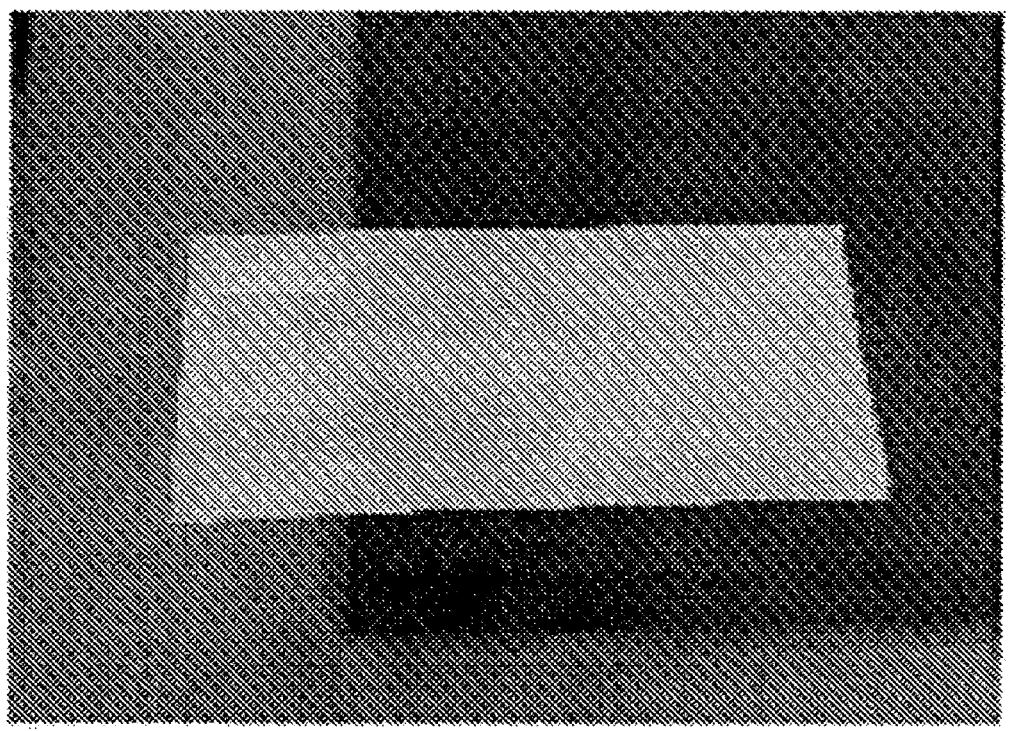
FIG. 17B is an example of a color icon image generated using the method of FIG. 12 on the example mobile image of a check illustrated in FIG. 13A according to an embodiment.

In the next operation 1606, the high local contrast of "small" objects, such as lines, text, and handwriting on a document, is suppressed, while the other object edges within the "icon" are preserved. Often, these other object edges are bold. In various embodiments of the invention, multiple dilation and erosion operations, also known as morphological image transformations, are utilized in the suppression of the high local contrast of "small" objects. Such morphological image transformations are commonly known and used by those of ordinary skill in the art. The sequence and amount of dilation and erosion operations used is determined experimentally. Subsequent to the suppression operation 1606, a color "icon" image is outputted at operation 1608. FIG. 17B depicts an example of the mobile image of a check illustrated in FIG. 17A after being converted into a color "icon" image according to an embodiment.

Color Depth Reduction

Figure 18:
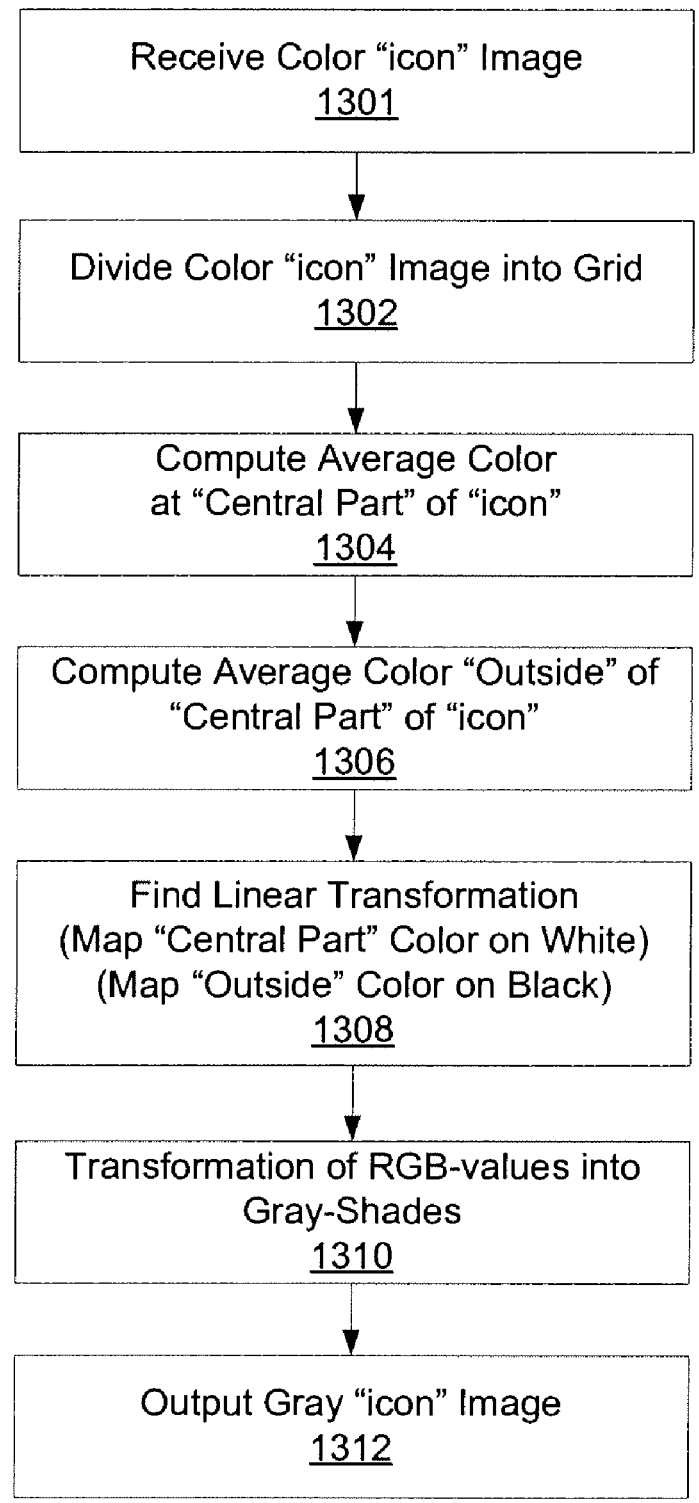
FIG. 18 is a flow diagram of a method for reducing the color depth of an image according to an embodiment.
Figure 19A:
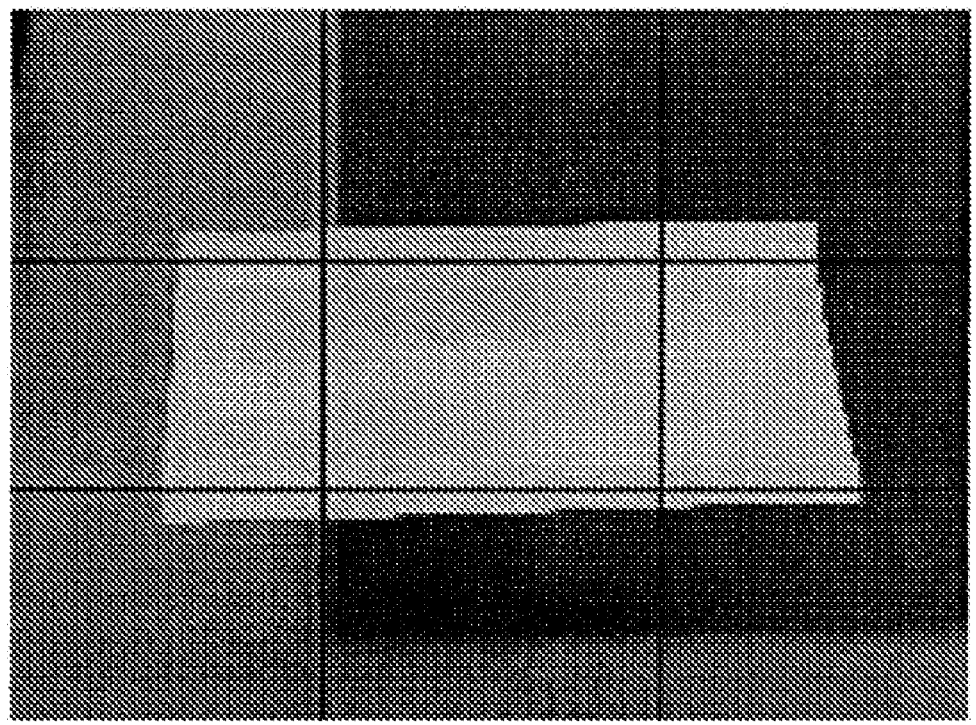
FIG. 19A depicts an example of the color "icon" image of FIG. 17B after operation 1302 has divided it into a 3×3 grid in accordance with one embodiment of the invention.
Figure 19B:
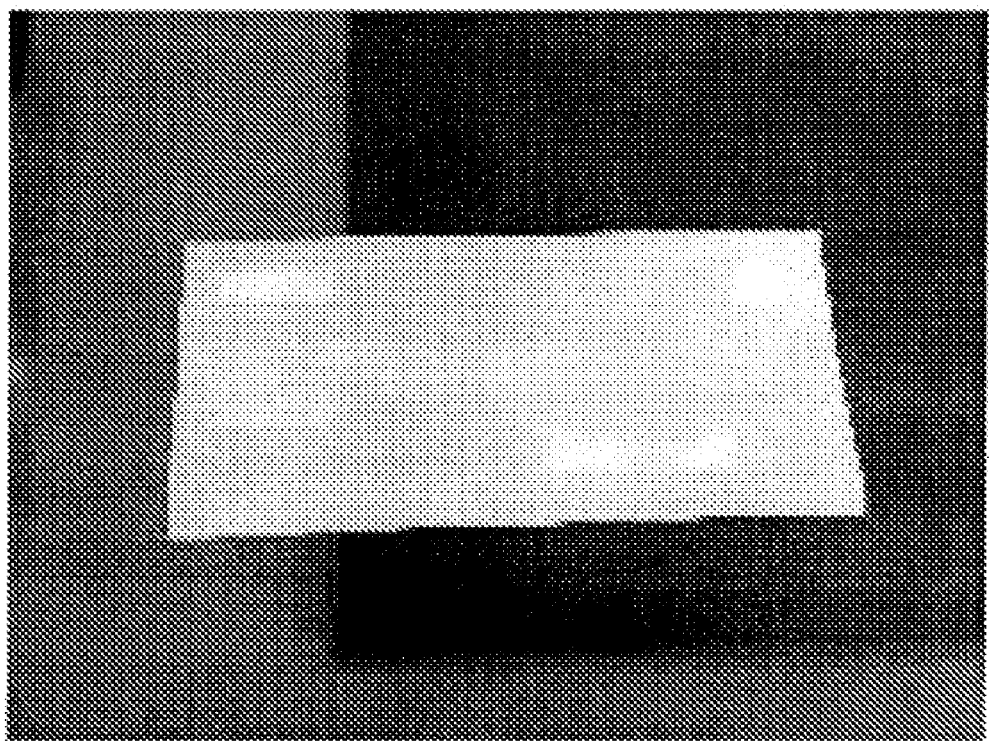
FIG. 19B depicts an example of the color "icon" image of FIG. 17B converted to a gray "icon" image using the method illustrated in FIG. 18 according to an embodiment.

Referring now to FIG. 18, a flowchart is provided illustrating an example method that provides further details with respect to the color depth reduction operation 1306 as illustrated in FIG. 13. At step 1301, a color "icon" image for color reduction is received. The color "icon" image is divided into a grid (or matrix) of fixed length and width with equal size grid elements at operation 1302. In some embodiments, the preferred grid size is such that there is a center grid element. For example, a grid size of 3×3 may be employed. FIG. 19A depicts an example of the color "icon" image of FIG. 19B after operation 1302 has divided it into a 3×3 grid in accordance with one embodiment of the invention.

Then, at step 1304, the "central part" of the icon, which is usually the center most grid element, has its color averaged. Next, the average color of the remaining parts of the icon is computed at step 1306. More specifically, the grid elements "outside" the "central part" of the "icon" have their colors averaged. Usually, in instances where there is a central grid element, e.g. 3×3 grid, the "outside" of the "central part" comprises all the grid elements other than the central grid element.

Subsequently, a linear transformation for the RGB-space is determined at step 1308. The linear transformation is defined such that it maps the average color of the "central part" computed during operation 1304 to white, i.e. 255, while the average color of the "outside" computed during operation 1306 maps to black, i.e. 0. All remaining colors are linearly mapped to a shade of gray. This linear transformation, once determined, is used at operation 1310 to transform all RGB-values from the color "icon" to a gray-scale "icon" image, which is then outputted at operation 1312. Within particular embodiments, the resulting gray "icon" image, also referred to as a gray-scale "icon" image, maximizes the contrast between the document background, assuming that the document is located close to the center of the image and the background. FIG. 15B depicts an example of the color "icon" image of FIG. 13B once it has been converted to a gray "icon" image in accordance with one embodiment.

Figure 20:
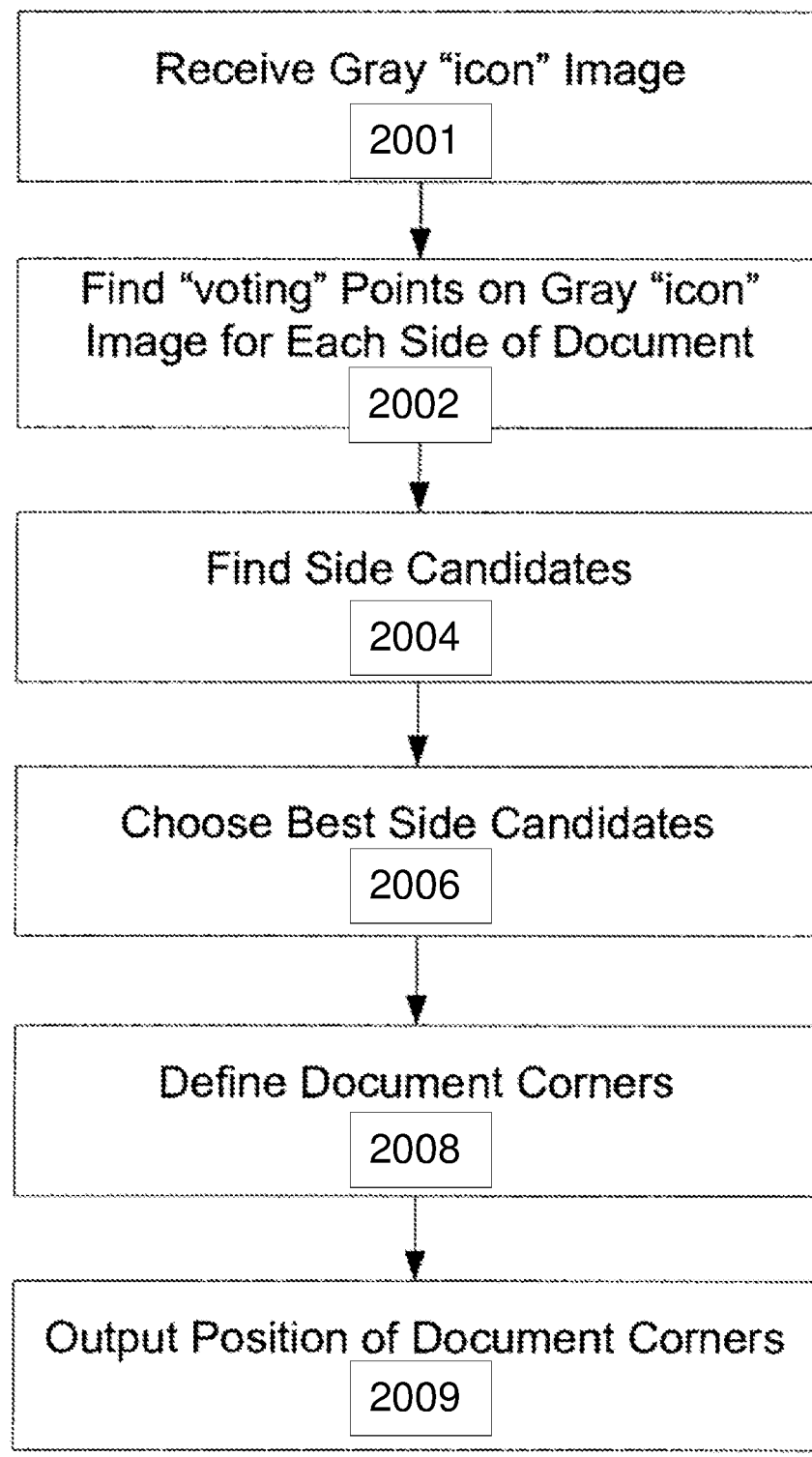
FIG. 20 is a flowchart illustrating an example method for finding document corners from a gray "icon" image containing a document according to an embodiment.

Referring now to FIG. 20, a flowchart is provided illustrating an example method for finding document corners from a gray "icon" image containing a document. The method illustrated in FIG. 20 can be used to implement step 1308 of the method illustrated in FIG. 13. Upon receiving a gray "icon" image at operation 2001, the "voting" points on the gray "icon" image are found in step 2002 for each side of the document depicted in the image. Consequently, all positions on the gray "icon" image that could be approximated with straight line segments to represent left, top, right, and bottom sides of the document are found.

In accordance with one embodiment, this goal is achieved by first looking for the "voting" points in the half of the "icon" that corresponds with the current side of interest. For instance, if the current side of interest is the document's top side, the upper part of the "icon" (Y<H/2) is examined while the bottom part of the "icon" (Y≥H/2) is ignored.

Within the selected half of the "icon," the intensity gradient (contrast) in the correct direction of each pixel is computed. This is accomplished in some embodiments by considering a small window centered in the pixel and, then, breaking the window into an expected "background" half where the gray intensity is smaller, i.e. where it is supposed to be darker, and into an expected "doc" half where the gray intensity is higher, i.e. where it is supposed to be whiter. There is a break line between the two halves, either horizontal or vertical depending on side of the document sought to be found. Next the average gray intensity in each half-window is computed, resulting in an average image intensity for the "background" and an average image intensity of the "doc." The intensity gradient of the pixel is calculated by subtracting the average image intensity for the "background" from the average image intensity for the "doc."

Eventually, those pixels with sufficient gray intensity gradient in the correct direction are marked as "voting" points for the selected side. The sufficiency of the actual gray intensity gradient threshold for determining is established experimentally.

Continuing with method 2000, candidate sides, i.e. line segments that potentially represent the sides of the document, i.e. left, top, right, and bottom sides, are found. In order to do so, some embodiments find all subsets within the "voting" points determined in step 2002 that could be approximated by a straight line segment (linear approximation). In many embodiments, the threshold for linear approximation is established experimentally. This subset of lines is defined as the side "candidates." As an assurance that the set of side candidates is never empty, the gray "icon" image's corresponding top, bottom, left, and right sides are also added to the set.

Next, in step 2006 chooses the best candidate for each side of the document from the set of candidates selected in operation 2004, thereby defining the position of the document within the gray "icon" image. In accordance with some embodiments, the following process is used in choosing the best candidate for each side of the document:

The process starts with selecting a quadruple of line segments {L, T, R, B}, where L is one of the candidates for the left side of the document, T is one of the candidates for the top side of the document, R is one of the candidates for the right side of the document, and B is one of the candidates for the bottom side of the document. The process then measures the following characteristics for the quadruple currently selected.

The amount of "voting" points is approximated and measured for all line segments for all four sides. This amount value is based on the assumption that the document's sides are linear and there is a significant color contrast along them. The larger values of this characteristic increase the overall quadruple rank.

The sum of all intensity gradients over all voting points of all line segments is measured. This sum value is also based on the assumption that the document's sides are linear and there is a significant color contrast along them. Again, the larger values of this characteristic increase the overall quadruple rank.

The total length of the segments is measured. This length value is based on the assumption that the document occupies a large portion of the image. Again, the larger values of this characteristic increase the overall quadruple rank.

The maximum of gaps in each corner is measured. For example, the gap in the left/top corner is defined by the distance between the uppermost point in the L-segment and the leftmost point in the T-segment. This maximum value is based on how well the side-candidates suit the assumption that the document's shape is quadrangle. The smaller values of this characteristic increase the overall quadruple rank.

The maximum of two angles between opposite segments, i.e. between L and R, and between T and R, is measured. This maximum value is based on how well the side-candidates suit the assumption that the document's shape is close to parallelogram. The smaller values of this characteristic increase the overall quadruple rank.

The deviation of the quadruple's aspect ratio from the "ideal" document aspect ratio is measured. This characteristic is applicable to documents with a known aspect ratio, e.g. checks. If the aspect ratio is unknown, this characteristic should be excluded from computing the quadruple's rank. The quadruple's aspect ratio is computed as follows:

Find the quadrangle by intersecting the quadruple's elements;

Find middle-point of each of the four quadrangle's sides;

Compute distances between middle-points of opposite sides, say D1 and D2;

Find the larger of the two ratios: R=max(D1/D2, D2/D1);

Assuming that the "ideal" document's aspect ratio is known and Min/MaxAspectRatio represent minimum and maximum of the aspect ratio respectively, define the deviation in question as:

0, if MinAspectRatio<=R<=MaxAspectRatio

MinAspectRatio−R, if R<MinAspectRatio

R−MaxAspectRatio, if R>MaxAspectRatio.

For checks, MinAspectRatio can be set to 2.0 and MaxAspectRatio can be set to 3.0.

This aspect ratio value is based on the assumption that the document's shape is somewhat preserved during the perspective transformation. The smaller values of this characteristic increase the overall quadruple rank.

Following the measurement of the characteristics of the quadruple noted above, the quadruple characteristics are combined into a single value, called the quadruple rank, using weighted linear combination. Positive weights are assigned for the amount of "voting" points, the sum all of intensity gradients, and the total length of the segments. Negatives weights are assigned for maximum gaps in each corner, maximum two angles between opposite segments, and the deviation of the quadruple's aspect ratio. The exact values of each of the weights are established experimentally.

The operations set forth above are repeated for all possible combinations of side candidates, eventually leading to the "best" quadruple, which is the quadruple with the highest rank. The document's corners are defined as intersections of the "best" quadruple's sides, i.e. the best side candidates.

In, step 2008 the corners of the document are defined using the intersections of the best side candidates. A person of ordinary skill in the art would appreciate that these corners can then be located on the original mobile image by transforming the corner locations found on the "icon" using the similarity transformation previously mentioned. Method 2000 concludes at step 2010 where the locations of the corners defined in step 2008 are output.

Geometric Correction

Figure 21:
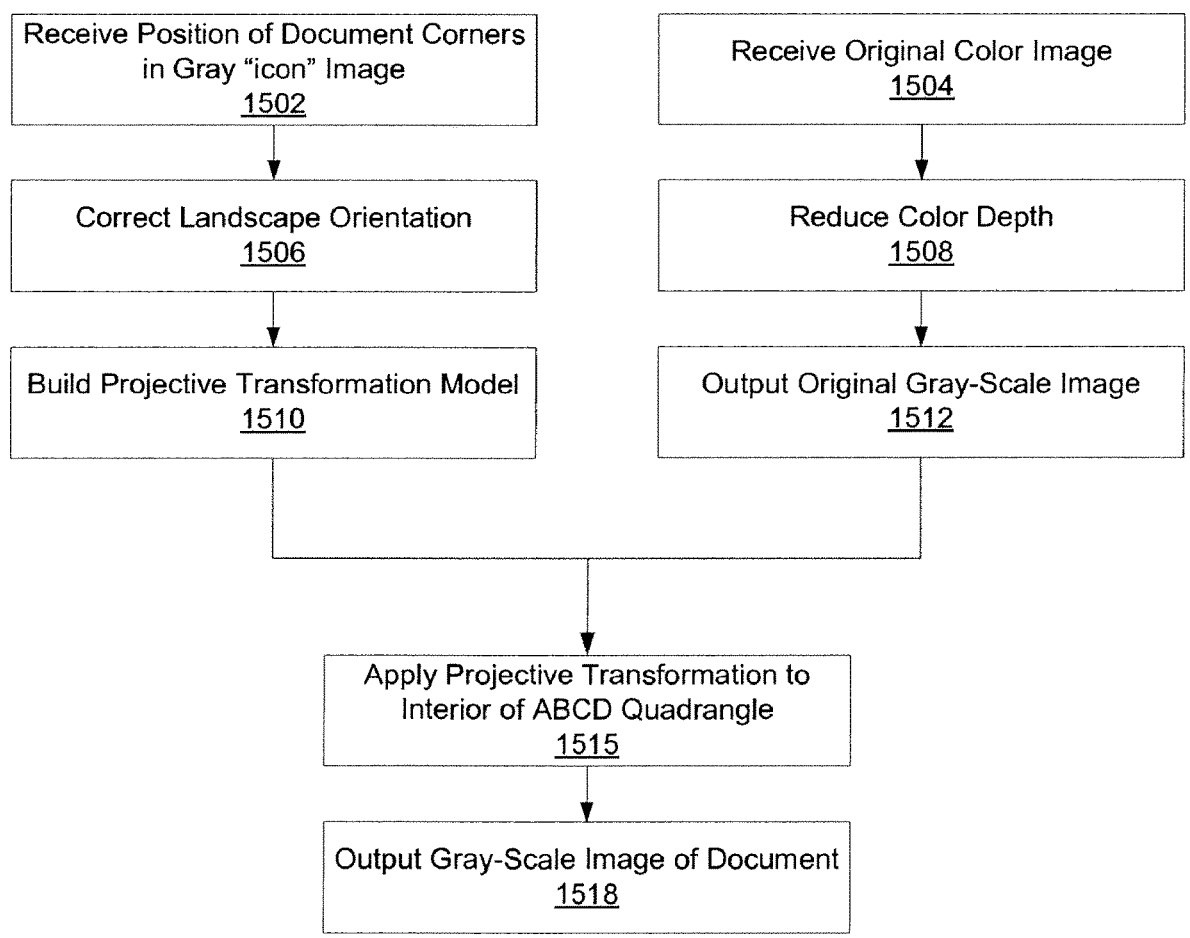
FIG. 21 is a flowchart that illustrates an example method for geometric correction according to an embodiment.

FIG. 21 provides a flowchart that illustrates an example method for geometric correction in accordance with the invention according to an embodiment. According to an embodiment, the method illustrated in FIG. 21 can be used to implement steps 1210, 1215, and 1235 of the method illustrated in FIG. 12. As previously mentioned, geometric correction is needed to correct any possibly perspective distortions that exist in the original mobile image. Additionally, geometric correction can correct the orientation of the documentation within the original mobile image, e.g. document is orientated at 90, 180, or 270 degrees where the right-side-up orientation is 0 degrees. It should be noted that in some embodiments, the orientation of the document depends on the type of document depicted in the mobile image, as well as the fields of relevance on the document.

Figure 22A:
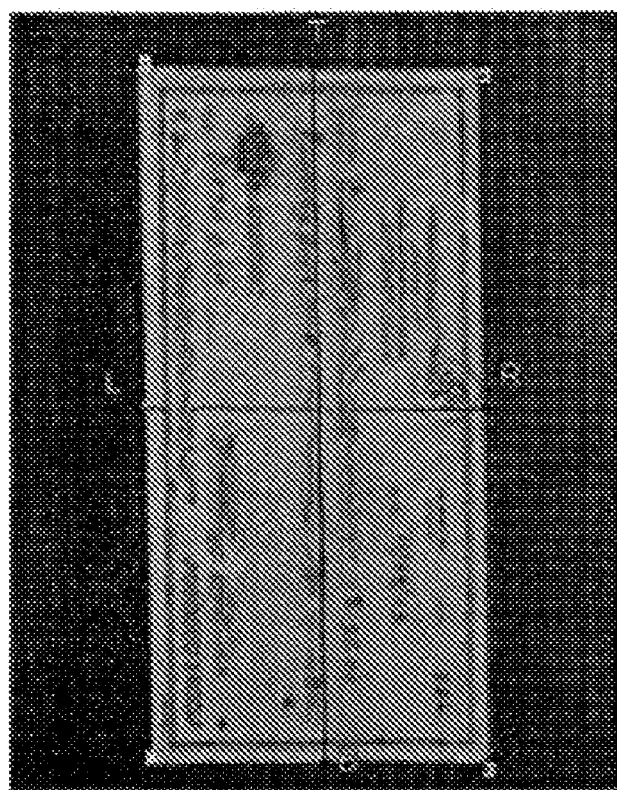
FIG. 22A is an image illustrating a mobile image of a check that is oriented in landscape orientation according to an embodiment.

In instances where the document is in landscape orientation (90 or 270 degrees), as illustrated by the check in FIG. 22A, geometric correction is suitable for correcting the orientation of the document. Where the document is at 180 degree orientation, detection of the 180 degree orientation and its subsequent correction are suitable when attempting to locate an object of relevance on the document. A codeline for a remittance coupon can be located in various locations on the remittance coupon, and might not be located along the bottom of the coupon. The ability to detect a codeline in an image of the remittance coupon changes significantly after the document has been rotated 180-degrees. In contrast, the MICR-line of check is generally known to be at a specific location along the bottom of the document, and the MICR-line can be used to determine the current orientation of the check within the mobile image. In some embodiments, the object of relevance on a document depends on the document's type. For example, where the document is a contract, the object of relevance may be a notary seal, signature, or watermark positioned at a known position on the contract. Greater detail regarding correction of a document (specifically, a check) having upside-down orientation (180 degree orientation) is provided with respect to FIG. 23.

According to some embodiments, a mathematical model of projective transformations is built and converts the distorted image into a rectangle-shaped image of predefined size. According to an embodiment, this step corresponds to step 1210 of FIG. 12. In an example, where the document depicted in mobile image is a check, the predefined size is established as 1200×560 pixels, which is roughly equivalent to the dimensions of a personal check scanned at 200 DPI. In other embodiments, where the document depicted is a remittance coupon, the size of the remittance coupons may not be standardized. However, the size and spacing of the characters comprising the code line can be used to determine a scaling factor to be applied to the image to correct the size of the image of the remittance coupon relative to a specific resolution.

Continuing with reference to the method of FIG. 21, there are two separate paths of operations that are either performed sequentially or concurrently, the outputs of which are eventually utilized in the final output. One path of operations begins at step 1504 where the original mobile image in color is received. In step 1508, the color depth of the original mobile image is reduced from a color image with 24 bit per a pixel (24 bit/pixel) to a gray-scale image with 8 bit per a pixel (8 bit/pixel). This image is subsequently outputted to step 1516 as a result of step 1512.

The other path of operations begins at step 1502, where the positions of the document's corners within the gray "icon" image are received. Based off the location of the corners, the orientation of the document is determined and the orientation is corrected (step 1506). In some embodiments, this operation uses the corner locations to measure the aspect ratio of the document within the original image. Subsequently, a middle-point between each set of corners can be found, wherein each set of corners corresponds to one of the four sides of the depicted document, resulting in the left (L), top (T), right (R), and bottom (B) middle-points (step 1506). The distance between the L to R middle-points and the T to B middle points are then compared to determine which of the two pairs has the larger distance. This provides step 1506 with the orientation of the document.

In some instances, the correct orientation of the document depends on the type of document that is detected. For example, as illustrated in FIG. 22A, where the document of interest is a check, the document is determined to be in landscape orientation when the distance between the top middle-point and bottom middle-point is larger than the distance between the left middle-point and the right middle-point. The opposite might be true for other types of documents.

If it is determined in step 1506 that an orientation correction is necessary, then the corners of the document are shifted in a loop, clock-wise in some embodiments and counter-clockwise in other embodiments.

At step 1510, the projective transformation is built to map the image of the document to a predefined target image size of width of W pixels and height of H pixels. In some embodiments, the projective transformation maps the corners A, B, C, and D of the document as follows: corner A to (0,0), corner B to (W,0), corner C to (W,H), and corner D to (0,H). Algorithms for building projective transformation are commonly known and used amongst those of ordinary skill in the art.

Figure 22B:
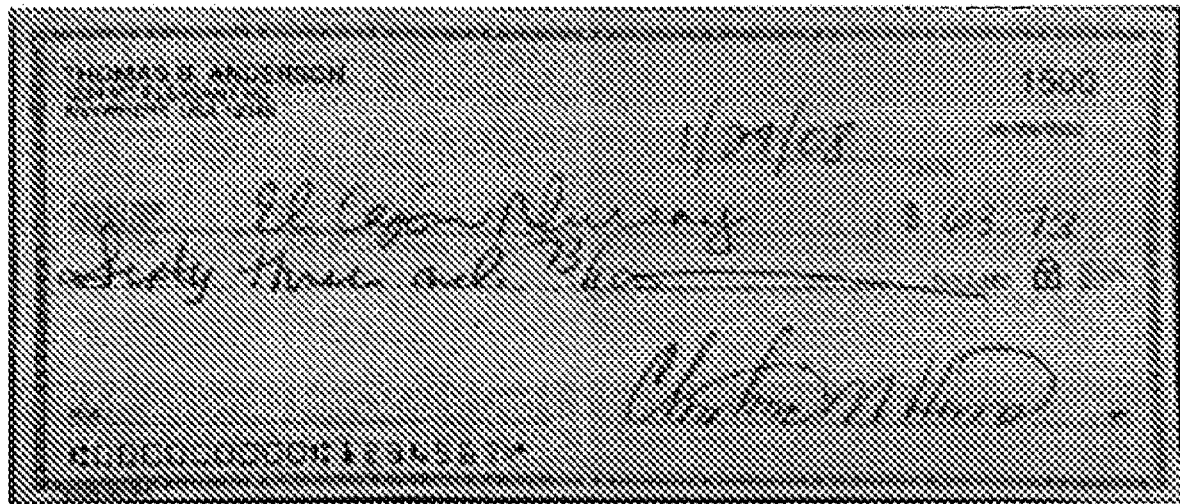
FIG. 22B example gray-scale image of the document depicted in FIG. 17A once a geometrical correction operation has been applied to the image according to an embodiment.

At step 1516, the projective transformation created during step 1514 is applied to the mobile image in gray-scale as outputted as a result of step 1512. The projective transformation as applied to the gray-scale image of step 1512 results in all the pixels within the quadrangle ABCD depicted in the gray-scale image mapping to a geometrically corrected, gray-scale image of the document alone. FIG. 22B is an example gray-scale image of the document depicted in FIG. 17A once a geometrical correction operation in accordance with the invention is applied thereto. The process concludes at operation 1518 where the gray-scale image of the document is outputted to the next operation.

Correcting Landscape Orientation

FIG. 23 is a flow chart illustrating a method for correcting landscape orientation of a document image according to an embodiment. As previously noted, the geometric correction operation as described in FIG. 21 is one method in accordance with the invention for correcting a document having landscape orientation within the mobile image. However, even after the landscape orientation correction, the document still may remain in upside-down orientation. In order to the correct upside-down orientation for certain documents, some embodiments of the invention require the image containing the document be binarized beforehand. Hence, the orientation correction operation included in step 1235 usually follows the binarization operation of 1225. While the embodiment described herein uses the MICR-line of a check or determine the orientation of an image, the code line of a remittance coupon can be used to determine the orientation of a remittance coupon using the technique described herein.

Upon receiving the bi-tonal image of the check at operation 1702, the MICR-line at the bottom of the bi-tonal check image is read at operation 1704 and an MICR-confidence value is generated. This MICR-confidence value (MC1) is compared to a threshold value T at operation 1706 to determine whether the check is right-side-up. If MC1>T at operation 1708, then the bi-tonal image of the check is right side up and is outputted at operation 1710.

However, if MC1≤T at operation 1708, then the image is rotated 180 degrees at operation 1712, the MICR-line at the bottom read again, and a new MICR-confidence value generated (MC2). The rotation of the image by 180 degree is done by methods commonly-known in the art. The MICR-confidence value after rotation (MC2) is compared to the previous MICR-confidence value (MC1) plus a Delta at operation 1714 to determine if the check is now right-side-up. If MC2>MC2+Delta at operation 1716, the rotated bi-tonal image has the check right-side-up and, thus, the rotated image is outputted at operation 1718. Otherwise, if MC2<MC2+Delta at operation 1716, the original bi-tonal image of the check is right-side-up and outputted at operation 1710. Delta is a positive value selected experimentally that reflects a higher a priori probability of the document initially being right-side-up than upside-down.

Size Correction

Figure 24:
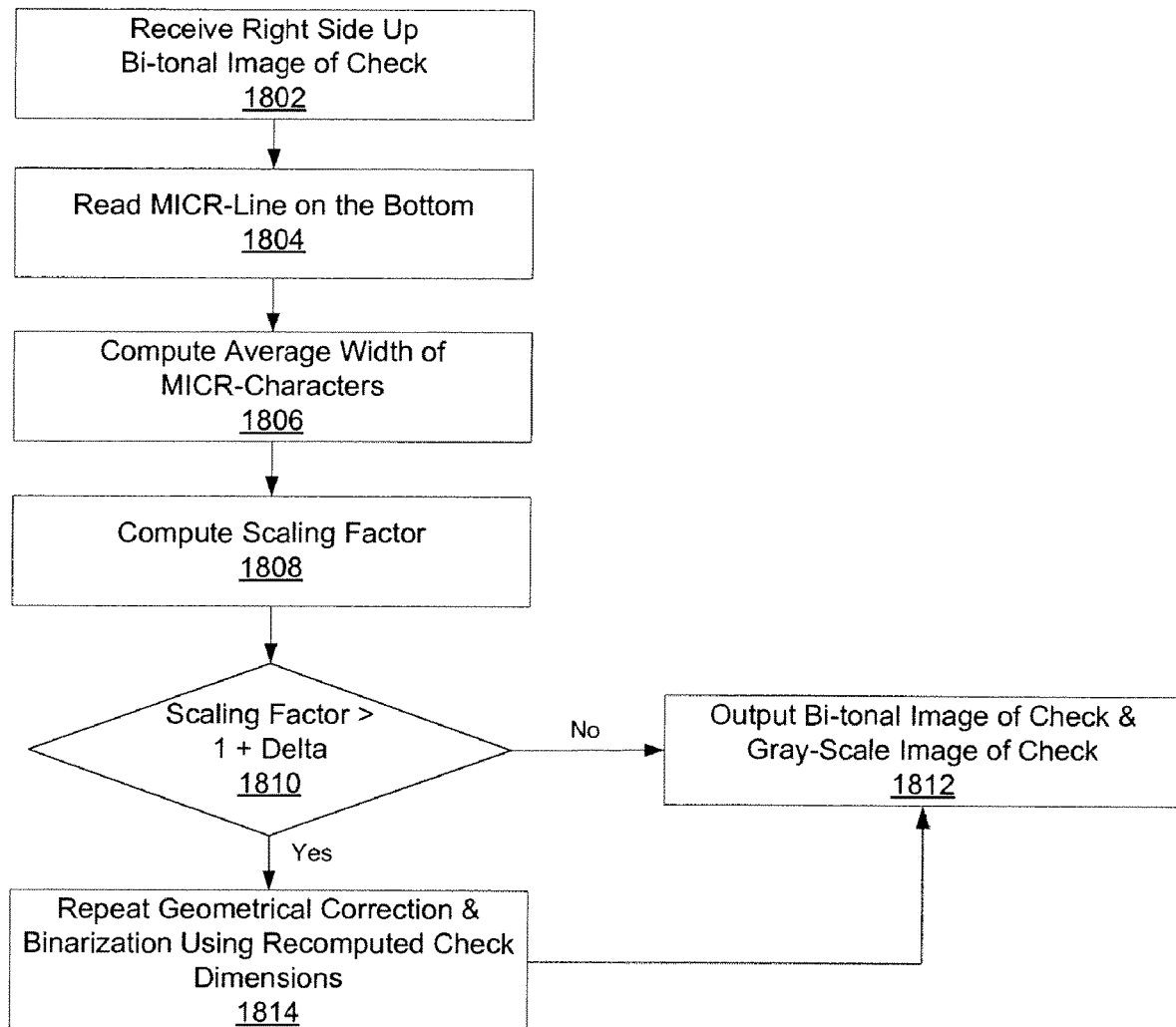
FIG. 24 provides a flowchart illustrating an example method for size correction of an image according to an embodiment.

FIG. 24 provides a flowchart illustrating an example method for size correction of an image according to an embodiment. The method of FIG. 24 can be used to implement the size correction step described in relation to step 1230 of FIG. 12. Specifically, FIG. 24 illustrates an example method, in accordance with one embodiment, for correcting the size of a remittance coupon within a bi-tonal image, where the remittance coupon is oriented right-side-up. A person of ordinary skill in the art would understand and appreciate that this method can operate differently for other types of documents, e.g. deposit coupons, remittance coupons.

Since many image processing engines are sensitive to image size, it is crucial that the size of the document image be corrected before it can be properly processed. For example, a form identification engine may rely on the document size as an important characteristic for identifying the type of document that is being processed. Generally, for financial documents such as remittance coupons, the image size should be equivalent to the image size produced by a standard scanner running at 200 DPI.

In addition, where the document is a remittance coupon, the size of the remittance coupons vary widely across different biller. Hence, in order to restore the size of remittance coupons that have been geometrically corrected in accordance with the invention at a predefined image size of 1200×560 pixels, the size correction operation is performed.

Referring now to FIG. 24, after receiving a bi-tonal image containing a remittance coupon that is orientated right-side-up at operation 1802, the codeline at the bottom of the remittance coupon is read at operation 1804. This allows the average width of the codeline characters to be computed at operation 1806. In doing so, the computer average width gets compared to the average size of a codeline character at 200 DPI at operation 1808, and a scaling factor is computed accordingly. In some embodiments of the invention, the scaling factor SF is computer as follows:

$$SF = AW_{200}/AW, \text{ where} \quad \text{(eq. 7)}$$

AW is the average width of the MICR-character found; and $AW_{200}$ is the corresponding "theoretical" value based on the ANSI x9.37 standard (Specifications for Electronic Exchange of Check and Image Data) at 200 DPI.

The scaling factor is used at operation 1810 to determine whether the bi-tonal image of the remittance coupon requires size correction. If the scaling SF is determined to be less than or equal to 1.0+Delta, then the most recent versions of the remittance coupon's bi-tonal image and the remittance coupon's the gray-scale image are output at operation 1812. Delta defines the system's tolerance to wrong image size.

If, however, the scaling factor SF is determined to be higher than 1.0+Delta, then at operation 1814 the new dimensions of the remittance coupon are computed as follows:

$$AR = H_S/W_S \quad \text{(eq. 8)}$$

$$W' = W*SF \quad \text{(eq. 9)}$$

$$H' = AR*W', \text{ where} \quad \text{(eq. 10)}$$

$H_S$ and $W_S$ are the height and width of the remittance coupon snippet found on the original image;

AR is the remittance coupon aspect ratio which we want to maintain while changing the size;

W is the width of geometrically corrected image before it's size is adjusted;

W' is the adjusted remittance coupon's width in pixels; and

H' is the adjusted remittance coupon's height in pixels.

Subsequent to re-computing the new dimensions, operation 1814 repeats geometrical correction and binarization using the newly dimensioned remittance coupon image. Following the repeated operations, operation 1812 outputs the resulting bi-tonal image of the remittance coupon and gray-scale image of the remittance coupon.

Image Quality Assurance

Once the remote server has processed a mobile image (see step S216 of the method illustrated in FIG. 2), the remote server can be configured to perform image quality assurance processing on the mobile image to determine whether the quality of the image is sufficient to submit to banking server 112.

Figure 25:
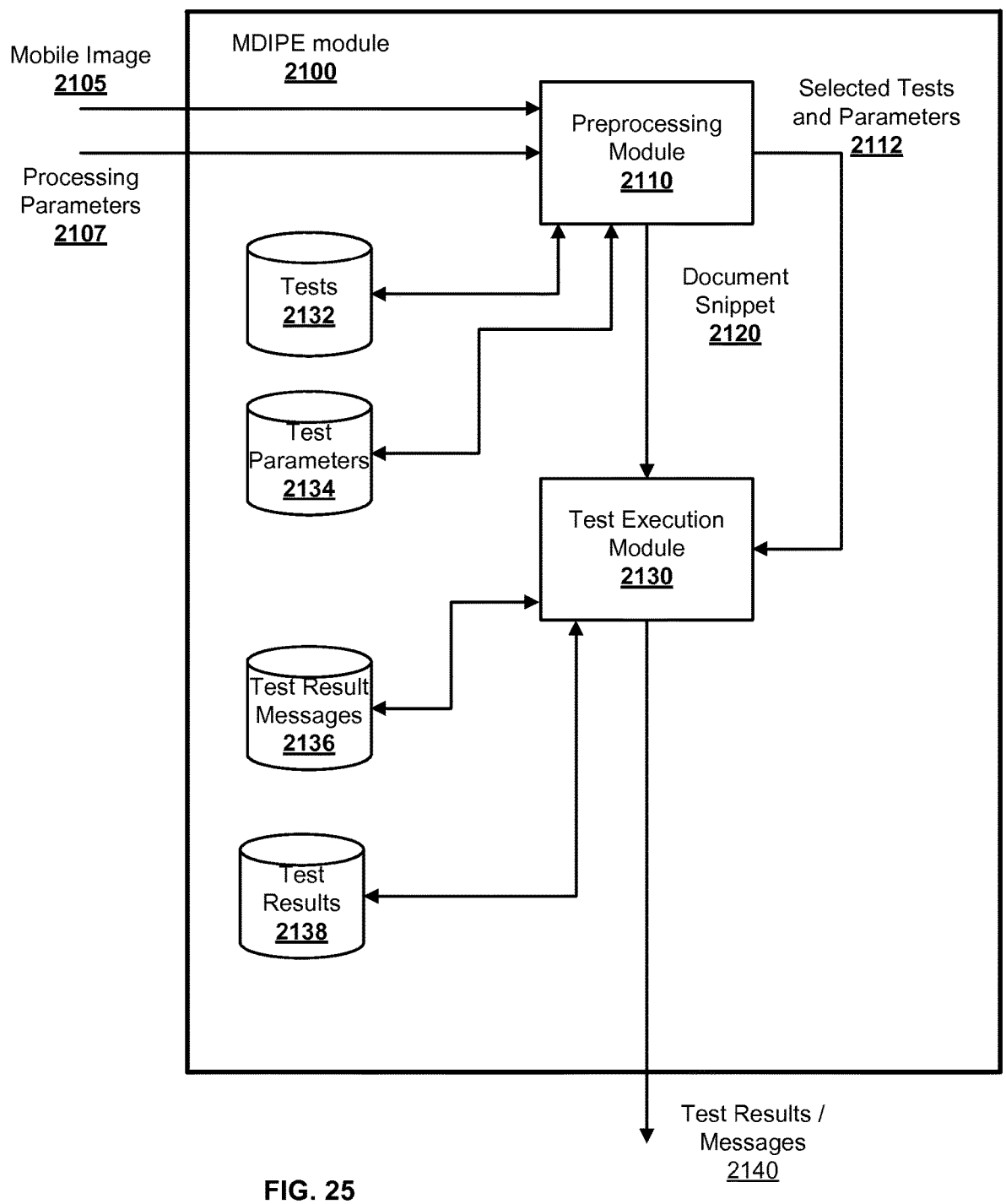
FIG. 25 illustrates a mobile document image processing engine (MDIPE) module for performing quality assurance testing on mobile document images according to an embodiment.

FIG. 25 illustrates a mobile document image processing engine (MDIPE) unit 2100 for performing quality assurance testing on mobile document images according to an embodiment. The MDIPE unit 2100 can receive a mobile document image captured by a mobile device, or multiple mobile images for some tests; perform preprocessing on the mobile document image; select tests to be performed on the mobile document image; and execute the selected tests to determine whether the quality of the image of a high enough quality for a particular mobile application. The MDIPE unit 2100 includes a preprocessing unit 2110 and test execution unit 2130. The preprocessing unit 2110 can be configured to receive a mobile image 2105 captured using a camera of a mobile device as well as processing parameters 2107. According to an embodiment, the mobile image 2105 and the processing parameters 2107 can be passed to MDIPE 2100 by a mobile application on the mobile device where the mobile application provides the mobile image 2105 to the MDIPE 2100 to have the quality of the mobile image 2105 assessed.

The processing parameters 2107 can include various information that the MDIPE 2100 can use to determine which tests to run on the mobile image 2105. For example, the processing parameters 2107 can identify the type of device used to capture the mobile image 2105, the type of mobile application that will be used to process the mobile image if the mobile image passes the IQA testing, or both. The MDIPE 2100 can use this information to determine which tests to select from test data store 2132 and which test parameters to select from test parameter data store 2134. For example, if a mobile image is being tested for a mobile deposit application that expects an image of a check, a specific set of tests related to assessing the image quality for a mobile image of a check can be selected, such as an MICR-line test, or a test for whether an image is blurry, etc. The MDIPE 2100 can also select test parameters from test parameters data store 2134 that are appropriate for the type of image to be processed, or for the type of mobile device that was used to capture the image, or both. In an embodiment, different parameters can be selected for different mobile phones that are appropriate for the type of phone used to capture the mobile image. For example, some mobile phones might not include an autofocus feature.

The preprocessing unit 2110 can process the mobile document image to extract a document snippet that includes the portion of the mobile document that actually contains the document to be processed. This portion of the mobile document image is also referred to herein as the document subimage. The preprocessing unit 2110 can also perform other processing on the document snippet, such as converting the image to a grayscale or bi-tonal document snippet, geometric correction of the document subimage to remove view distortion, etc. Different tests can require different types of preprocessing to be performed, and the preprocessing unit 2110 can produce mobile document snippets from a mobile document image depending on the types of mobile IQA tests to be executed on the mobile document image.

The test execution unit 2130 receives the selected tests and test parameters 2112 and the preprocessed document snippet (or snippets) 120 from the preprocessing mobile 110. The test execution unit 2130 executes the selected tests on the document snippet generated by the preprocessing unit 2110. The test execution unit 2130 also uses the test parameters provided by the preprocessing unit 2110 when executing the test on the document snippet. The selected tests can be a series of one or more tests to be executed on the document snippets to determine whether the mobile document image exhibits geometrical or other defects.

The test execution unit 2130 executes each selected test to obtain a test result value for that test. The test execution unit 2130 then compares that test result value to a threshold value associated with the test. If the test result value is equal to or exceeds the threshold, then the mobile image has passed the test. Otherwise, if the test result value is less than the threshold, the mobile document image has failed the test. According to some embodiments, the test execution unit 2130 can store the test result values for the tests performed in test results data store 2138.

According to an embodiment, the test threshold for a test can be stored in the test parameters data store 2134 and can be fetched by the preprocessing unit 2110 and included with the test parameters 2112 provided to the test execution unit 2130. According to an embodiment, different thresholds can be associated with a test based on the processing parameters 2107 received by the preprocessing unit 2110. For example, a lower threshold might be used for an image focus IQA test for image capture by camera phones that do not include an autofocus feature, while a higher threshold might be used for the image focus IQA test for image capture by camera phones that do include an autofocus feature.

According to an embodiment, a test can be flagged as "affects overall status." These tests are also referred to here as "critical" tests. If a mobile image fails a critical test, the MDIPE 2100 rejects the image and can provide detailed information to the mobile device user explaining why the image was not of a high enough quality for the mobile application and that provides guidance for retaking the image to correct the defects that caused the mobile document image to fail the test, in the event that the defect can be corrected by retaking the image.

According to an embodiment, the test result messages provided by the MDIPE 2100 can be provided to the mobile application that requested the MDIPE 2100 perform the quality assurance testing on the mobile document image, and the mobile application can display the test results to the user of the mobile device. In certain embodiments, the mobile application can display this information on the mobile device shortly after the user takes the mobile document image to allow the user to retake the image if the image is found to have defects that affect the overall status of the image. In some embodiments, where the MDIPE 2100 is implemented at least in part on the mobile device, the MDIPE 2100 can include a user interface unit that is configured to display the test results message on a screen of the mobile device.

FIG. 25 merely provides a description of the logical components of the MDIPE 2100. In some embodiments, the MDIPE 2100 can be implemented on the mobile device 340, in software, hardware, or a combination thereof. In other embodiments, the MDIPE 2100 can be implemented on the remote server, and the mobile device can send the mobile image 2105 and the processing parameters 2107, e.g., via a wireless interface, to the remote server for processing, and the remote server can send the test results and test messages 2140 to the mobile device to indicate whether the mobile image passed testing. In some embodiments, part of the functionality of the MDIPE 2100 can be implemented on the mobile device while other parts of the MDIPE 2100 are implemented on the remote server. The MDIPE 2100 can be implemented in software, hardware, or a combination thereof. In still other embodiments, the MDIPE 2100 can be implemented entirely on the remote server, and can be implemented using appropriate software, hardware, or a combination there.

Figure 26:
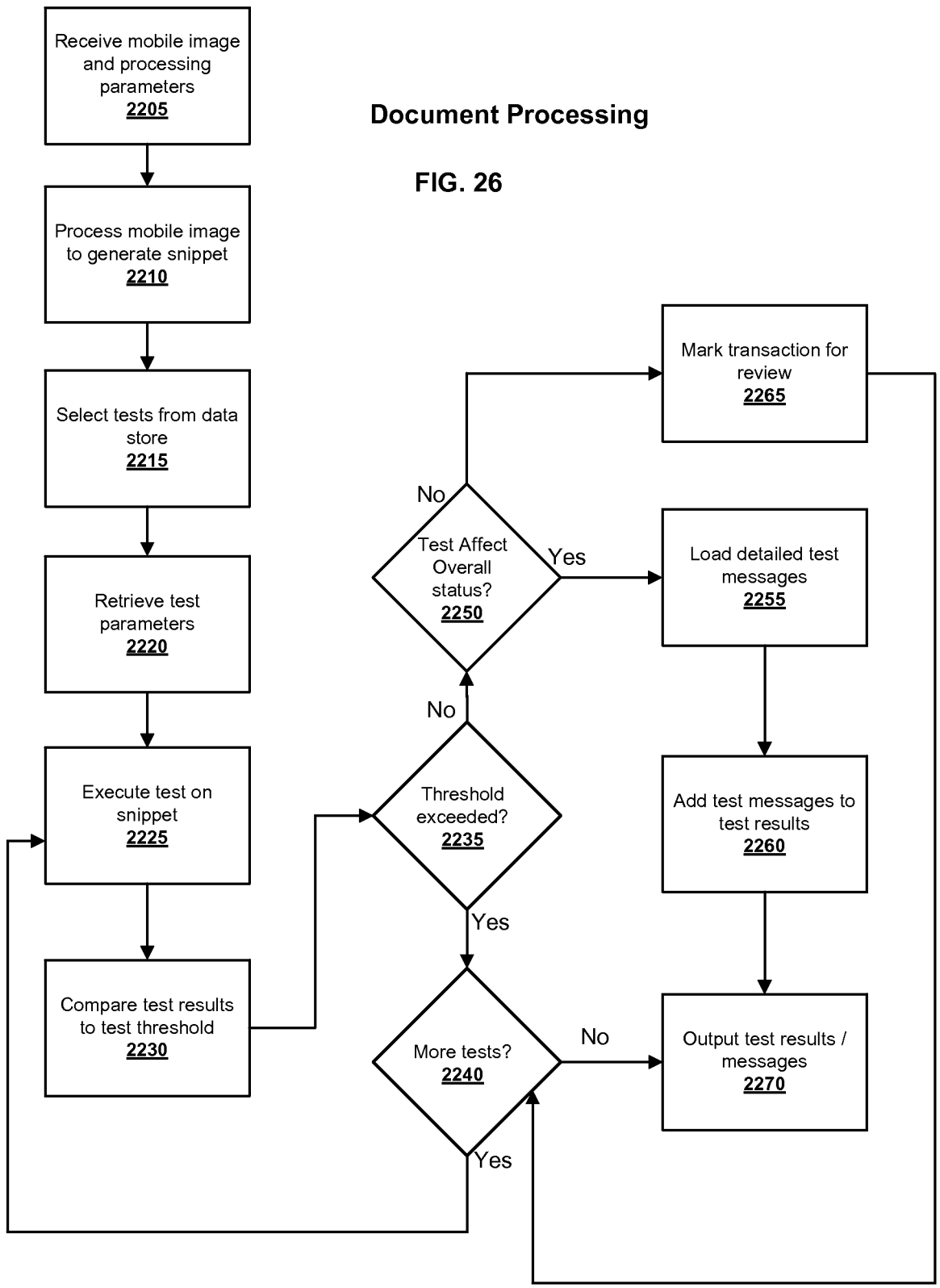
FIG. 26 is a flow diagram of a process for performing mobile image quality assurance on an image captured by a mobile device according to an embodiment.

FIG. 26 is a flow diagram of a process for performing mobile image quality assurance on an image captured by a mobile device according to an embodiment. The process illustrated in FIG. 26 can be performed using the MDIPE 2100 illustrated in FIG. 25.

The mobile image 2105 captured by a mobile device is received (step 2205). The mobile image 2105 can also be accompanied by one or more processing parameters 2107.

As described above, the MDIPE 2100 can be implemented on the mobile device, and the mobile image can be provided by a camera that is part of or coupled to the mobile device. In some embodiments, the MDIPE 2100 can also be implemented at least in part on a remote server, and the mobile image 2105 and the processing parameters 2107 can be transmitted to the remove server, e.g., via a wireless interface included in the mobile device.

Once the mobile image 2105 and the processing parameters 2107 have been received, the mobile image is processed to generate a document snippet or snippets (step 2210). For example, preprocessing unit 2110 of MDIPE 2100 can be used to perform various preprocessing on the mobile image. One part of this preprocessing includes identifying a document subimage in the mobile image. The subimage is the portion of the mobile document image that includes the document. The preprocessing unit 2110 can also perform various preprocessing on the document subimage to produce what is referred to herein as a "snippet." For example, some tests can require that a grayscale image of the subimage be created. The preprocessing unit 2110 can create a grayscale snippet that represents a grayscale version of the document subimage. In another example, some tests can require that a bitonal image of the subimage be created. The preprocessing unit 2110 can create a bitonal snippet that represents a bitonal version of the document subimage. In some embodiments, the MDIPE 2100 can generate multiple different snippets based on the types of tests to be performed on the mobile document image.

After processing the mobile document image to generate a snippet, the MDIPE 2100 then selects one or more tests to be performed on the snippet or snippets (step 2215). In an embodiment, the tests to be performed can be selected from test data store 2132. In an embodiment, the MDIPE 2100 selects the one or more tests based on the processing parameters 2107 that were received with the mobile image 2105.

After selecting the tests from the test data store 2132, test parameters for each of the tests can be selected from the test parameters data store 2134 (step 2220). According to an embodiment, the test parameters can be used to configure or customize the tests to be performed. For example, different test parameters can be used to configure the tests to be more or less sensitive to certain attributes of the mobile image. In an embodiment, the test parameters can be selected based on the processing parameters 2107 received with the mobile image 2105. As described above, these processing parameters can include information, such as the type of mobile device used to capture the mobile image as well as the type of mobile application that is going to be used to process the mobile image if the mobile image passes scrutiny of the mobile image IQA system.

Once the tests and the test parameters have been retrieved and provided to the test execution unit 2130, a test is selected from tests to be executed, and the test is executed on the document snippet to produce a test result value (step 2225). In some embodiments, more than one document snippet may be used by a test. For example, a test can be performed that tests whether images of a front and back of a check are actually images of the same document can be performed. The test engine can receive both an image of the front of the check and an image of the back of the check from the preprocessing unit 2110 and use both of these images when executing the test.

The test result value obtained by executing the test on the snippet or snippets of the mobile document is then compared to test threshold to determine whether the mobile image passes or fails the test (step 2230) and a determination is made whether the test results exceed the threshold (step 2235). According to an embodiment, the test threshold can be configured or customized based on the processing parameters 2107 received with the mobile image. For example, the test for image blurriness can be configured to use a higher threshold for passing if the image is to be used to for a mobile deposit application where the MICR-line information needs to be recognized and read from the document image. In contrast, the test for blurriness can be configured use a lower threshold for passing the mobile image for some mobile applications. For example, the threshold for image quality may be lowered for if a business card is being imaged rather than a check. The test parameters can be adjusted to minimize the number of false rejects and false accept rate, the number of images marked for reviewing, or both.

The "affects overall status" flag of a test can also be configured based on the processing parameters 2107. For example, a test can be marked as not affecting the overall status for some types of mobile applications or for documents being processed, or both. Alternatively, a test can also be marked as affecting overall status for other types of mobile applications or documents being processed, or both. For example, a test that identifies the MICR-line of a check can be marked as "affecting overall status" so that if the MICR-line on the check cannot be identified in the image, the image will fail the test and the image will be rejected. In another example, if the mobile application is merely configured to receive different types of mobile document image, the mobile application can perform a MICR-line test on the mobile document image in an attempt to determine whether the document that was imaged was a check. In this example, the MICR-line may not be present, because a document other than a check may have been imaged. Therefore, the MICR-line test may be marked as not "affecting overall status," and if a document fails the test, the transaction might be flagged for review but not marked as failed.

Since different camera phones can have cameras with very different optical characteristics, image quality may vary significantly between them. As a result, some image quality defects may be avoidable on some camera phones and unavoidable on the others and therefore require different configurations. To mitigate the configuration problem, Mobile IQA test can be automatically configured for different camera phones to use different tests, or different thresholds for the tests, or both. For example, as described above, a lower threshold can be used for an image focus IQA test on mobile document images that are captured using a camera phone that does not include an autofocus feature than would be used for camera phones that do include an autofocus feature, because it can be more difficult for a user to obtain as clear an image on using a device that doesn't an autofocus feature.

In certain embodiments, if the test result exceeded or equaled the threshold, the image passed the test and a determination is made whether there are more tests to be executed (step 2240). If there are more tests to be executed, the next test can be selected and executed on the document snippet (step 2225). Otherwise, if there were not more tests to be executed, the test results, or test messages, or both are output by MDIPE 2100 (step 2270). There can be one or more test messages included with the results if the mobile image failed one more of the tests that were executed on the image.

In such embodiments, if the test result was less than the threshold, then the mobile image has failed the test. A determination is made whether the test affects the overall status (step 250). If the test affects the overall status of the image, detailed test result messages that explain why the image failed the test can be loaded from the test message data store 134 (step 2255) and the test result messages can be added to the test results (step 2260). The test results and test messages can then be output by the MDIPE 2100 (step 2270).

Alternatively, if the test did not affect the overall status, the test results can be loaded noted and the transaction can be flagged for review (step 2265). By flagging the transaction for review, a user of a mobile device can be presented with information indicating that a mobile image has failed at least some of the test that were performed on the image, but the image still may be of sufficient quality for use with the mobile application. The user can then be presented with the option to retake the image or to send the mobile image to the mobile application for processing. According to some embodiments, detailed test messages can be loaded from the test message data store 134 for all tests that fail and can be included with the test results, even if the test is not one that affects the overall status of the mobile image.

According to some embodiments, the mobile IQA test can also be configured to eliminate repeated rejections of a mobile document. For example, if an image of a check is rejected as have too low a contrast by a contrast test, the image is rejected, and the user can retake and resubmit the image via the mobile application, the processing parameters 2107 received with the mobile image can include a flag indicating that the image is being resubmitted. In some embodiments, the thresholds associated with the tests that the image failed can be lowered to see if the image can pass the test with a lower threshold. In some embodiments, the thresholds are only lowered for non-critical tests. According to an embodiment, the processing parameters 2107 can also include a count of the number of times that an image has been resubmitted and the thresholds for a test are only lowered after a predetermined number of times that the image is resubmitted.

Figure 27:
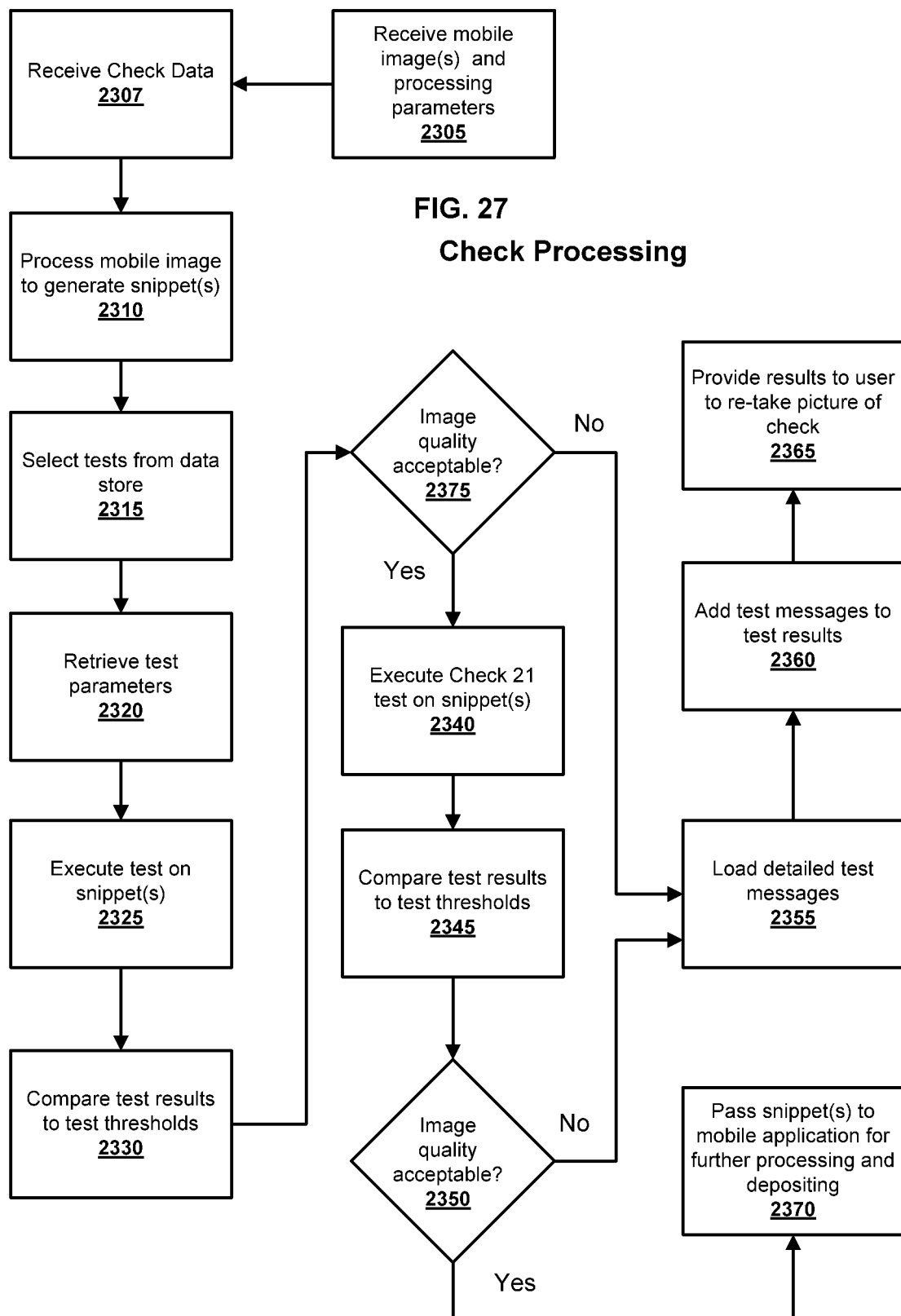
FIG. 27 is a flow diagram of a process for performing mobile image quality assurance on an image of a check captured by a mobile device according to an embodiment.

FIG. 27 is a flow diagram of a process for performing mobile image quality assurance on an image of a check captured by a mobile device according to an embodiment. Like the process illustrated in FIG. 26, the process illustrated in FIG. 27 can be performed using the MDIPE 2100 illustrated in FIG. 25. The method illustrated in FIG. 27 can be used where an image of a check is captured in conjunction with a remittance payment. The method illustrated in FIG. 27 can be used to assess the quality of the image of the check.

The method illustrated in FIG. 27 illustrates how the mobile IQA and MDIPE 2100 can be used with the electronic check processing provided under the Check Clearing for the 21st Century Act. The Check Clearing for the 21st Century Act (also referred to as the "Check 21 Act") is a United States federal law (Pub.L. 108-100) that was enacted on Oct. 28, 2003. The law allows the recipient of a paper check to create a digital version of the original check called a "substitute check," which can be processed, eliminating the need to process the original physical document. The substitute check includes an image of the front and back sides of the original physical document. The mobile IQA tests can be used check the quality of the images captured by a mobile device. The snippets generated by the MDIPE 2100 can then be further tested by one or more Check 21 mobile IQA tests that perform image quality assurance on the snippets to determine whether the images meet the requirements of the Check 21 Act as well.

The mobile image 2105 captured by a mobile device is received (step 2305). In an embodiment, image of the front and back sides of the check can be provided. The mobile image 2105 can also be accompanied by one or more processing parameters 2107. Check data can also be optionally received (step 2307). The check data can be optionally provided by the user at the time that the check is captured. This check data can include various information from the check, such as the check amount, check number, routing information from the face of the check, or other information, or a combination thereof. In some embodiments, a mobile deposition application requests this information from a user of the mobile device, allows the user to capture an image of a check or to select an image of a check that has already been captured, or both, and the mobile deposit information provides the check image, the check data, and other processing parameters to the MDIPE 2100.

Once the mobile image 2105, the processing parameters 2107, and the check data have been received, the mobile image is processed to generate a document snippet or snippets (step 2310). As described above, the preprocessing can produce one or more document snippets that include the portion of the mobile image in which the document was located. The document snippets can also have additional processing performed on them, such as conversion to a bitonal image or to grayscale, depending on the types of testing to be performed.

After processing the mobile document image to generate a snippet, the MDIPE 2100 then selects one or more tests to be performed on the snippet or snippets (step 2315). In an embodiment, the tests to be performed can be selected from test data store 2132. In an embodiment, the MDIPE 2100 selects the one or more tests based on the processing parameters 2107 that were received with the mobile image 2105.

After selecting the tests from the test data store 2132, test parameters for each of the tests can be selected from the test parameters data store 2134 (step 2320). As described above, the test parameters can be used to configure or customize the tests to be performed.

Once the tests and the test parameters have been retrieved and provided to the test execution unit 2130, a test is selected from tests to be executed, and the test is executed on the document snippet to produce a test result value (step 2325). In some embodiments, more than one document snippet can be used by a test. For example, a test can be performed that tests whether images of a front and back of a check are actually images of the same document can be performed. The test engine can receive both an image of the front of the check and an image of the back of the check from the preprocessing unit 2110 and use both of these images when executing the test. Step 2325 can be repeated until each of the tests to be executed is performed.

The test result values obtained by executing each test on the snippet or snippets of the mobile document are then compared to test threshold with that test to determine whether the mobile image passes or fails the test (step 2330) and a determination can be made whether the mobile image of the check passed the test indicating that image quality of mobile image is acceptable (step 2335). If the mobile document image of the check passed, the MDIPE 2100 passes then executes one or more Check 21 tests on the snippets (step 2340).

The test result values obtained by executing the Check 21 test or tests on the snippet or snippets of the mobile document are then compared to test threshold with that test to determine whether the mobile image passes or fails the test (step 2345) and a determination can be made whether the mobile image of the check passed the test indicating that image quality of mobile image is acceptable under the requirements imposed by the Check 21 Act (step 2350). Step 345 can be repeated until each of the Check 21 tests is performed. If the mobile document image of the check passed, the MDIPE 2100 passes the snippet or snippets to the mobile application for further processing (step 2370).

If the mobile document image of the check failed one or more mobile IQA or Check 21 tests, detailed test result messages that explain why the image failed the test can be loaded from the test message data store 134 (step 2355) and the test result messages can be added to the test results (step 2360). The test results and test messages are then output to the mobile application where they can be displayed to the user (step 2365). The user can use this information to retake the image of the check in an attempt to remedy some or all of the factors that caused the image of the check to be rejected.

Mobile IQA Tests

According to some embodiments, an Image Focus IQA Test can be executed on a mobile image to determine whether the image is too blurry to be used by a mobile application. Blurry images are often unusable, and this test can help to identify such out-of-focus images and reject them. The user can be provided detailed information to assist the user in taking a better quality image of the document. For example, the blurriness may have been the result of motion blur caused by the user moving the camera while taking the image. The test result messages can suggest that the user hold the camera steadier when retaking the image.

Mobile devices can include cameras that have significantly different optical characteristics. For example, a mobile device that includes a camera that has an auto-focus feature can generally produce much sharper images than a camera that does not include such a feature. Therefore, the average image focus score for different cameras can vary widely. As a result, the test threshold can be set differently for different types of mobile devices. As described above, the processing parameters 2107 received by MDIPE 2100 can include information that identifies the type of mobile device and/or the camera characteristics of the camera used with the device in order to determine what the threshold should be set to for the Image Focus IQA Test.

Figure 29A:
FIG. 29A illustrates an example of an in-focus mobile document image.
Figure 29B:
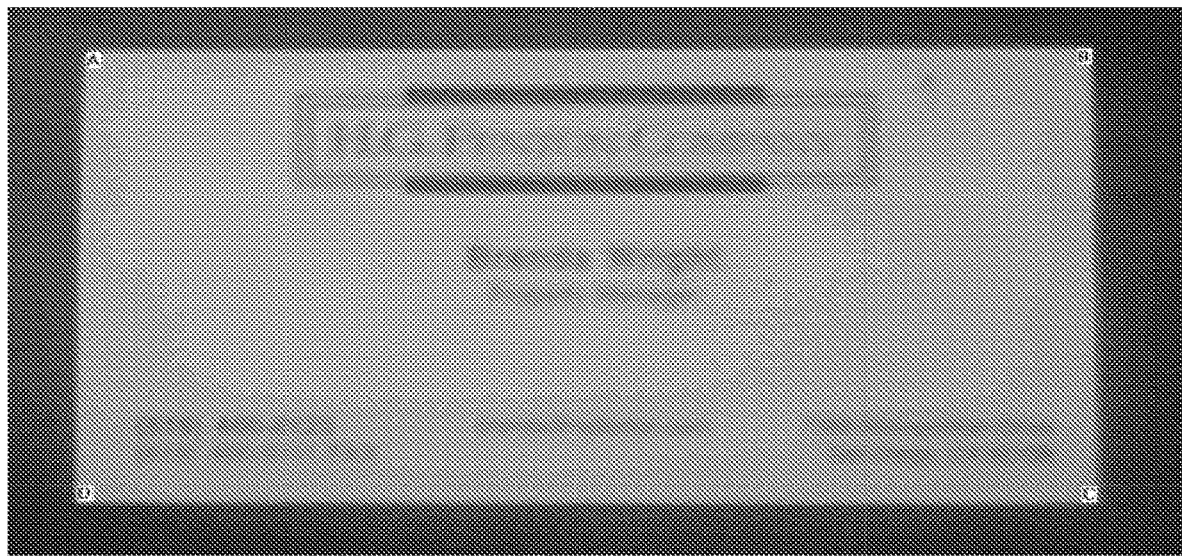
FIG. 29B illustrates an example of an out of focus document.

An in-focus mobile document image, such as that illustrated in FIG. 29A will receive a score of 1000, while an out of focus document, such as that illustrated in FIG. 29B will receive a much lower score, such as in the 50-100 range. Most of the time, images are not completely out of focus. Therefore, a score of 0 is uncommon.

According to an embodiment, the focus of the image can be tested using various techniques, and the results can then be normalized to the 0-1000 scale used by the MDIPE 2100.

In an embodiment, the Image Focus Score can be computed using the following technique: The focus measure is a ratio of maximum video gradient between adjacent pixels, measured over the entire image and normalized with respect to image's gray level dynamic range and "pixel pitch." According to an embodiment, the image focus score can be calculated using the following equation described in "The Financial Services Technology Consortium," Image Defect Metrics, IMAGE QUALITY & USABILITY ASSURANCE: Phase 1 Project, Draft Version 1.0.4. May 2, 2005, which is hereby incorporated by reference:

Image Focus Score=(Maximum Video Gradient)/
[(Gray Level Dynamic Range)*(Pixel Pitch)]

where Video Gradient=ABS[(Gray level for pixel "$i$")−(Gray level for pixel "$i+1$")]

Gray Level Dynamic Range=[(Average of the "$N$" Lightest Pixels)−(Average of the "$N$" Darkest Pixels)]

Pixel Pitch=[1/Image Resolution (in dpi)]

The variable N is equal to the number of pixels used to determine the average darkest and lightest pixel gray levels in the image. According to one embodiment, the value of N is set to 64. Therefore, the 64 lightest pixels in the image are averaged together and the 64 darkest pixels in the image are averaged together, to compute the "Gray Level Dynamic" range value. The resulting image focus score value is the multiplied by 10 in order to bring the value into the 0-1000 range used for the test results in the mobile IQA system.

The Image Focus Score determined using these techniques can be compared to an image focus threshold to determine whether the image is sufficiently in focus. As described above, the threshold used for each test may be determined at least in part by the processing parameters 2107 provided to MDIPE 2100. The Image Focus score can be normalized to the 0-1000 range used by the mobile IQA tests and compared to a threshold value associated with the test. If the Image Focus Score meets or exceeds this threshold, then the mobile document image is sufficiently focused for use with the mobile application.

Shadow Test

Shadows frequently occur on mobile photos taken in bright sunlight, where an object obstructing the direct sunlight causes a deep shadow on part of the document. This problem does not usually appear in an indoor setting, and certainly never on an image scanned in a constrained environment. Undetected or unrepaired shadows result in unusable images, increasing the number of rejected images. With advanced mobile imaging techniques, shadows can not only be detected, but often eliminated, preventing the need to ask the user to take the photo again According to some embodiments, a Shadow Test can be executed on a mobile image to determine whether a portion of the image is covered by a shadow. A shadow can render parts of a mobile image unreadable. This test helps to identify whether a shadow coverage a least a portion of a subimage in a mobile document image, and to reject images if the shadow has too much of an effect on the image quality, so that the user can attempt to take a better quality image of the document where the shadow is not present.

Figure 30:
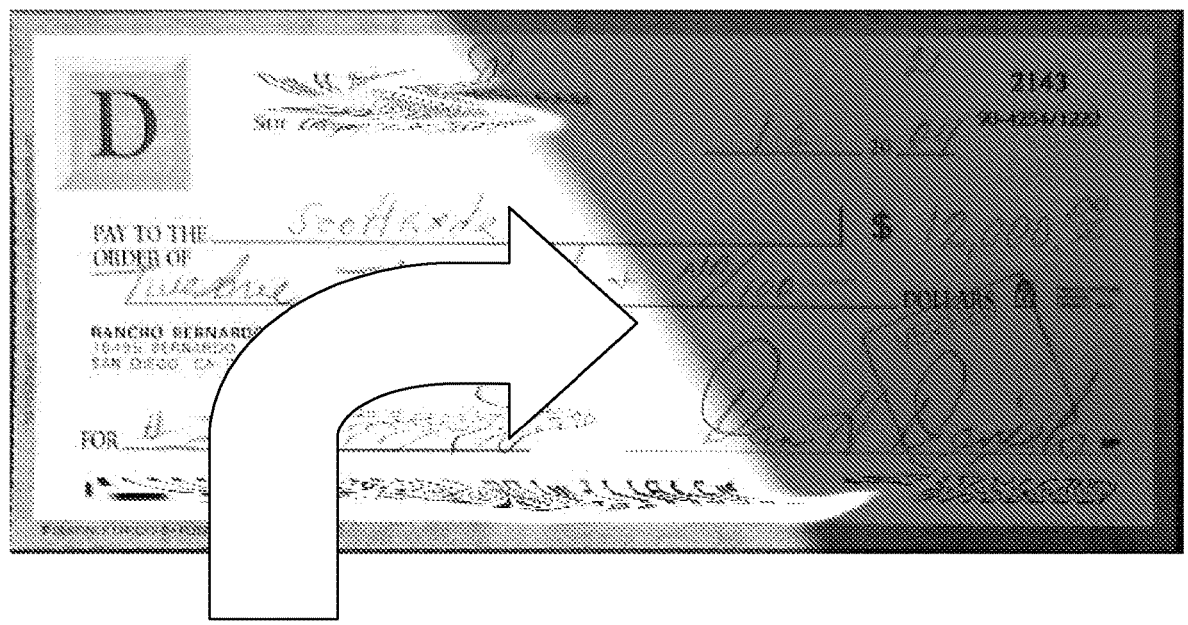
FIG. 30 illustrates an example of a shadowed document.

According to an embodiment, the presence of a shadow is measured by examining boundaries in the mobile image that intersect two or more sides of the document subimage. FIG. 30 illustrates an example of a shadowed document. The document subimage has been extracted from the mobile document image and converted to a grayscale snippet in this example. The shadow boundary clearly intersects the top and the bottom of the check pictured in the snippet.

The presence of shadows can be measured using the area and contrast. If a shadow covers the entire image, the result is merely an image that is darker overall. Such shadows generally do not worsen image quality significantly. Furthermore, shadows having a very small surface area also do not generally worsen image quality very much.

According to an embodiment, the Image Shadowed Score can be calculated using the following formula to determine the score for a grayscale snippet:

Image Shadowed score=1000 if no shadows were found, otherwise

Image Shadowed score=1000−min(Score($S[i]$)), where Score($S[i]$) is computed for every shadow $S[i]$ detected *on* the grayscale snippet In an embodiment, the Score for each shadow can be computed using the following formula:

Given shadow S[i] in the grayscale image, the score can be calculated Score($S[i]$) as Score($S[i]$)=2000*min(A[i]/A, 1−A[i]/A)*(Contrast/256), where A[i] is the area covered by shadow S[i] (in pixels), A is the entire grayscale snippet area (in pixels), and Contrast is the difference of brightness inside and outside of the shadow (the maximum value is 256).

Due to the normalization factor 2000, Score(S[i]) fits into 0-1000 range. It tends to assume larger values for shadows that occupy about ½ of the snippet area and have high contrast. Score(S[i]) is typically within 100-200 range. In an embodiment, the Image Shadowed score calculated by this test falls within a range of 0-1000 as do the test results from other tests. According to an embodiment, a typical mobile document image with few shadows will have a test result value in a range form 800-900. If no shadows are on are found the document subimage, then the score will equal 1000. The Image Shadowed score can then be compared to a threshold associated with the test to determine whether the image is of sufficiently high quality for use with the mobile application requesting the assessment of the quality of the mobile document image.

Contrast Test

According to some embodiments, a Contrast Test can be executed on a mobile image to determine whether the contrast of the image is sufficient for processing. One cause of poor contrast is images taken with insufficient light. A resulting grayscale snippet generated from the mobile document image can have low contrast, and if the grayscale snippet is converted to a binary image, the binarization unit can erroneously white-out part of the foreground, such as the MICR-line of a check, the code line of a remittance coupon, an amount, or black-out part of the background. The Contrast Test measures the contrast and rejects poor quality images, and instructs the user to retake the picture under brighter light to improve the contrast of the resulting snippets.

Figure 31:
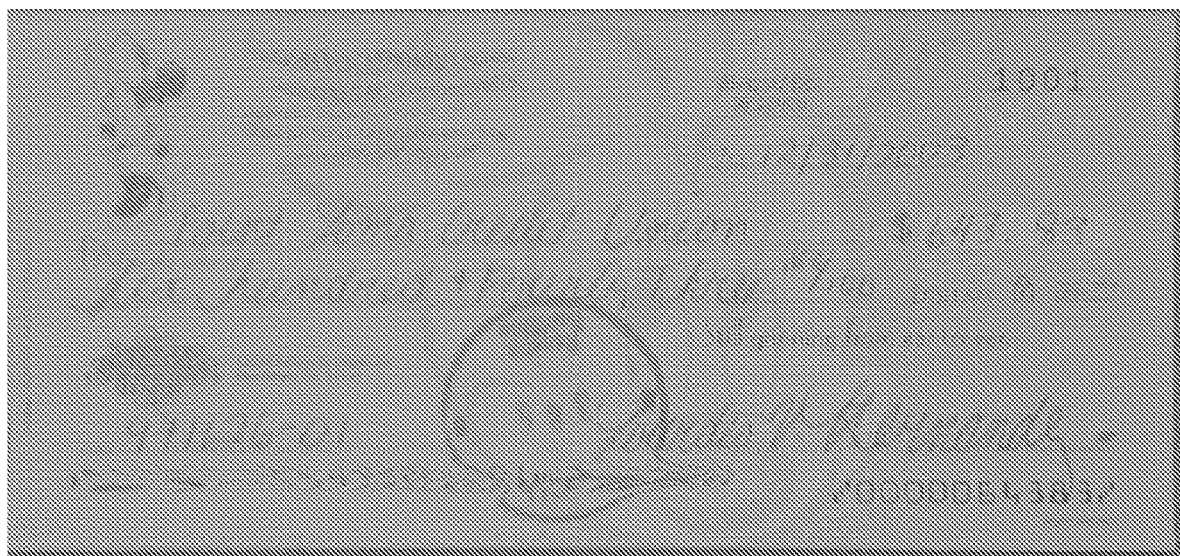
FIG. 31 illustrates an example of a grayscale snippet generated from a mobile document image of a check where the contrast of the image is very low according to an embodiment.
Figure 32:
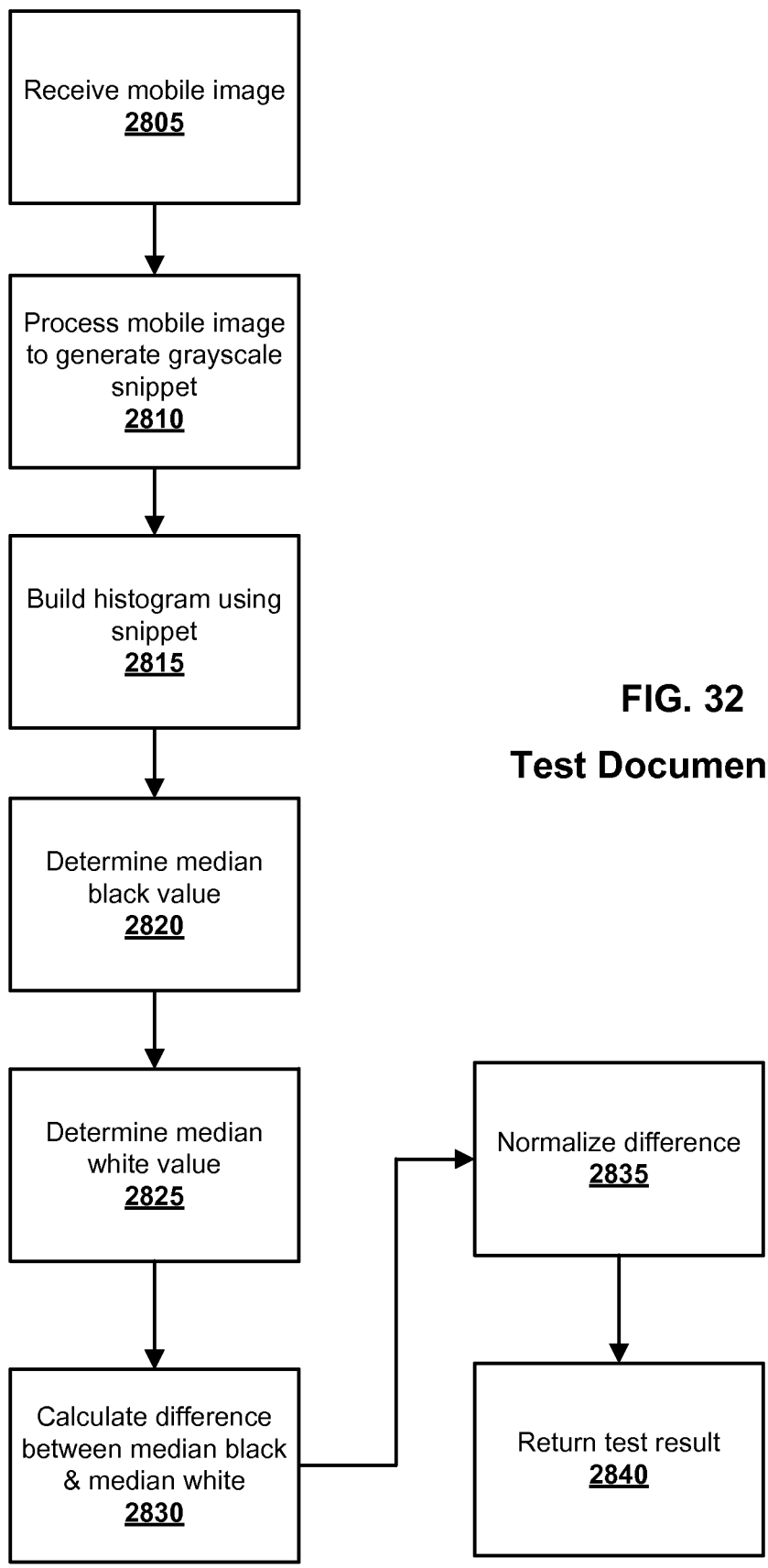
FIG. 32 illustrates a method for executing a Contrast IQA Test according to an embodiment.

FIG. 32 illustrates a method for executing a Contrast IQA Test according to an embodiment. The Contrast IQA Test illustrated in FIG. 32 is performed on a grayscale snippet generated from a mobile document image. The MDIPE 2100 receives the mobile image (step 2805) and generates a grayscale snippet that comprises a grayscale version of the document subimage (step 2810). FIG. 31 is an example of a grayscale snippet generated from a mobile document image of a check. As can be seen from FIG. 27, the contrast of the image is very low.

A histogram of the grayscale values in the grayscale snippet can then be built (step 2815). In an embodiment, the x-axis of the histogram is divided into bins that each represents a "color" value for the pixel in the grayscale image and the y-axis of the histogram represents the frequency of that color value in the grayscale image. According to an embodiment, the grayscale image has pixel in a range from 0-255, and the histogram is built by iterating through each value in this range and counting the number of pixels in the grayscale image having this value. For example, frequency of the "200" bin would include pixels having a gray value of 200.

A median black value can then be determined for the grayscale snippet (step 2820) and a median white value is also determined for the grayscale snippet (step 2825). The median black and white values can be determined using the histogram that was built from the grayscale snippet. According to an embodiment, the median black value can be determined by iterating through each bin, starting with the "0" bin that represents pure black and moving progressively toward the "250" bin which represents pure white. Once a bin is found that includes at least 20% of the pixels included in the image, the median black value is set to be the color value associated with that bin. According to an embodiment, the median white value can be determined by iterating through each bin, starting with the "255" bin which represents pure white and moving progressively toward the "0" bin which represents pure black. Once a bin is found that includes at least 20% of the pixels included in the image, the median white value is set to be the color value associated with that bin.

Once the median black and white values have been determined, the difference between the median black and white values can then be calculated (step 2830). The difference can then be normalized to fall within the 0-1000 test range used in the mobile IQA tests executed by the MDIPE 2100 (step 2835). The test result value can then be returned (step 2840). As described above, the test result value is provided to the test execution unit 2130 where the test result value can be compared to a threshold value associated with the test. See for example, FIG. 26, step 2230, described above. If the mobile image fails the Contrast IQA Test, the MDIPE 2100 can reject the image, and load detailed test messages from the test message data store 134 that include detailed instructions that how the user might retake the image.

Planar Skew Test

Figure 33A:
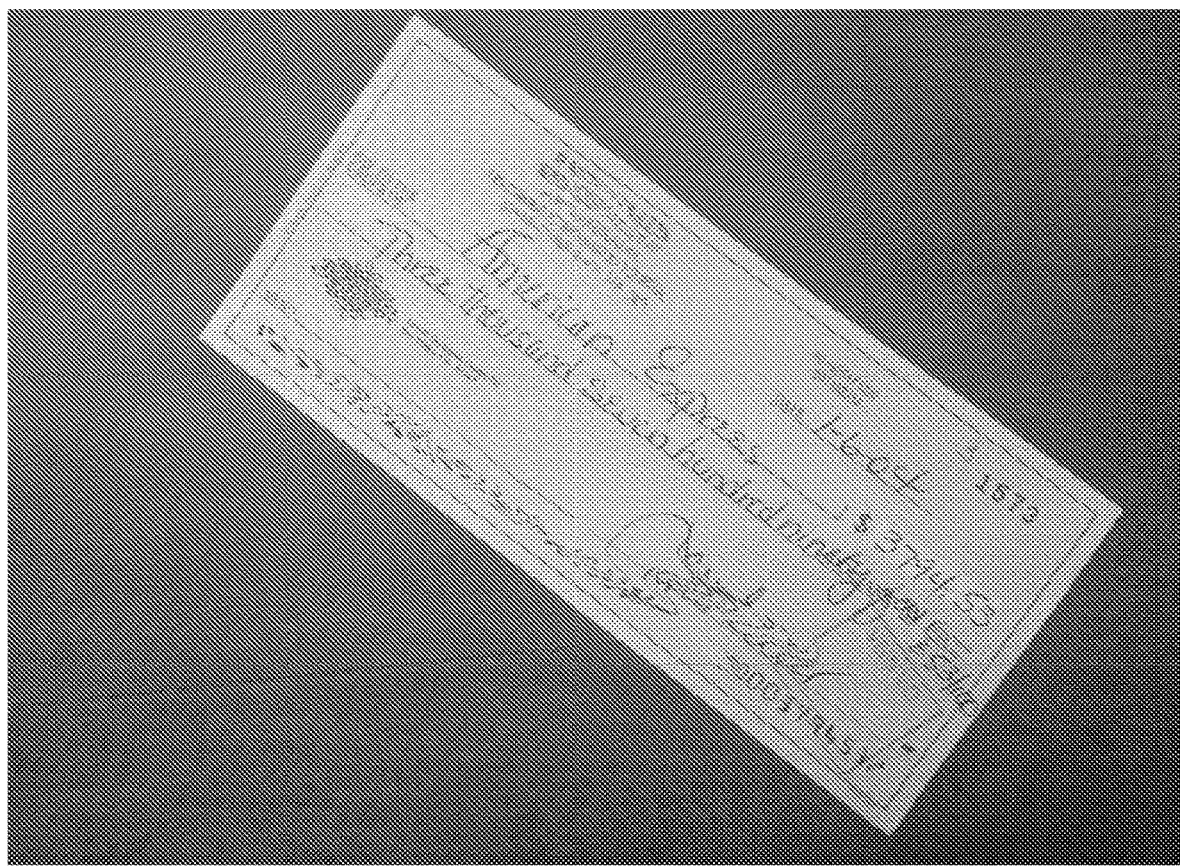
FIG. 33A is an example of a mobile document image that includes a check that exhibits significant planar skew according to an embodiment.

According to some embodiments, a Planar Skew Test can be executed on a mobile image to determine whether the document subimage is skewed within the mobile image. See FIG. 33A for an example of a mobile document image that includes a remittance coupon or check that exhibits significant planar skew. Planar skew does not result in distortion of the document subimage; however, in an embodiment, the subimage detection unit included in the preprocessing unit assumes that the document subimage is nearly horizontal in the mobile document image. If the skew becomes too extreme, for example approaching 45 degrees from horizontal, cropping errors could occur when the document subimage is extracted from the mobile document image.

Figure 28A:
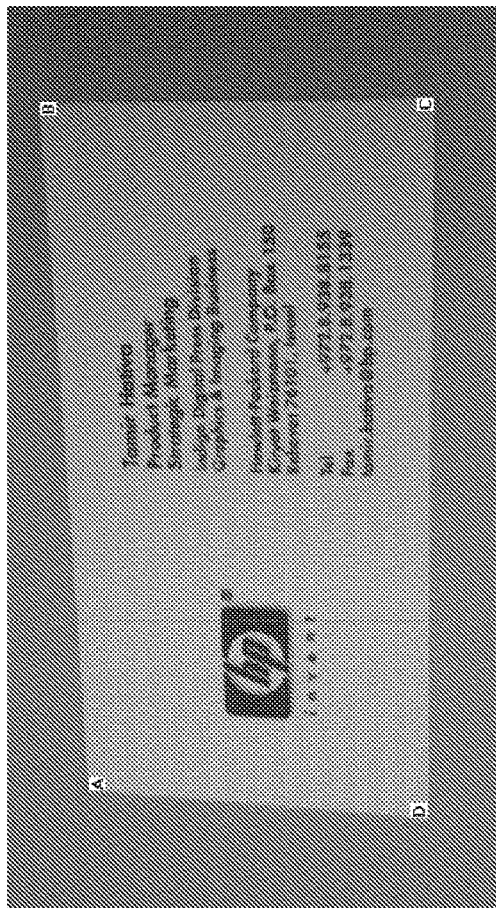
FIG. 28A illustrates a mobile image where the document captured in the mobile document image exhibits view distortion.
Figure 28B:
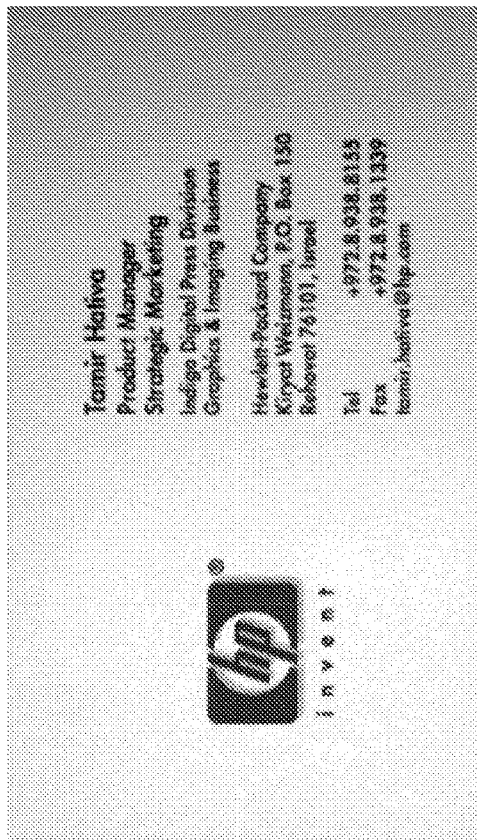
FIG. 28B illustrates an example of a grayscale geometrically corrected subimage generated from the distorted image in FIG. 28A according to an embodiment.

According to an embodiment, document skew can be measured by first identifying the corners of the document subimage using one of the techniques described above. The corners of the documents subimage can be identified by the preprocessing unit 130 when performing projective transformations on the subimage, such as that described above with respect to FIGS. 28A and 28B. Various techniques for detecting the skew of the subimage can be used. For example, techniques for detecting skew disclosed in the related '071 and '091 applications, can be used to detect the skew of the subimage. The results from the skew test can then be to fall within the 0-1000 test range used in the mobile IQA tests executed by the MDIPE 2100. The higher the skew of the document subimage, the lower the normalized test value. If the normalized test value falls below the threshold value associated with the test, the mobile document image can be rejected and the user can be provided detailed information from the test result messages data store 136 for how to retake the image and reduce the skew.

View Skew Test

Figure 33B:
FIG. 33B illustrates an example of a document subimage that exhibits view skew according to an embodiment.

"View skew" denotes a deviation from direction perpendicular to the document in mobile document image. Unlike planar skew, the view skew can result in the document subimage having perspective distortion. FIG. 33B illustrates an example of a document subimage that exhibits view skew. View skew can cause problems in processing the subimage if the view skew becomes too great, because view skew changes the width-to-height ratio of the subimage. This can present a problem, since the true dimensions of the document pictured in the subimage are often unknown. For example, remittance coupons and business checks can be various sizes and can have different width-to-height ratios. View skew can result in content recognition errors, such as errors in recognition of the MICR-line data on a check or CAR/LAR recognition (which stands for Courtesy Amount Recognition and Legal Amount Recognition) or errors in recognition of the code line of a remittance coupon. By measuring the view skew, the view skew test can be used to reject images that have too much view skew, which can help reduce false rejects and false accepts rates by addressing an issue that can be easily corrected by a user retaking the mobile document image.

Figure 34:
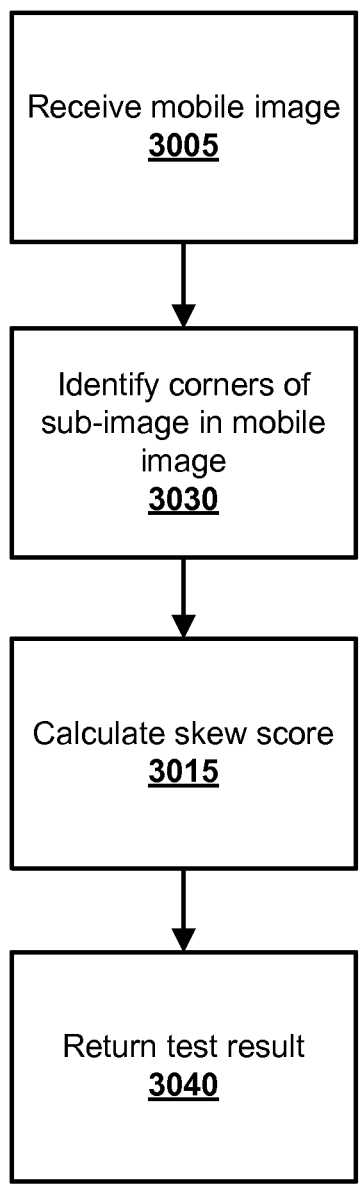
FIG. 34 is a flow chart illustrating a method for testing for view skew according to an embodiment.

FIG. 34 is a flow chart illustrating a method for testing for view skew according to an embodiment. The MDIPE 2100 receives the mobile image (step 3005) and identifies the corners of the document within the subimage (step 3010). A skew test score can then be determined for the document subimage (step 3015) and skew test score can then be returned (3040). As described above, the test result value can then be provided to the test execution unit 2130 where the test result value can be compared to a threshold value associated with the test.

According to an embodiment, the view skew of a mobile document can be determined using the following formula:

View Skew score=$1000-F(A,B,C,D)$, where $F(A,B,C,D)=500*\max(\text{abs}(|AB|-|CD|)/(|DA|+|BC|),$
$\text{abs}(|BC|-|DA|)/(|AB|+|CD|)),$ where |PQ| denotes the distance from point P to point Q, and the corners of the subimage are denoted as follows: A represents the top-left corner, B represents the top-right corner of the subimage, C represents the bottom-right corner of the subimage, and D represents the bottom-left corner of the subimage.

One can see that View Skew score can be configured to fit into [0, 1000] range used in the other mobile IQA tests described herein. In this example, the View Skew score is equal to 1000 when |AB|=|CD| and |BC|=|DA|, which is the case when there is no perspective distortion in the mobile document image and camera-to-document direction was exactly perpendicular. The View Skew score can then be compared to a threshold value associated with the test to determine whether the image quality is sufficiently high for use with the mobile application.

Cut Corner Test

Figure 35:
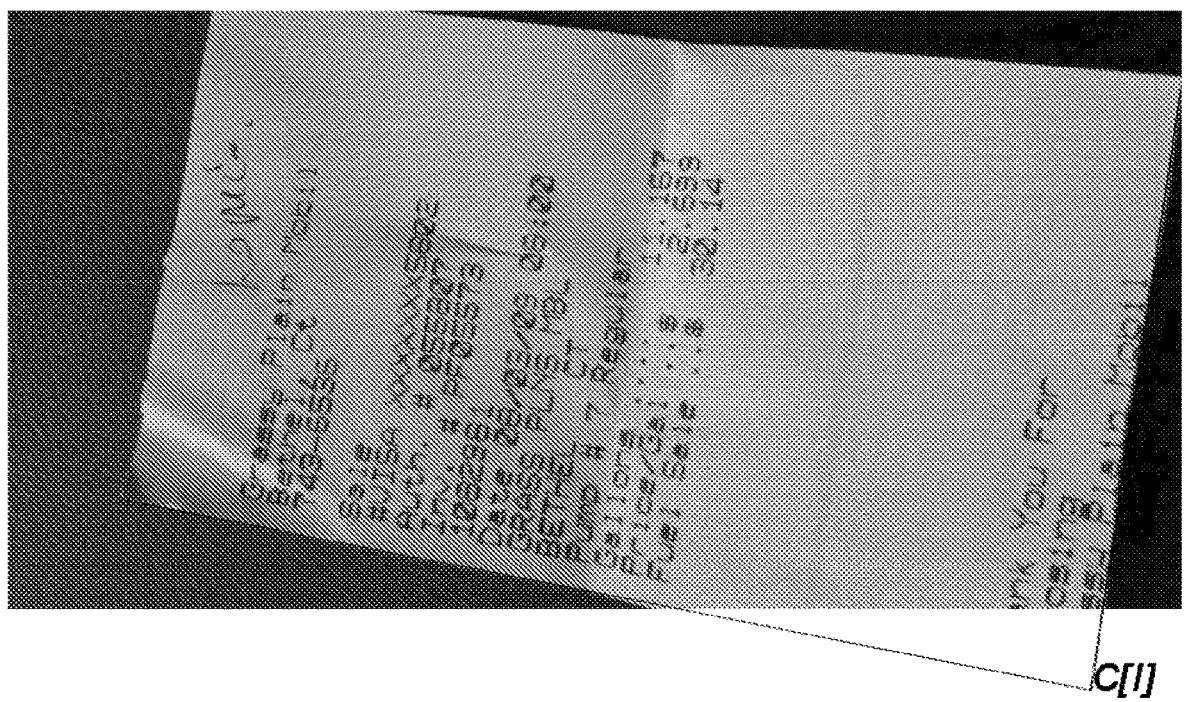
FIG. 35 illustrates an example of a mobile document image that features an image of a document where one of the corners of the document has been cut off in the picture.
Figure 36:
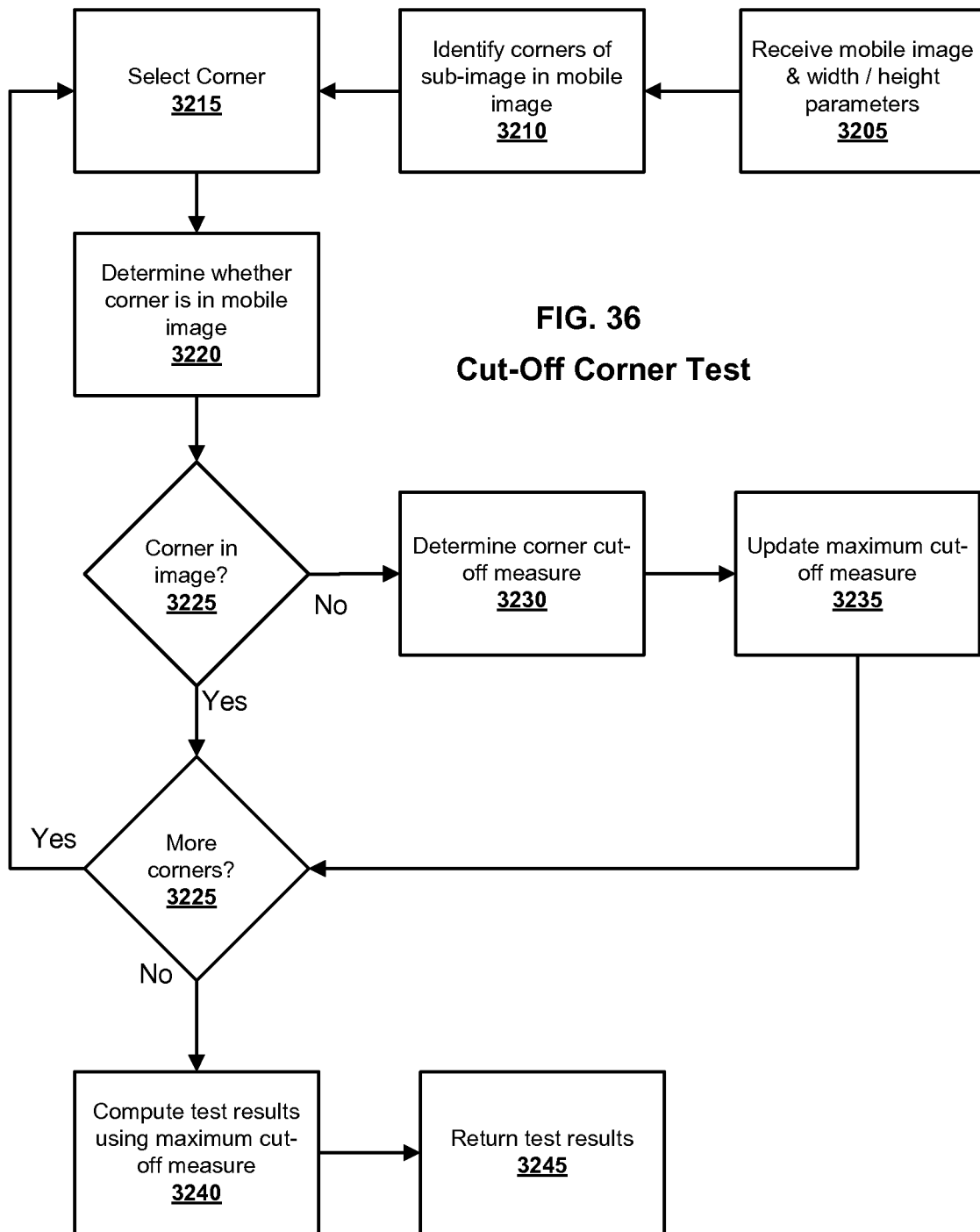
FIG. 36 illustrates a Cut-Off Corner Test that can be used for testing whether corners of a document in a document subimage have been cut off when the document was imaged according to an embodiment.

Depending upon how carefully the user framed a document when capturing a mobile image, it is possible that one or more corners of the document can be cut off in the mobile document image. As a result, important information can be lost from the document. For example, if the lower left-hand corner of a check is cut off in the mobile image, a portion of the MICR-line of a check or the code line of a remittance coupon might be cut off, resulting in incomplete data recognition. FIG. 35 illustrates an example of a mobile document image that features a receipt where one of the corners has been cut off FIG. 36 illustrates a Cut-Off Corner Test that can be used with embodiments of the MDIPE 2100 for testing whether corners of a document in a document subimage have been cut off when the document was imaged. The mobile image including height and width parameters are received (step 3205). In an embodiment, the height and width of the mobile image can be determined by the preprocessing unit 2110. The corners of the document subimage are then identified in the mobile document image (step 3210). Various techniques can be used to identify the corners of the image, including the various techniques described above. In an embodiment, the preprocessing unit 2110 identifies the corners of the document subimage. As illustrated in FIG. 15, one or more of the corners of a document can be cut off. However, the preprocessing unit 2110 can be configured to determine what the location of the corner should have been had the document not been cut off using the edges of the document in the subimage. FIG. 35 illustrates how the preprocessing unit 2110 has estimated the location of the missing corner of the document by extending lines from the sides of the document out to the point where the lines intersect. The preprocessing unit 2110 can then provide the corners information for the document to the test execution unit 2130 to execute the Cut-Off Corner IQA Test. In an embodiment, test variables and the test results values to be returned by the test are set to default values: the test value V to be returned from the test is set to a default value of 1000, indicating that all of the corners of the document are within the mobile document image, and a maximum cut off variable (MaxCutOff) is set to zero indicating that no corner was cut off.

A corner of the document is selected (step 3220). In an embodiment, the four corners are received as an array of x and y coordinates C[I], where I is equal to the values 1-4 representing the four corners of the document.

A determination is made whether the selected corner of the document is within the mobile document image (step 3225). The x & y coordinates of the selected corner should be at or between the edges of the image. According to an embodiment, the determination whether a corner is within the mobile document image can be determined using the following criteria: (1) $C[I].x >= 0$ & $C[I].x <= Width$, where Width=the width of the mobile document image and $C[I].x$=the x-coordinate of the selected corner; and (2) $C[I].y >= 0$ & $C[I].y <= Height$, where Height=the height of the mobile document image and $C[I].y$=the y-coordinate of the selected corner.

If the selected corner fails to satisfy the criteria above, the corner is not within the mobile image and has been cut-off. A corner cut-off measurement is determined for the corner (step 3230). The corner cut-off measurement represents the relative distance to the edge of the mobile document image. According to an embodiment, the corner cut-off measurement can be determined using the following:

(1) Set H[I] and V[I] to zero, where H[I] represents the horizontal normalized cut-off measure and V[I] represents the vertical normalized cut-off measure.
(2) If $C[I].x<0$, then set $H[I]=-1000*C[I].x/Width$
(3) If $C[I].x>Width$, set $H[I]=1000*(C[I].x-Width)/Width$, where Width is the width of the mobile image
(4) If $C[I].y<0$, set $V[I]=-1000*C[I].y/Height$, where Height is the height of the mobile image
(5) If $C[I].y>Height$, set $V[I]=1000*(C[I].y-Height)/Height$
(6) Normalize H[I] and V[I] to fall within the 0-1000 range used by the mobile IQA tests by setting $H[I]=\min(1000, H[I])$ and $V[I]=\min(1000, V[I])$
(7) Set $CutOff[I]=\min(H(I), V(I))$, which is the normalized cut-off measure of the corner. One can see that the CutOff[I] lies within [0-1000] range used by the mobile IQA tests and the value increases as the corner moves away from mobile image boundaries.

An overall maximum cut-off value is also updated using the normalized cut-off measure of the corner (step 3235). According to an embodiment, the following formula can be used to update the maximum cut-off value: $MaxCutOff=\max(MaxCutOff, CutOff[I])$. Once the maximum cut-off value is determined, a determination is made whether more corners are to be tested (step 3225).

If the selected corner satisfies the criteria above, the corner is within the mobile document image and is not cut-off. A determination is then made whether there are additional corners to be tested (step 3225). If there are more corners to be processed, a next corner to be test is selected (step 3215). Otherwise, if there are no more corners to be tested, the test result value for the test is computing using the maximum test cut-off measurement. In an embodiment, the test result value $V=1000-MaxCutOff$ One can see that V lies within [0-1000] range for the mobile IQA tests and is equal to 1000 when all the corners are inside the mobile image and decreases as one or more corner move outside of the mobile image.

The test result value is then returned (3245). As described above, the test result value is provided to the test execution unit 2130 where the test result value can be compared to a threshold value associated with the test. If the test result value falls below the threshold associated with the test, detailed test result messages can be retrieved from the test result message data store 136 and provided to the user to indicate why the test failed and what might be done to remedy the test. The user may simply need to retake the image with the document corners within the frame.

Cut-Side Test

Depending upon how carefully the user framed a document when capturing a mobile image, it is possible that one or more sides of the document can be cut off in the mobile document image. As a result, important information can be lost from the document. For example, if the bottom a check is cut off in the mobile image, the MICR-line might be cut off, rendering the image unusable for a Mobile Deposit application that uses the MICR information to electronically deposit checks. Furthermore, if the bottom of a remittance coupon is cut off in the mobile image, the code line may be missing, the image may be rendered unusable by a Remittance Processing application that uses the code information to electronically process the remittance.

Figure 37:
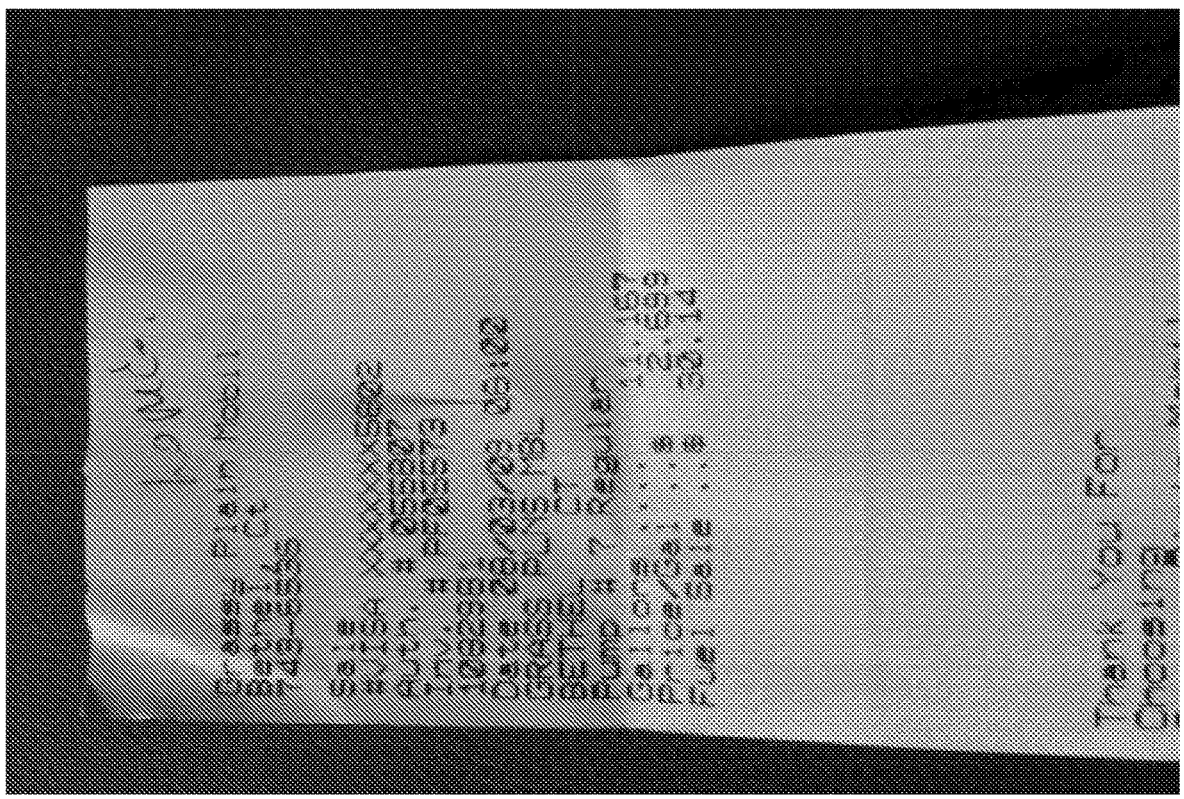
FIG. 37 illustrates an example of a mobile document image that features a document where one of the ends of the document has been cut off in the image.

FIG. 37 illustrates an example of a mobile document image that features a receipt where one of the ends of the receipt has been cut off in the image. Unlike the Cut-Corner Test described above which can be configured to allow a document to pass if the amount of cut-off falls is small enough that the document image still receives a test score that meets or exceeds the threshold associated with the test, the Cut-Side Test is either pass or fail. If one or more sides of the document subimage are cut off in the mobile document image, the potential to lose critical information is too high, and mobile document is marked as failing.

Figure 38:
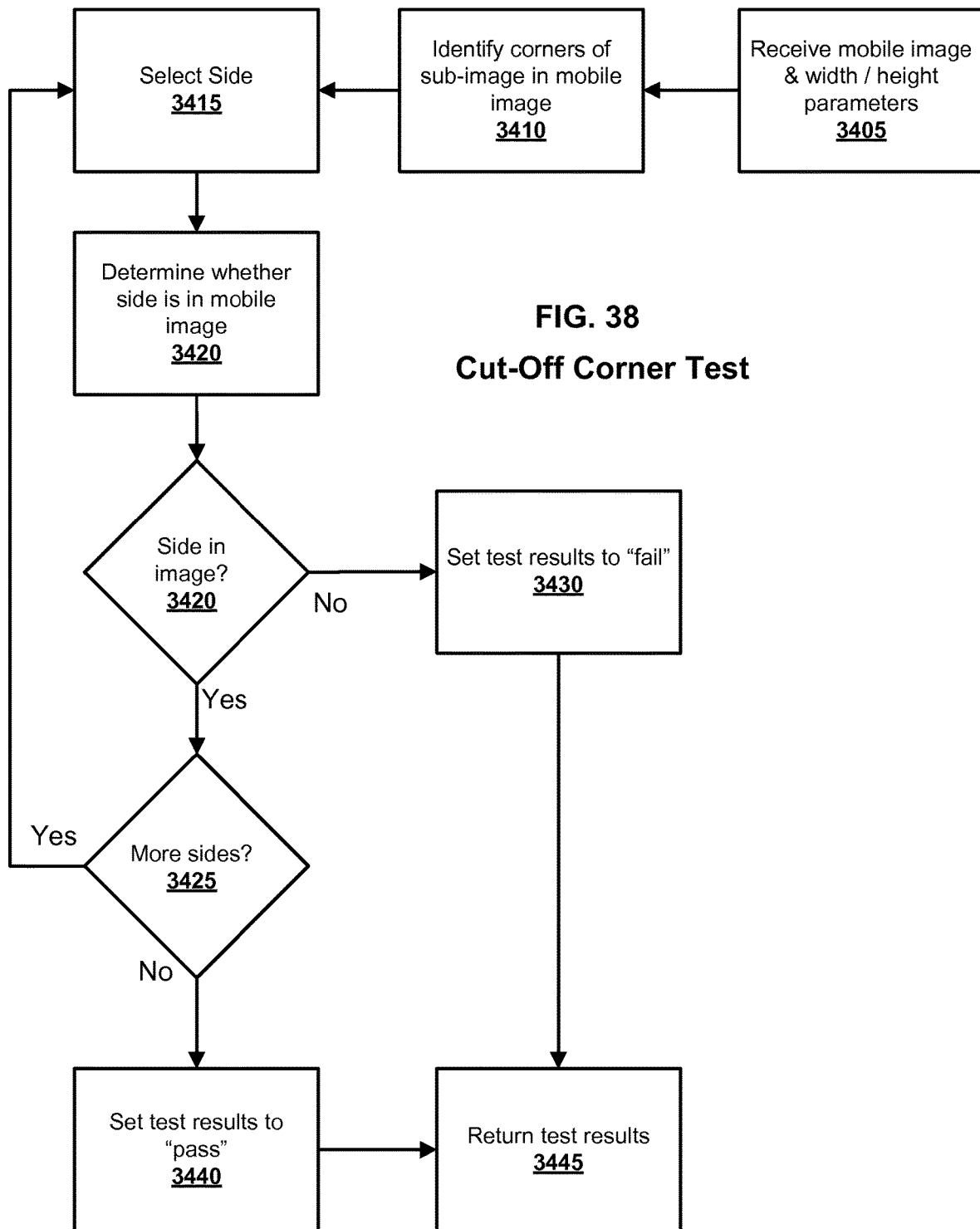
FIG. 38 is a flow diagram of a method for determining whether one or more sides of the document are cut off in the document subimage according to an embodiment.
Figure 39:
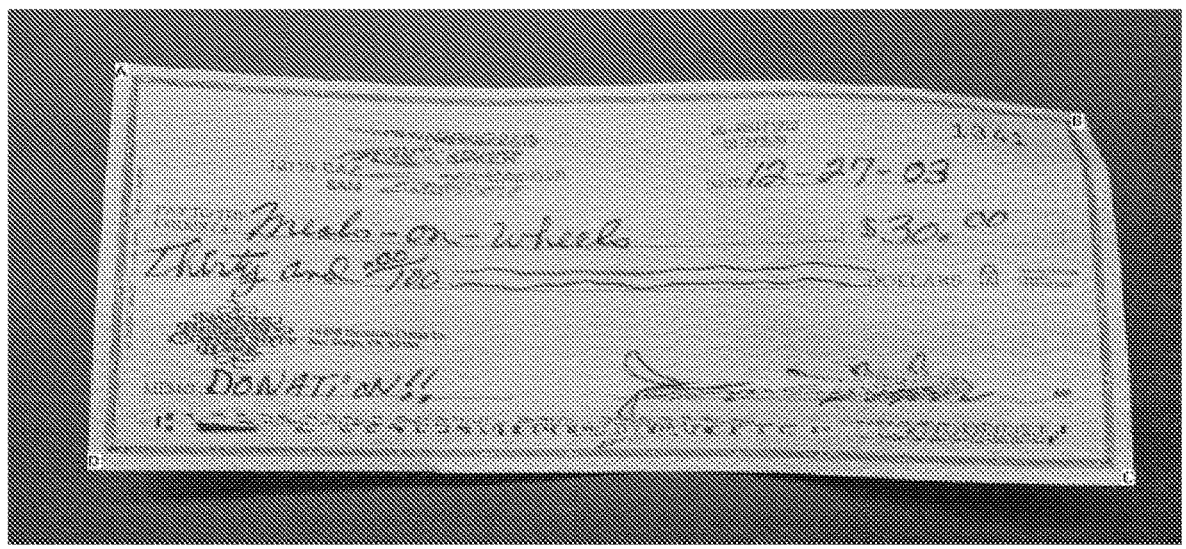
FIG. 39 illustrates an example of a mobile document image where the document is warped according to an embodiment.

FIG. 38 is a flow diagram of a method for determining whether one or more sides of the document are cut off in the document subimage according to an embodiment. The mobile image is received (step 3405). In an embodiment, the height and width of the mobile image can be determined by the preprocessing unit 2110. The corners of the document subimage are then identified in the mobile document image (step 3410). Various techniques can be used to identify the corners of the image, including the various techniques described above. In an embodiment, the preprocessing unit 2110 identifies the corners of the document subimage.

A side of the document is selected (step 3420). In an embodiment, the four corners are received as an array of x and y coordinates C[I], where I is equal to the values 1-4 representing the four corners of the document.

A determination is made whether the selected corner of the document is within the mobile document image (step 3425). According to an embodiment, the document subimage has four side and each side S[I] includes two adjacent corners C1[I] and C2[I]. A side is deemed to be cut-off if the corners comprising the side are on the edge of the mobile image. In an embodiment, a side of the document is cut-off if any of the following criteria are met:

(1) C1[I].x=C2[I].x=0, where x=the x-coordinate of the corner
(2) C1[I].x=C2[I].x=Width, where Width=the width of the mobile image
(3) C1[I].y=C2[I].y=0, where y=the y-coordinate of the corner
(4) C1[I].y=C2[I].y=Height, where Height=the height of the mobile image If the side does not fall within the mobile image, the test result value is set to zero indicating that the mobile image failed the test (step 3430), and the test results are returned (step 3445).

If the side falls within the mobile image, a determination is made whether there are more sides to be tested (step 3425). If there are more sides to be tested, an untested side is selected (step 3415). Otherwise, all of the sides were within the mobile image, so the test result value for the test is set to 1000 indicating the test passed (step 3440), and the test result value is returned (step 3445).

Warped Image Test

In real life, paper documents are often warped (folded) in various, irregular ways due to long and/or careless handling. Traditional scanners deal with this situation by physically smoothing out the paper during scanning by pressing it between two flat surfaces. However, this is not the case with a mobile photo of a warped paper document. Failure to de-warp results in an unreadable document. Without advanced de-warping techniques, a large number of all document images will be rejected by the bank's processing system (or flagged for manual processing), since the information on them cannot be extracted automatically. This leads to a large proportion of rejected or failed payments and increased labor costs, frustrated users and damage to the bank's reputation and business The warped image test identifies images where document is warped. FIG. 39 illustrates an example of a mobile document image where the document is warped. In some embodiments, the preprocessing unit 2110 can be configured to include de-warping functionality for correcting warped images. However, in some embodiments, a Warped Image Test is provided to detect and reject warped images. One solution for correcting warped images is to instruct the user to retake the image after flattening the hardcopy of the document being imaged.

Figure 40:
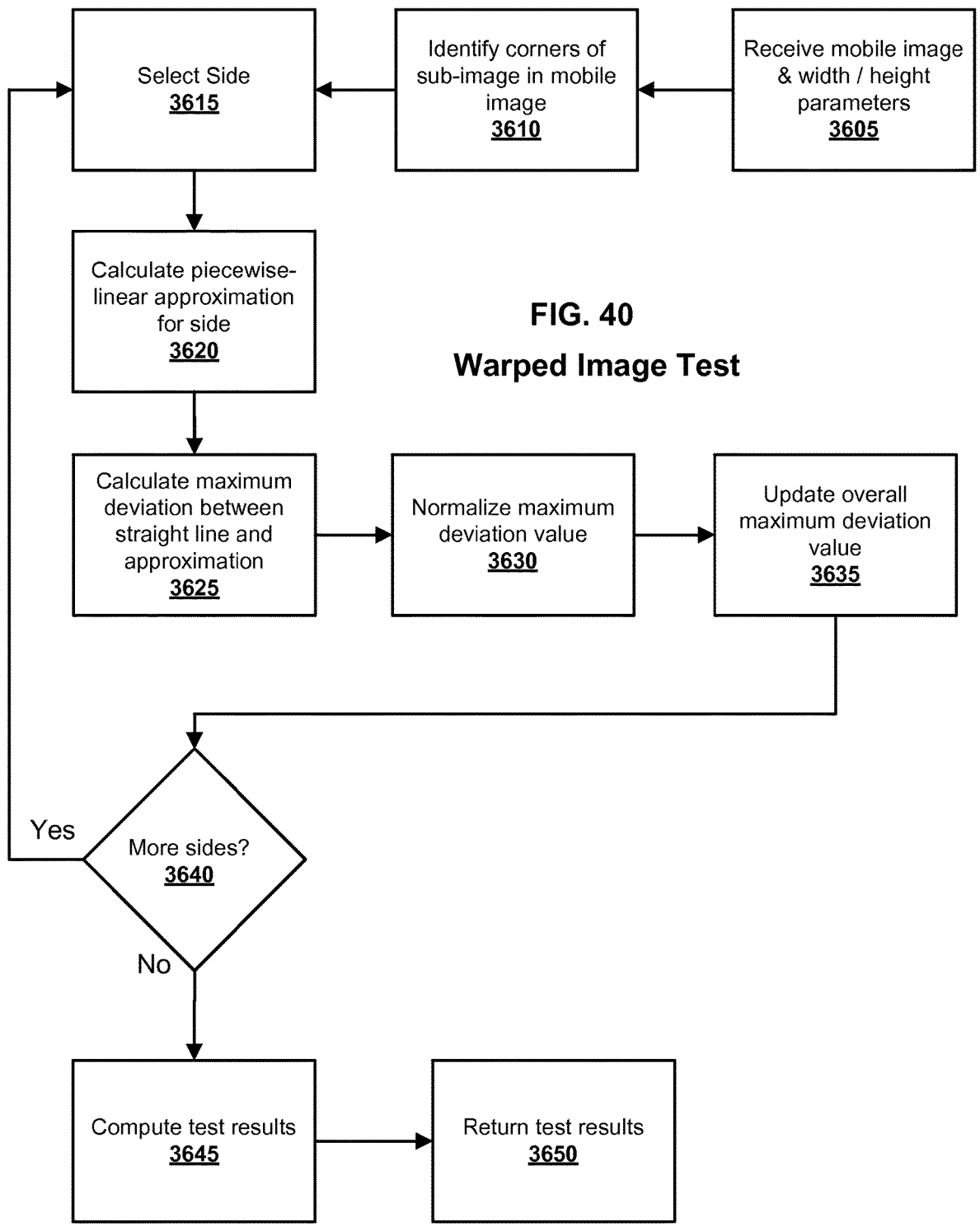
FIG. 40 is a flow diagram of a method for identifying a warped image and for scoring the image based on how badly the document subimage is warped according to an embodiment.

FIG. 40 is a flow diagram of a method for identifying a warped image and for scoring the image based on how badly the document subimage is warped according to an embodiment. A warped image test score value is returned by the test, and this value can be compared with a threshold value by the test execution unit 2130 to determine whether the image warping is excessive.

The mobile image is received (step 3605). In an embodiment, the height and width of the mobile image can be determined by the preprocessing unit 2110. The corners of the document subimage are then identified in the mobile document image (step 3610). Various techniques can be used to identify the corners of the image, including the various techniques described above. In an embodiment, the preprocessing unit 2110 identifies the corners of the document subimage.

A side of the document is selected (step 3615). According to an embodiment, the document subimage has four side and each side S[I] includes two adjacent corners C1[I] and C2[I].

A piecewise linear approximation is built for the selected side (step 3620). According to an embodiment, the piecewise-linear approximation is built along the selected side by following the straight line connecting the adjacent corners C1[I] and C2[I] and detecting position of the highest contrast starting from any position within [C1[I], C2[I]] segment and moving in orthogonal direction.

After the piecewise linear approximation is built along the [C1[I], C2[I]] segment, the [C1[I], C2[I]] segment is walked to compute the deviation between the straight line and the approximation determined using piecewise linear approximation (step 3625). Each time the deviation is calculated, a maximum deviation value (MaxDev) is updated to reflect the maximum deviation value identified during the walk along the [C1[I], C2[I]] segment.

The maximum deviation value for the side is then normalized to generate a normalized maximized deviation value for the selected size of the document image (step 3630). According to an embodiment, the normalized value can be determined using the following formula:

NormMaxDev[*I*]=1000*MaxDev[*I*]/Dim, where *Dim* is the mobile image dimension perpendicular to side S[*I*].

An overall normalized maximum deviation value is then updated using the normalized deviation value calculated for the side. According to an embodiment, the overall maximum deviation can be determined using the formula:

OverallMaxDeviation=max(OverallMaxDeviation, NormMaxDev[*I*])

A determination is then made whether there are anymore sides to be tested (step 3640). If there are more sides to be tested, an untested side is selected for testing (step 3615). Otherwise, if no untested sides remain, the warped image test value is computed. According to an embodiment, the warped image test value can be determined using the following formula:

$$V=1000-\text{OverallMaxDeviation}$$

One can see that V lies within [0-1000] range used by the image IQA system and is equal to 1000 when the sides S[I] are straight line segments (and therefore no warp is present). The computed test result is then returned (step 3650). As described above, the test result value is provided to the test execution unit 2130 where the test result value can be compared to a threshold value associated with the test. If the test result value falls below the threshold associated with the test, detailed test result messages can be retrieved from the test result message data store 136 and provided to the user to indicate why the test failed and what might be done to remedy the test. For example, the user may simply need to retake the image after flattening out the hardcopy of the document being imaged in order to reduce warping.

Image Size Test

The Image Size Test detects the actual size and the effective resolution of the document subimage. The perspective transformation that can be performed by embodiments of the preprocessing unit 2110 allows for a quadrangle of any size to be transformed into a rectangle to correct for view distortion. However, a small subimage can cause loss of detail needed to process the subimage.

Figure 41:
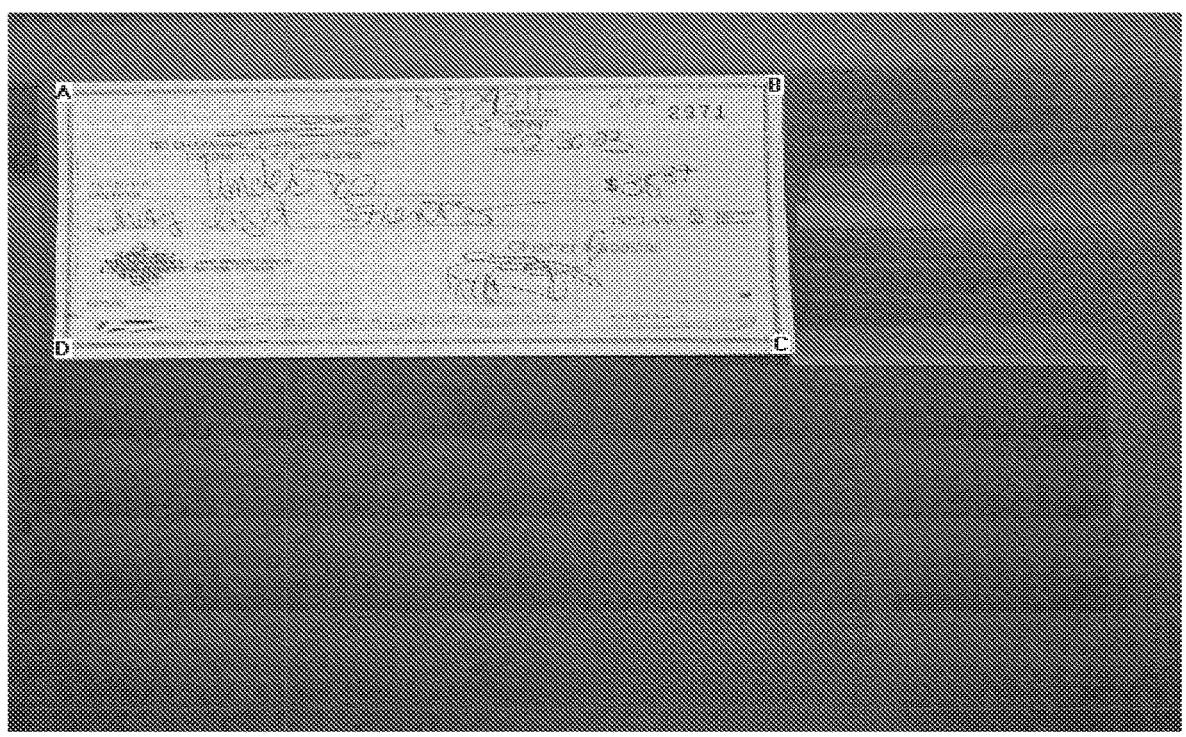
FIG. 41 illustrates an example of a document subimage within a mobile document image that is relatively small in comparison to the overall size of the mobile document image according to an embodiment.

FIG. 41 illustrates an example of a document subimage within a mobile document image that is relatively small. Small size of the subimage can cause the loss of important foreground information. This effect is similar to digital zooming in a digital camera where image of an object becomes larger, but the image quality of object can significantly degrade due to loss of resolution and important details can be lost.

Figure 42:
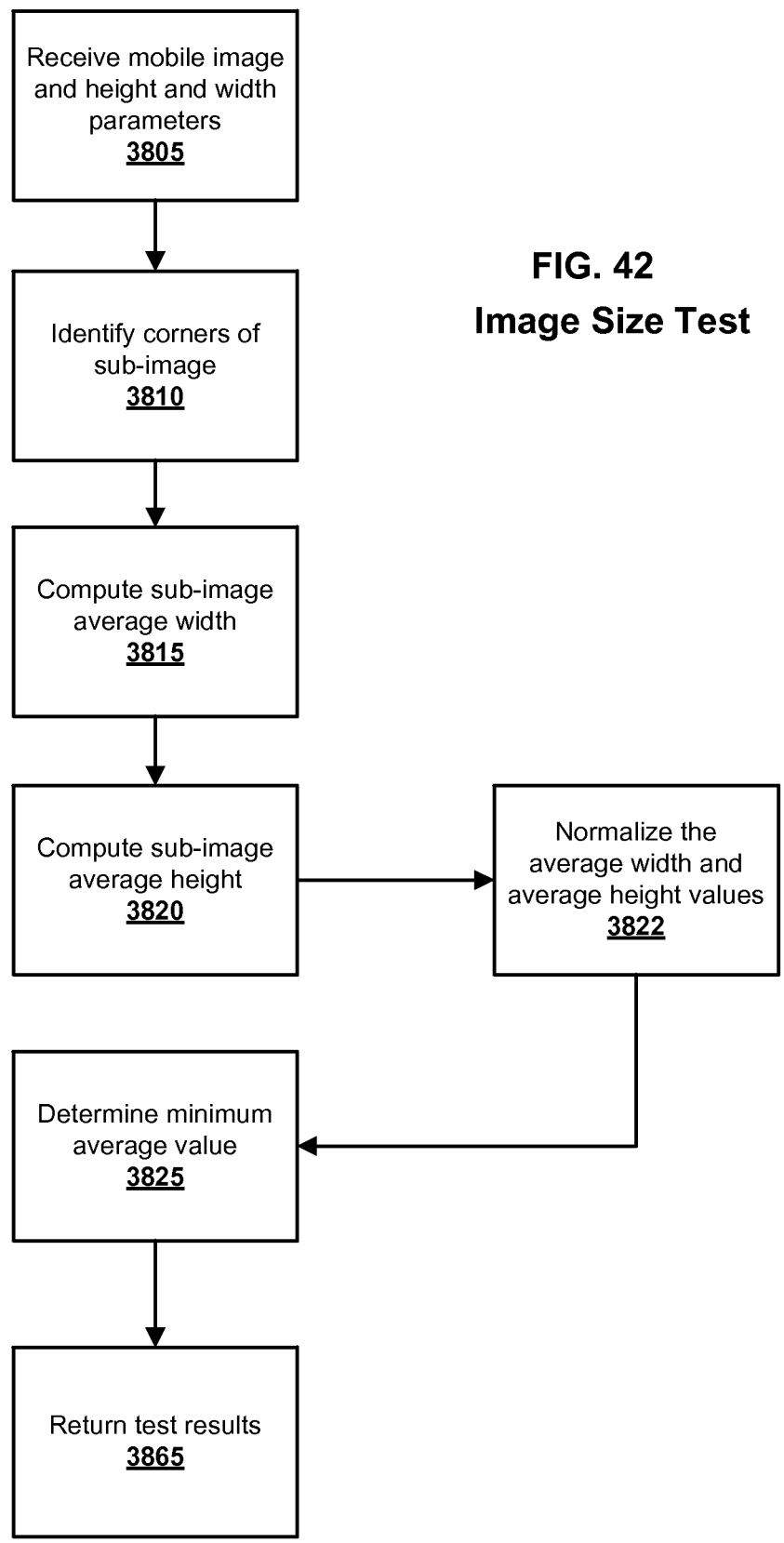
FIG. 42 is a flow diagram of a process that for performing an Image Size Test on a subimage according to an embodiment.

FIG. 42 is a flow diagram of a process that for performing an Image Size Test on a subimage according to an embodiment. The mobile image is received (step 3805). In an embodiment, the height and width of the mobile image can be determined by the preprocessing unit 2110. The corners of the document subimage are then identified in the mobile document image (step 3810). Various techniques can be used to identify the corners of the image, including the various techniques described above. In an embodiment, the preprocessing unit 2110 identifies the corners of the document subimage. In the method the corners of the subimage are denoted as follows: A represents the top-left corner, B represents the top-right corner of the subimage, C represents the bottom-right corner of the subimage, and D represents the bottom-left corner of the subimage.

A subimage average width is computed (step 3815). In an embodiment, the subimage average width can be calculated using the following formula:

Subimage average width as AveWidth=(|*AB*|+|*CD*|)/2, where

|PQ| represents the Euclidian distance from point P to point Q.

A subimage average height is computed (step 3820). In an embodiment, the subimage average height can be calculated using the following formula:

AveHeight=(|*BC*|+|*DA*|)/2

The average width and average height values are then normalized to fit the 0-1000 range used by the mobile IQA tests (step 3822). The following formulas can be used determine the normalize the average width and height:

NormAveWidth=1000*AveWidth/Width

NormAveHeight=1000*AveWidth/Height

A minimum average value is then determined for the subimage (step 3825).

According to an embodiment, the minimum average value is the smaller of the normalized average width and the normalized average height values. The minimum average value falls within the 0-1000 range used by the mobile IQA tests. The minimum average value will equal 1000 if the document subimage fills the entire mobile image.

The minimum average value is returned as the test result (step 3865). As described above, the test result value is provided to the test execution unit 2130 where the test result value can be compared to a threshold value associated with the test. If the test result value falls below the threshold associated with the test, detailed test result messages can be retrieved from the test result message data store 2136 and provided to the user to indicate why the test failed and what might be done to remedy the test. For example, the user may simply need to retake the image by positioning the camera closer to the document.

Code Line Test

The Code Line Test can be used to determine whether a high quality image of a remittance coupon front has been captured using the mobile device according to an embodiment. The Code Line Test can be used in conjunction with a Remittance Processing application to ensure that images of remittance coupon captures for processing with the Remittance Processing information are of a high enough quality to be processed so that the remittance can be electronically processed. Furthermore, if a mobile image fails the Code Line Test, the failure may be indicative of incorrect subimage detections and/or poor overall quality of the mobile image, and such an image should be rejected anyway.

Figure 43:
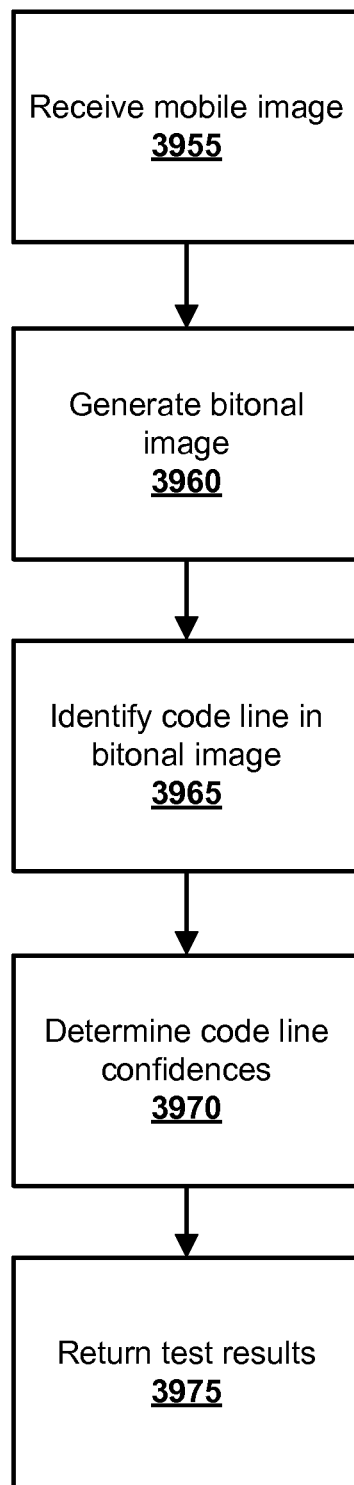
FIG. 43 is a flow chart of a method for executing a code line test according to an embodiment.

FIG. 43 is a flow chart of a method for executing a Code Line Test according to an embodiment. A mobile image of a remittance coupon is received (step 3955) and a bitonal image is generated from the mobile image (step 3960). In an embodiment, preprocessor 110 extracts the document subimage from the mobile image as described above, including preprocessing such as geometric correction. The extracted subimage can then be converted to a bitonal snippet by the preprocessor 110. The code line is then identified in the bitonal snippet (step 3965). According to an embodiment, a code line recognition engine is then applied to identify the code line and to compute character-level and overall confidence values for the image (step 3970). These confidences can then be normalized to the 0-1000 scale used by the mobile IQA tests where 1000 means high quality and 0 means poor code line quality. The confidence level is then returned (step 3975). As described above, the test result value is provided to the test execution unit 2130 where the test result value can be compared to a threshold value associated with the test. If the test result value falls below the threshold associated with the test, detailed test result messages can be retrieved from the test result message data store 136 and provided to the user to indicate why the test failed and what might be done to remedy the test. For example, the user may simply need to retake the image to adjust for geometrical or other factors, such as poor lighting or a shadowed document. In some instances, the user may not be able to correct the errors. For example, if the code line on the document is damaged or incomplete and the document will continue to fail the test even if the image were retaken.

Aspect Ratio Tests

The width of a remittance coupon is typically significantly longer than the height of the document. According to an embodiment, an aspect ratio test can be performed on a document subimage of a remittance coupon to determine whether the aspect ratio of the document in the image falls within a predetermined ranges of ratios of width to height. If the document image falls within the predetermined ranges of ratios, the image passes the test. An overall confidence value can be assigned to different ratio values or ranges of ratio values in order to determine whether the image should be rejected.

According to some embodiments, the mobile device can be used to capture an image of a check in addition to the remittance coupon. A second aspect ratio test is provided for two-sided documents, such as checks, where images of both sides of the document may be captured. According to some embodiments, a remittance coupon can also be a two-sided document and images of both sides of the document can be captured. The second aspect ratio test compares the aspect ratios of images that are purported to be of the front and back of a document to determine whether the user has captured images of the front and back of the same document according to an embodiment. The Aspect Ratio Test could be applied to various types two-sided or multi-page documents to determine whether images purported to be of different pages of the document have the same aspect ratio.

Figure 44:
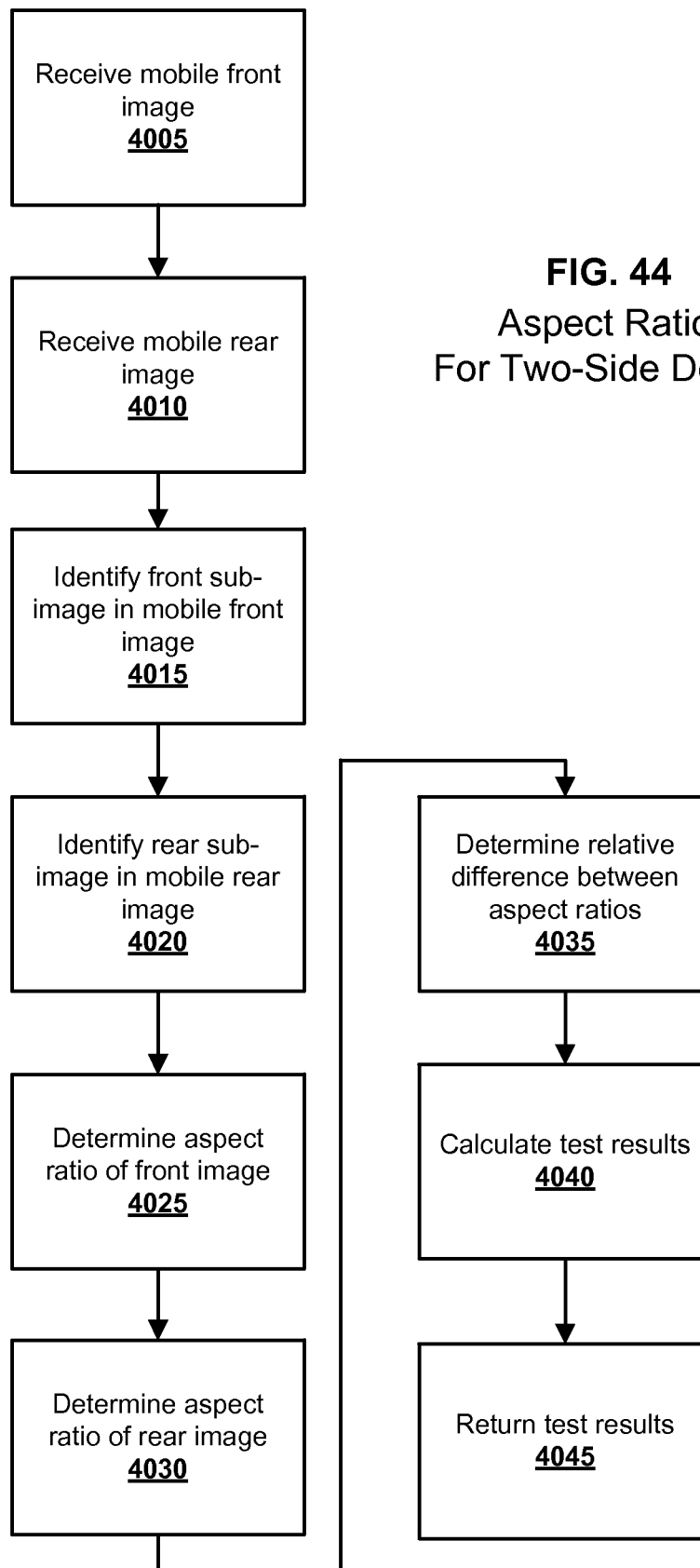
FIG. 44 illustrates a method for executing an Aspect Ratio Test according to an embodiment.

FIG. 44 illustrates a method for executing an Aspect Ratio Test for two-sided documents according to an embodiment. In the embodiment illustrated in FIG. 40, the test is directed to determining whether the images purported to be of the front and back side of a document have the same aspect ratio. However, the method could also be used to test whether two images purported to be from a multi-page and/or multi-sided document have the same aspect ratio.

A front mobile image is received (step 4005) and a rear mobile image is received (step 4010). The front mobile image is supposed to be of the front side of a document while the rear mobile image is supposed to be the back side of a document. If the images are really of opposite sides of the same document, the aspect ratio of the document subimages should match. Alternatively, images of two different pages of the same document may be provided for testing. If the images are really of pages of the same document, the aspect ratio of the document subimages should match.

The preprocessing unit 2110 can process the front mobile image to generate a front-side snippet (step 4015) and can also process the back side image to generate a back-side snippet (step 4020).

The aspect ratio of the front-side snippet is then calculated (step 4025). In an embodiment, the AspectRatioFront=Width/Height, where Width=the width of the front-side snippet and Height=the height of the front-side snippet.

The aspect ratio of the back-side snippet is then calculated (step 4030). In an embodiment, the AspectRatioBack=Width/Height, where Width=the width of the back-side snippet and Height=the height of the back-side snippet.

The relative difference between the aspect ratios of the front and rear snippets is then determined (step 4035).

According to an embodiment, the relative difference between the aspect ratios can be determined using the following formula:

RelDiff=1000*abs(AspectRatioFront−AspectRatioBack)/max(AspectRatioFront,AspectRatioBack)

A test result value is then calculated based on the relative difference between the aspect ratios (step 4040). According to an embodiment, the test value V can be computed using the formula V=1000−RelDiff.

The test results are then returned (step 4045). As described above, the test result value is provided to the test execution unit 2130 where the test result value can be compared to a threshold value associated with the test. If the test result value falls below the threshold associated with the test, detailed test result messages can be retrieved from the test result message data store 136 and provided to the user to indicate why the test failed and what might be done to remedy the test. For example, the user may have mixed up the front and back images from two different checks having two different aspect ratios. If the document image fails the test, the user can be prompted to verify that the images purported to be the front and back of the same document (or images of pages from the same document) really are from the same document.

Form Identification

Various embodiments of the present invention may utilize a novel technique of form identification in order to expeditiously identify key features of a captured mobile image. The form identification can be provided by a user, or it can be automatically determined by reading a captured mobile image. This captured mobile image may include any type of document including, without limitation: remittance coupons, employment forms, store receipts, checks, bills or sales invoices, business cards, medical and dental records, store coupons, educational information such as progress reports and report cards, birth and death certificates, insurance policies, legal documents, magazine and newspaper clippings, forms of personal identification such as passports and driver licenses, police records, real estate records, etc. In the form identification step, a template is identified that is associated with a document that has been captured in a mobile image. The template identifies the layout of information contained within the document. This layout information can be used to improve data capture accuracy because data should be in known locations on the document.

Form identification can be helpful in a number of different situations. If the layout of the document is known, capturing the data from known locations on the document can be more accurate than relying on a dynamic data capture technique to extract the data from the document. Additionally, according to some embodiments, the identification of a prerequisite minimum number of data fields associated with only one type of document can enable a faster lookup of data from other data fields as soon as the specific type of document has been identified.

Form identification can also be used for documents that lack keywords that could otherwise be used to identify key data on the document. For example, if a document does not include an "Account Number" label for an account number field, the dynamic data capture may misidentify the data in that field. Misidentification can become even more likely if multiple fields have similar formats. Form identification can also be used for documents having ambiguous data. For example, a document might include multiple fields that include data having a similar format. If a document includes multiple unlabeled fields having similar formats, dynamic data capture may be more likely to misidentify the data. However, if the layout of the document is known, the template information can be used to extract data from known positions in the document image.

According to some embodiments, form identification can also be used for documents having a non-OCR friendly layout. For example, a document may use fonts where identifying keywords and/or form data is printed using a non-OCR friendly font. Form identification can also be used to improve the chance of correctly capturing data when a poor quality image is presented. A poor quality image of a document can make it difficult to locate and/or read data.

Figure 45:
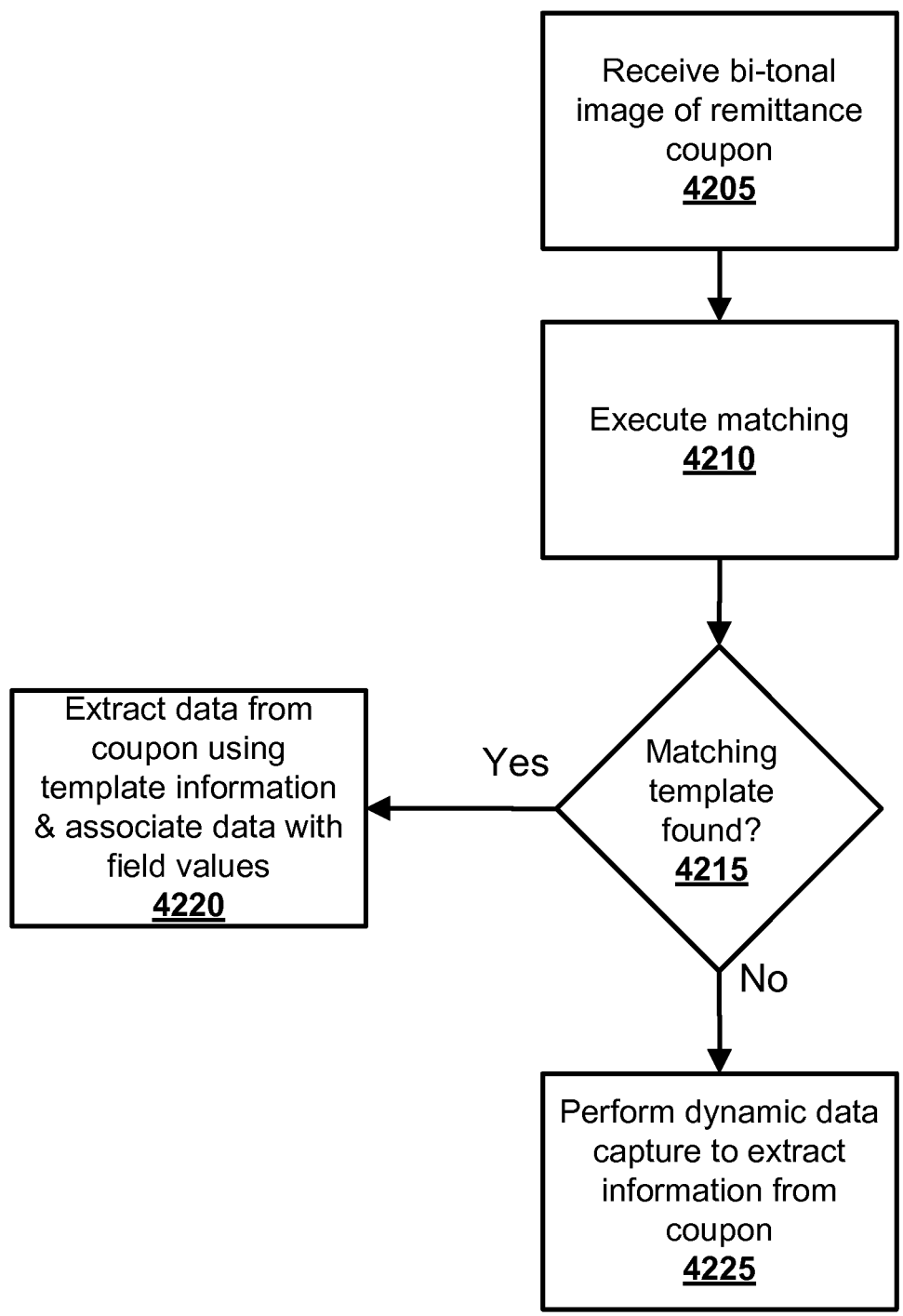
FIG. 45 is a flow chart of a method for processing an image using form identification according to an embodiment.

FIG. 45 is a flow chart of a method for processing an image using form identification according to an embodiment. At step 4205, a binarized/bi-tonal document image is received. Various techniques for creating a bi-tonal subimage from a mobile image are provided above. For example, step 1225 of FIG. 12 describes binarization of a document subimage. FIG. 14 also illustrates a method of binarization that can be used to generate a bi-tonal image according to one embodiment of the present invention.

A matching algorithm is executed on the bi-tonal image of the document in an attempt to find a matching template (step 4210). According to an embodiment, one or more computing devices can include a template data store that can be used to store templates of the layouts of various types of documents. Various matching techniques can be used to match a template to a document image. For example, optical character recognition can be used to identify and read text content from the image. The types of data identified and the positions of the data on the document can be used to identify a matching template. According to another embodiment, a document can include a unique symbol or identifier that can be matched to a particular document template. In yet other embodiments, the image of the document can be processed to identify "landmarks" on the image that may correspond to labels and/or data. In some embodiments, these landmarks can include, but are not limited to: positions of horizontal and/or vertical lines on the document, the position and/or size of boxes and/or frames on the document, and/or the location of pre-printed text. The position of these landmarks on the document may be used to identify a template from the plurality of templates in the template data store. According to some embodiments, a cross-correlation matching technique can be used to match a template to an image of a document. In some embodiments, the positions of frames/boxes found on image and/or other such landmarks, can be cross-correlated with landmark information associated a template to compute the matching confidence score. If the confidence score exceeds a predetermined threshold, the template is considered to be a match and can be selected for use in extracting information from the mobile image.

A determination is made whether a matching template has been found (step 4215). If no matching template is found, a dynamic data capture can be performed on the image of the document (step 4225). Dynamic data capture is described in detail below and an example method for dynamic data capture is illustrated in the flow chart of FIG. 46.

If a matching template is found, data can be extracted from the image of the document using the template (step 4220). The template can provide the location of various data within the document, such as the document's author(s), the document's publication date, the names of any corporate, governmental, or educational entities associated with the document, an amount due, an account holder name, an account number, a payment due date, etc. In some embodiments, various OCR techniques can be used to read text content from the locations specified by the template. Since the location of various data elements is known, ambiguities regarding the type of data found can be eliminated. That is, use of the template enables the system to distinguish among data elements which have a similar data type.

Dynamic Data Capture

Figure 46:
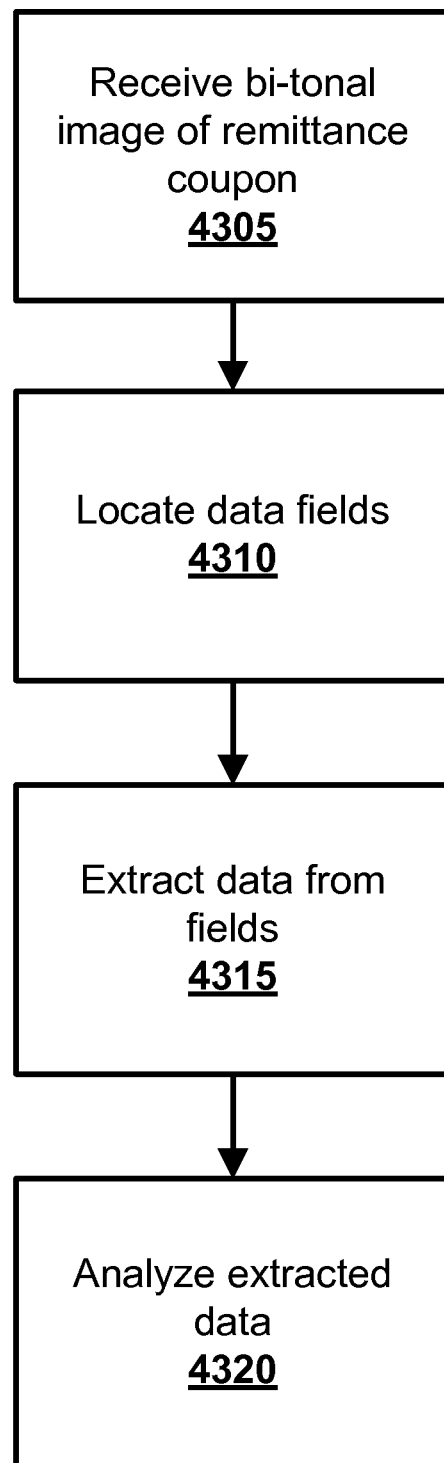
FIG. 46 is a flow chart of a method for processing an image using dynamic data capture according to an embodiment.

FIG. 46 is a flow chart of a dynamic data capture method for extracting data from an image according to an embodiment. The dynamic data capture method illustrated in FIG. 46 can be used if a form ID for identifying a particular format of a document is not available. The method illustrated in FIG. 46 can also be used if the form ID does not match any of the templates stored in the template data store. The method begins with receiving a binarized/bi-tonal document image (step 4305). Various optical character recognition techniques can then be used to locate and read fields from the bi-tonal image (step 4310). Some example OCR techniques are described below. Once data fields have been located, the data can be extracted from the bi-tonal image (step 4315). In some embodiments, steps 4310 and 4315 can be combined into a single step where the field data is located and the data extracted in a combined OCR step. Once the data has been extracted from the image, the data can be analyzed to identify what data has been extracted (step 4320). The data can also be analyzed to determine whether any additional data is required in order to be able to process the image.

According to an embodiment, a keyword-based detection technique can be used to locate and read the data from the bi-tonal image in steps 4310 and 4315 of the method of FIG. 46. The method uses a set of field-specific keywords to locate fields of interest in the bitonal image. For example, if the captured image is an image of a remittance coupon, the keywords "Account Number," "Account #," "Account No.," "Customer Number," and/or other variations can be used to identify the customer's account number. According to an embodiment, text located proximate to the keyword can be associated with the keyword. For example, text located within a predetermined distance to the right of or below an "Account Number" keyword may be identified and extracted from the image using OCR and the text found in this location can then be treated as the account number. According to an embodiment, the distance and directions in relation to the keyword in which the field data can be located can be configured based on the various parameters, such as locale or language. The position of the keyword in relation to field that includes the data associated with the keyword may vary based on the language being used, e.g. written right to left versus left to right.

According to an embodiment, a format-based detection technique can be used to locate and read the data from the bi-tonal image in steps 4310 and 4315. For example, an OCR technique can be used to recognize text in the document image. A regular expression mechanism can then be applied to the text extracted from the bitonal image. A regular expression can be used to formalize the format description for a particular field, such as "contains 7-12 digits," "may start with 1 or 2 uppercase letters," or "contains the letter "U" in the second position." According to an embodiment, multiple regular expressions may be associated with a particular field, such as an account number, in order to increase the likelihood of a correct match.

According to yet another embodiment, a combination of keyword-based and format-based matching can be used to identify and extract field data from the bi-tonal image (steps 4310 and 4315). This approach can be particularly effective where multiple fields of the same or similar format are included within the image. A combination of keyword-based and format-based matching can be used to identify field data can be used to disambiguate the data extracted from the bi-tonal image.

According to an embodiment, a code-line validation technique can be used to locate and read the data from the bi-tonal image of in steps 4310 and 4315. One or more fields may be embedded into a code-line. In some embodiments, the code-line characters may be cross-checked against fields recognized in other parts of the document. In the event that a particular field is different from a known corresponding value in the code line, the value in the code line may be selected over the field value due to the relative difference in the reliabilities of reading the code line versus reading the field value.

According to an embodiment, a cross-validation technique can be used where multiple bi-tonal images of the same document have been captured, and one or more OCR techniques are applied the each of the bi-tonal images (such as by any of the techniques described above). The results from the one or more OCR technique from one bi-tonal image can be compared to the results of OCR techniques applied one or more other bitonal images in order to cross-validate the field data extracted from the images. If conflicting results are found, a set of results having a higher confidence value can be selected to be used for document image processing.

Recurring Payment Scheduling

According to various embodiments, a user of the mobile device application can set up one or more recurring payment schedules. A recurring payment schedule may have a variety of advantages over a series of single payments, including: i.) utilizing persistent data in order to make the process of paying a bill more expeditious for the user (i.e., less input may be required from the user before each bill is submitted), ii.) enabling a fast lookup of a remittance coupon template associated with a specified payee (thereby decreasing search time); and iii.) enabling the remittance application to send one or more payment reminders to the user so as to safeguard against a payment default.

Figure 47:
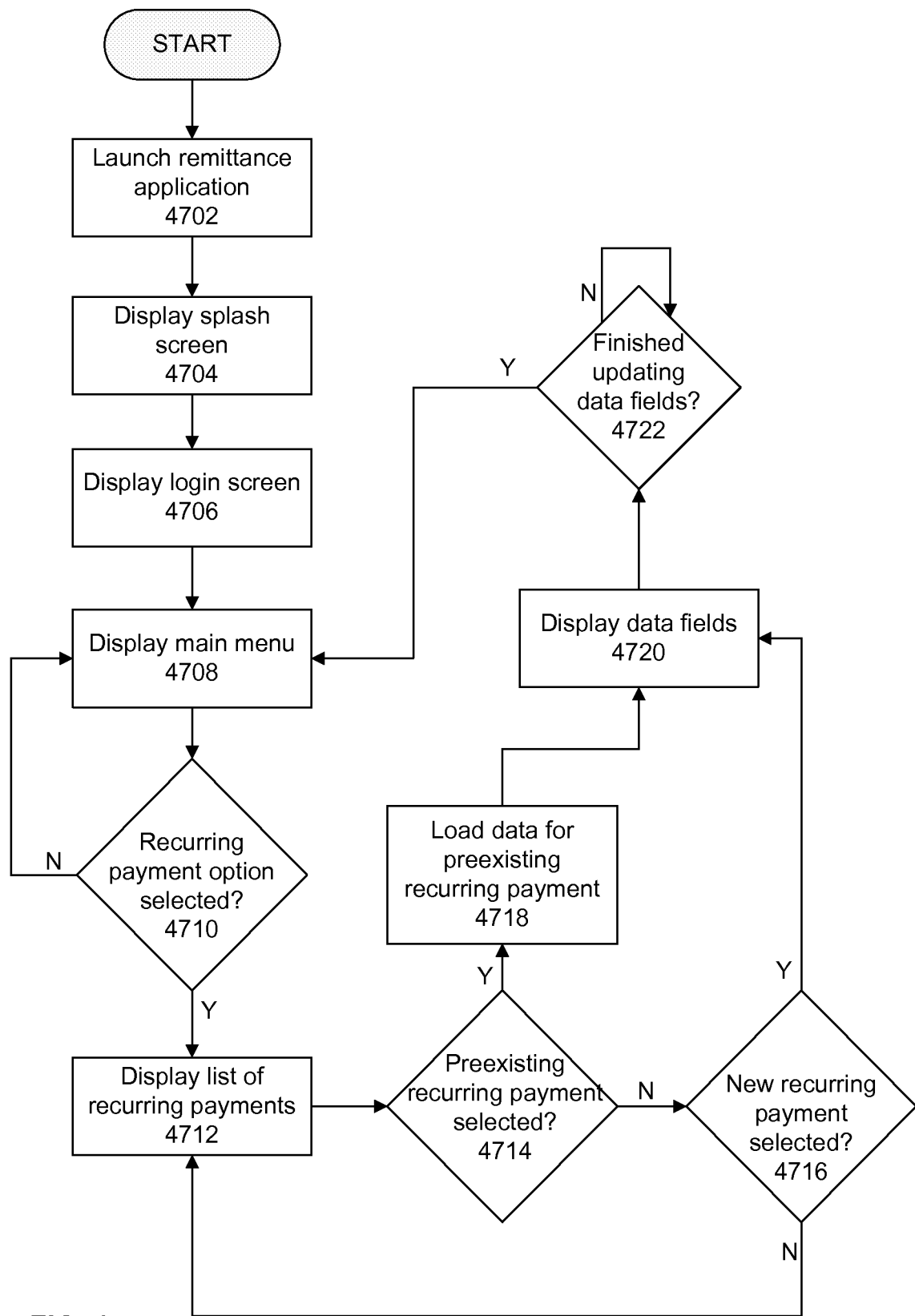
FIG. 47 is a flow diagram illustrating an exemplary method of configuring a recurring payment schedule according to an embodiment.

FIG. 47 is a flow diagram illustrating an exemplary method for configuring a recurring bill payment schedule according to one embodiment. At block 4702, a user launches a remittance application. In some embodiments, the remittance application is resident within the mobile device (see FIG. 1). In other embodiments, the remittance application is resident within a remote computing device, such as a remote server (see FIG. 1). Once the remittance application is launched, a splash screen may appear (block 4704) indicating the name and/or software version of the remittance application.

At block 4706, a login screen can then be displayed, prompting the user to input one or more security credentials (e.g., username and a password). In some embodiments, the security credentials of all users of the remittance application may be encrypted and stored locally, for example, within a non-volatile storage device associated with the mobile device 350. In other embodiments, the security credentials may be encrypted and stored in a non-volatile device present at a remote location.

Once the credentials have been validated, a main menu is then displayed (block 4708). The main menu may list a number of functions associated with the remittance application, including the option to "pay a bill" or to "view the last bill paid." An option to "configure recurring payments" is also presented to the user as one of the options, and the application will listen for the user's selection of this option at decision block 4710.

At block 4712, a listing of all recurring payment schedules associated with the user is then displayed. For example, if the user had previously set up a recurring payment with Time Warner Cable and San Diego Gas and Electric, these two entries will be selectable within this listing. However, if no entries had been previously entered and saved by the user, a message such as: "No recurring payments have been scheduled" may appear in the display window in the alternative. An additional option to "set up a new recurring payment" is also presented to the user, for example, at the bottom of the display screen.

At blocks 4714 and 4716, the user will decide whether to update an existing recurring bill payment or to otherwise set up a new recurring payment. In the event that the user selected a preexisting recurring payment entry, previously stored data regarding this entry will be loaded at block 4718 (such as the name of the recurring payment entry, the payor, the payee, the selected payment method, a bank account or check routing number, a credit card number, and any other preferred payment options). Otherwise, in the event that the user had selected to set up a new recurring payment, these data fields may be blank by default.

At block 4720, a sub-menu is then displayed including various data fields associated with this recurring payment entry. In some embodiments, the user may have an option to auto-populate at least some of these fields by instructing the system to extract data from a bill that has already been paid. Other fields can be modified, for example, by a keyboard, touchpad, mouse, or other such input device.

At block 4722, the user may then update these fields accordingly. In some embodiments, a "save" or "apply changes" option enables the user to save his input after the recurring payment entry has been updated. In other embodiments, the remittance application automatically saves the recurring payment entry after any data field has been modified by the user. Also, according to some embodiments, the remittance application may prevent the user from saving changes to the recurring bill payment entry if a certain minimum number of prerequisite data fields have not been filled out, or otherwise, if the data entered within any of these fields is of an invalid format.

Figure 48:
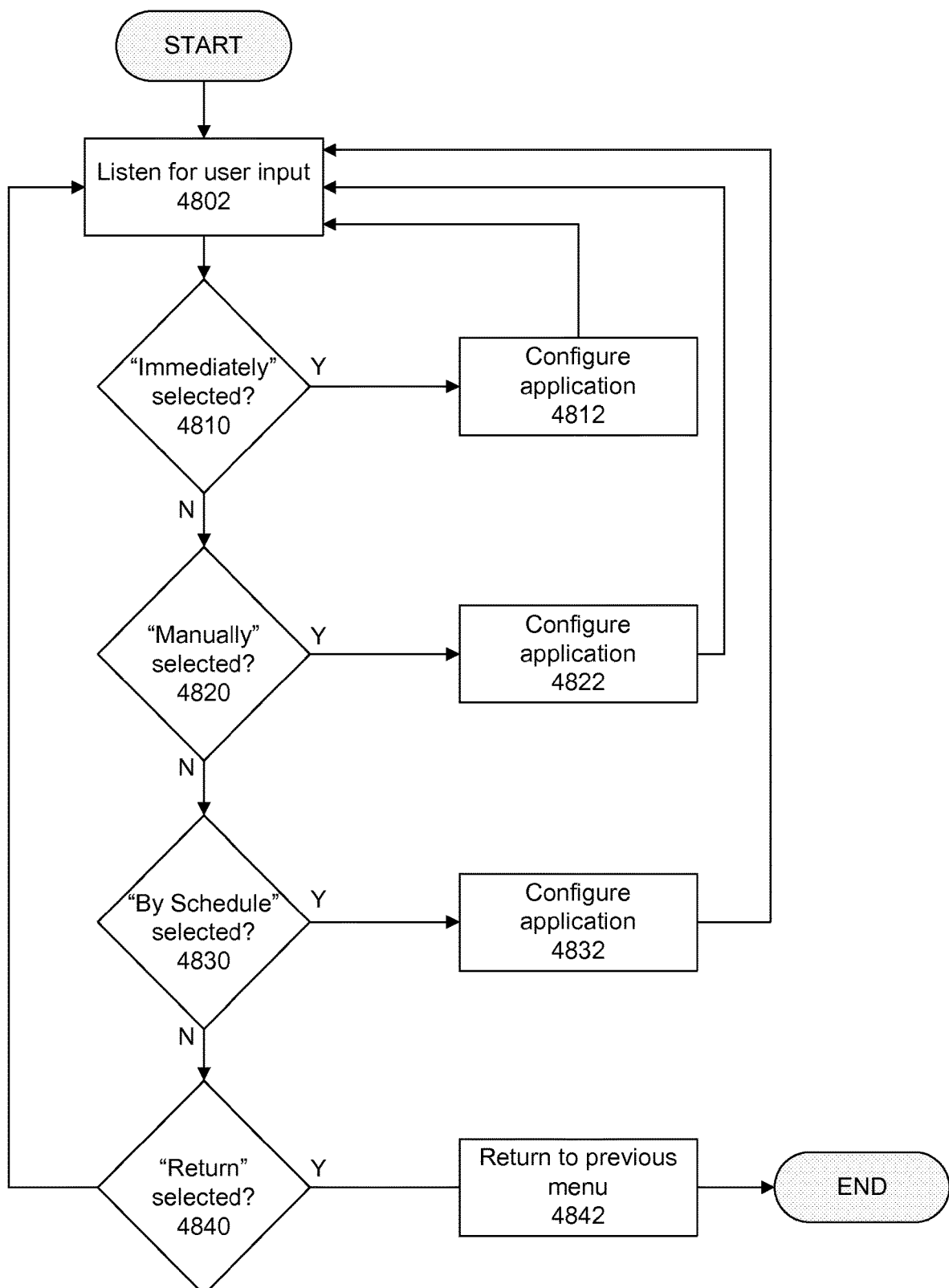
FIG. 48 is a flow diagram illustrating an exemplary method of selecting a specific scheduling preference according to an embodiment.

According to some embodiments, the user may be presented the option of how he wishes to schedule recurring payments with the payee. FIG. 48 is a flow diagram illustrating this process. At block 4802, the user may be prompted to select among the options of: "Immediately," "Manually," "By Schedule," or "Return to Previous Menu." The remittance application may then check which option was selected at respective decision blocks 4810, 4820, 4830, and 4840.

If the user selected to schedule bill payments with the payee "Immediately," then at block 4812, the remittance application configures itself to attempt to make a payment soon after receiving an image of a check and/or remittance coupon from the user. The document images can be preprocessed by the mobile device 350 and/or processed by the remote server in any of the manners already described above. After the images have been successfully processed, one or more of the image quality assurance tests already described can then be run in real-time in order to ensure that the user has taken an image with a quality sufficient to process a payment.

If the user selected to schedule bill payments with the payee "Manually," then at block 4822, the remittance application configures itself to attempt to make a payment only upon a specific input from the user. This input might be, for example, a "Pay Bill" button located in one or more menus or sub-menus of the remittance application. Images of any remittance coupons/checks received from the user may then be persistently stored within a non-volatile storage device until the user acknowledges he is ready to pay a certain bill by providing the specific input required by the remittance application.

If the user selected to schedule payments with the payee "By Schedule," then at block 4832, a submenu may appear prompting the user to specify certain scheduling options. In some embodiments, the user may specify how many days he wishes the application to submit the payment before (or after) a certain payment due date. For example, if a utility bill is always due the $15^{th}$ of every month, the user may elect to have these recurring bills paid on the $10^{th}$ of every month. Images of any remittance coupons/checks received from the user may then be persistently stored within a non-volatile storage device until the scheduled date of payment. In some embodiments, any preprocessing, processing, or image quality and assurance tests are run on the document images soon after they are received from the user. This enables the user to detect and correct any defects with the image documents well before the scheduled date of payment.

Irrespective of the option selected, the user will be returned to scheduling menu after providing the input from the recurring payment sub-menu. If the user selected to "Return to Previous Menu," then at block 4842 the user will be directed to the previous menu and the process will end.

According to some embodiments, the user may be presented the option of whether he wishes to have the remittance application send him one or more reminders about upcoming payment due dates. The reminders may thus serve to assist the user in preventing a payment default due to inattention, inadvertence, or neglect.

Figure 49:
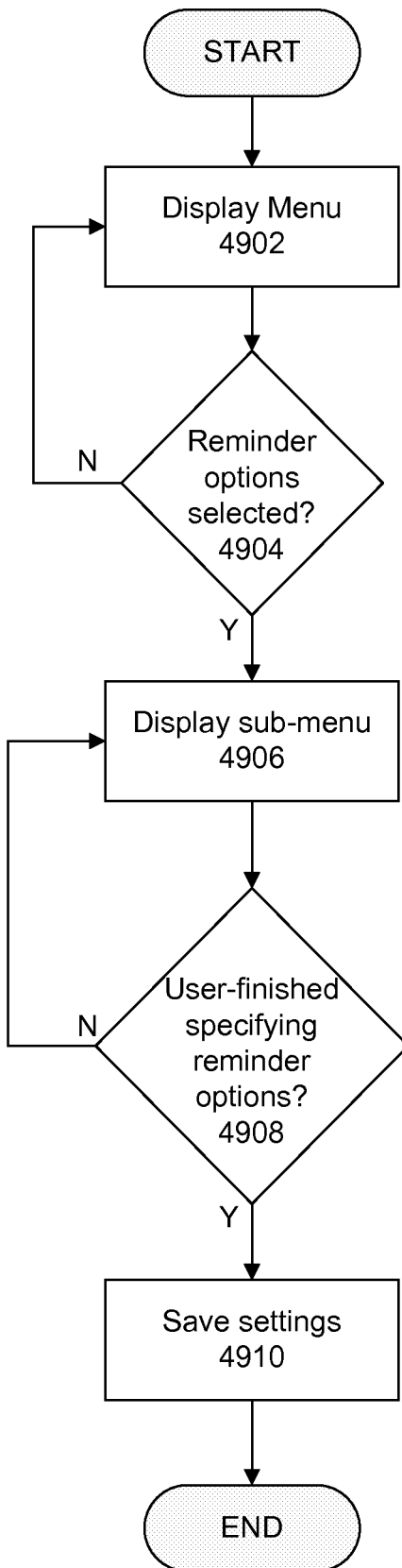
FIG. 49 is a flow diagram illustrating an exemplary method of enabling a user to set one or more reminders associated with a recurring bill payment according to an embodiment.

FIG. 49 is a flow diagram illustrating an exemplary process of enabling a user to set one or more reminders associated with a recurring bill payment according to one embodiment of the present invention. At block 4902, a menu is displayed to the user, the menu including an option (such as a hyperlink or selectable button) for setting one or more payment reminders associated with a recurring payment schedule.

Once this option is selected at block 4904, then at block 4906, a sub-menu may then be displayed to the user. In some embodiments, the sub-menu presents the user with a number of configurable options regarding payment reminders. For example, the user may decide whether to set up a single reminder or a series of periodic reminders. Additionally, the user may specify when the reminders are to be sent (for example, on a regularly occurring day each month, such as on the $5^{th}$, or instead on a day that is always measured relative to the payment due date, such as 7 days before the bill is due). In some embodiments, the user may also specify how frequently the reminders are to be sent (e.g., daily, every third day, weekly, bi-weekly, etc.).

Additionally, according to some embodiments, the user may specify the type of reminders to be provided to the user by the remittance application. Any number of mechanisms for informing the user about an upcoming payment may be used according to embodiments of the present invention (including, but not limited to: e-mail, popup windows, SMS messages, "push"/PAP messaging, calendar alerts, scheduled printing, and phone messages/voicemail). Once the user has finished inputting preferred options at block 4908, the options are saved at block 4910, and the process then ends.

Subsequently, the remittance application can provide payment reminders to the user in any manner or manner(s) that the user has specified.

Exemplary Hardware Embodiments

Figure 50:
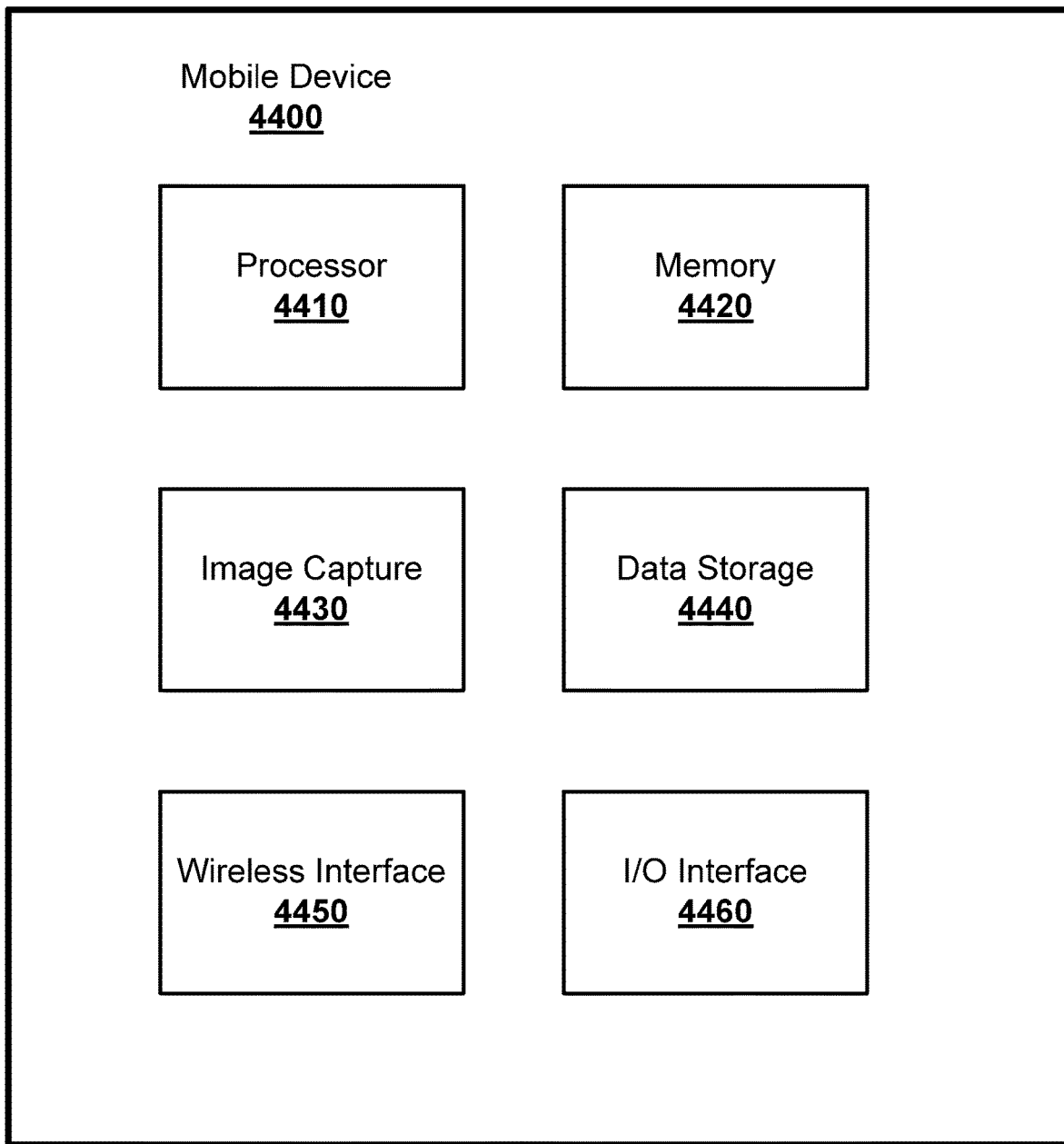
FIG. 50 is a block diagram of various functional elements of a mobile device that can be used with the various systems and methods described herein according to an embodiment.

FIG. 50 is an exemplary embodiment of a mobile device 4400 according to an embodiment. Mobile device 4400 can be used to implement the mobile device 340 of FIG. 1. Mobile device 4200 includes a processor 4410. The processor 4410 can be a microprocessor or the like that is configurable to execute program instructions stored in the memory 4420 and/or the data storage 4440. The memory 4420 is a computer-readable memory that can be used to store data and or computer program instructions that can be executed by the processor 4410. According to an embodiment, the memory 4420 can comprise volatile memory, such as RAM and/or persistent memory, such as flash memory. The data storage 4440 is a computer readable storage medium that can be used to store data and or computer program instructions. The data storage 4440 can be a hard drive, flash memory, a SD card, and/or other types of data storage.

The mobile device 4400 also includes an image capture component 4430, such as a digital camera. According to some embodiments, the mobile device 4400 is a mobile phone, a smart phone, or a PDA, and the image capture component 4430 is an integrated digital camera that can include various features, such as auto-focus and/or optical and/or digital zoom. In an embodiment, the image capture component 4430 can capture image data and store the data in memory 4220 and/or data storage 4440 of the mobile device 4400.

Wireless interface 4450 of the mobile device can be used to send and/or receive data across a wireless network. For example, the wireless network can be a wireless LAN, a mobile phone carrier's network, and/or other types of wireless network.

I/O interface 4460 can also be included in the mobile device to allow the mobile device to exchange data with peripherals such as a personal computer system. For example, the mobile device might include a USB interface that allows the mobile to be connected to USB port of a personal computer system in order to transfers information such as contact information to and from the mobile device and/or to transfer image data captured by the image capture component 4430 to the personal computer system.

As used herein, the term unit might describe a given unit of functionality that can be performed in accordance with one or more embodiments of the present invention. As used herein, a unit might be implemented utilizing any form of hardware, software, or a combination thereof. For example, one or more processors, controllers, ASICs, PLAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of processes used in conjunction with the operations described herein are implemented in whole or in part using software, in one embodiment, these software elements can be implemented to operate with a computing or processing module capable of carrying out the functionality described with respect thereto. One such example-computing module is shown in FIG. 51, which illustrates a computer system that can be used to implement mobile remittance server according to an embodiment.

Various embodiments are described in terms of this example-computing module 1900. After reading this description, it will become apparent to a person skilled in the relevant art how to implement the invention using other computing modules or architectures.

Figure 51:
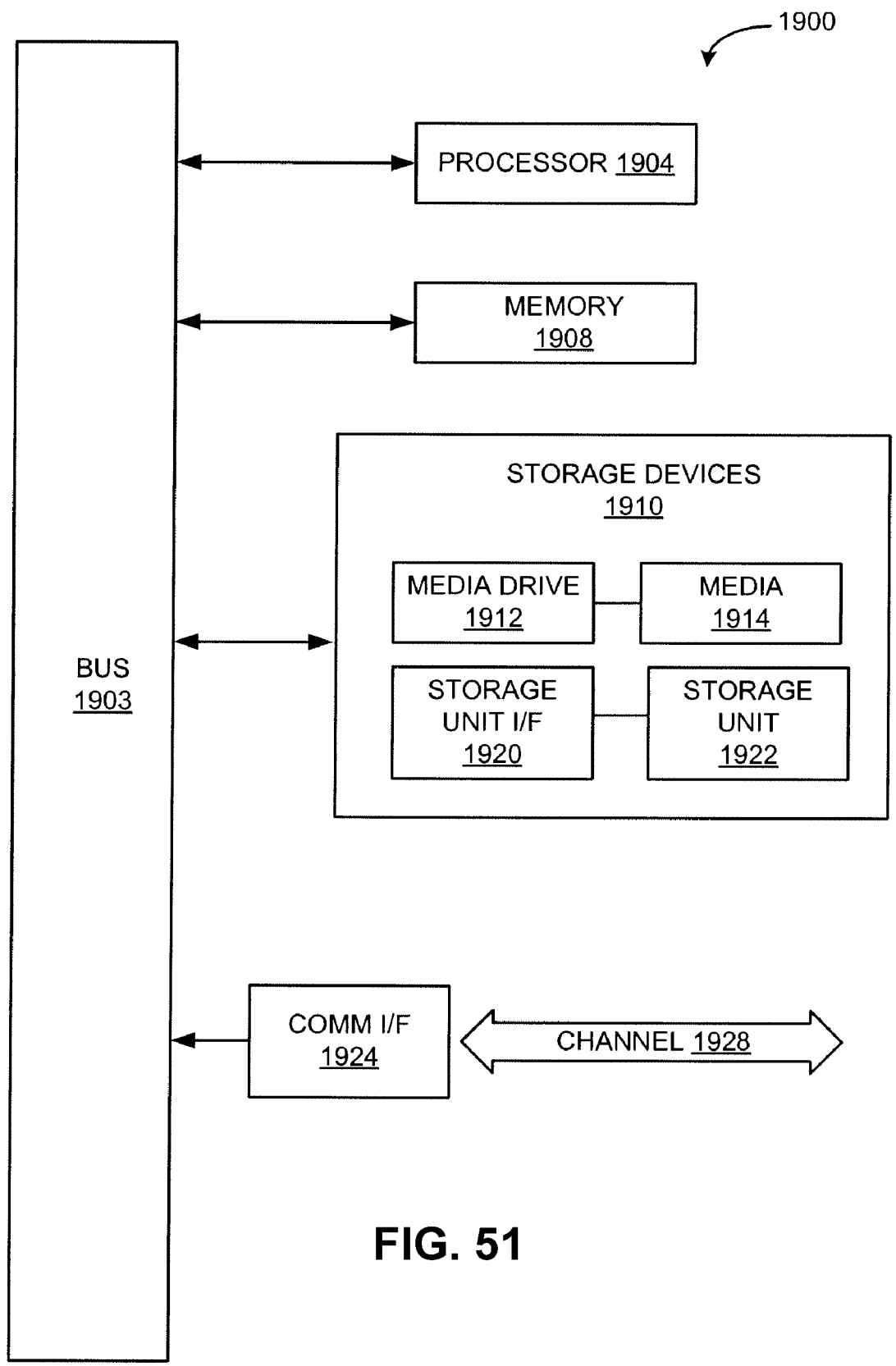
FIG. 51 is a block diagram of functional elements of a computer system that can be used to implement the mobile device and/or the servers described in the systems and methods disclosed herein.

Referring now to FIG. 51, computing module 1900 may represent, for example, computing or processing capabilities found within desktop, laptop and notebook computers; mainframes, supercomputers, workstations or servers; or any other type of special-purpose or general-purpose computing devices as may be desirable or appropriate for a given application or environment. Computing module 1900 might also represent computing capabilities embedded within or otherwise available to a given device. For example, a computing module might be found in other electronic devices. Computing module 1900 might include, for example, one or more processors or processing devices, such as a processor 1904. Processor 1904 might be implemented using a general-purpose or special-purpose processing engine such as, for example, a microprocessor, controller, or other control logic.

Computing module 1900 might also include one or more memory modules, referred to as main memory 1908. For example, random access memory (RAM) or other dynamic memory might be used for storing information and instructions to be executed by processor 1904. Main memory 1908 might also be used for storing temporary variables or other intermediate information during execution of instructions by processor 1904. Computing module 1900 might likewise include a read only memory ("ROM") or other static storage device coupled to bus 1902 for storing static information and instructions for processor 1904.

The computing module 1900 might also include one or more various forms of information storage mechanism 1910, which might include, for example, a media drive 1912 and a storage unit interface 1920. The media drive 1912 might include a drive or other mechanism to support fixed or removable storage media 1914. For example, a hard disk drive, a floppy disk drive, a magnetic tape drive, an optical disk drive, a CD or DVD drive (R or RW), or other removable or fixed media drive. Accordingly, storage media 1914 might include, for example, a hard disk, a floppy disk, magnetic tape, cartridge, optical disk, a CD or DVD, or other fixed or removable medium that is read by, written to or accessed by media drive 1912. As these examples illustrate, the storage media 1914 can include a computer usable storage medium having stored therein particular computer software or data.

In alternative embodiments, information storage mechanism 1910 might include other similar instrumentalities for allowing computer programs or other instructions or data to be loaded into computing module 1900. Such instrumentalities might include, for example, a fixed or removable storage unit 1922 and an interface 1920. Examples of such storage units 1922 and interfaces 1920 can include a program cartridge and cartridge interface, a removable memory (for example, a flash memory or other removable memory module) and memory slot, a PCMCIA slot and card, and other fixed or removable storage units 1922 and interfaces 1920 that allow software and data to be transferred from the storage unit 1922 to computing module 1900.

Computing module 1900 might also include a communications interface 1924. Communications interface 1924 might be used to allow software and data to be transferred between computing module 1900 and external devices. Examples of communications interface 1924 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1924 might typically be carried on signals, which can be electronic, electromagnetic (which includes optical) or other signals capable of being exchanged by a given communications interface 1924. These signals might be provided to communications interface 1924 via a channel 1928. This channel 1928 might carry signals and might be implemented using a wired or wireless communication medium. These signals can deliver the software and data from memory or other storage medium in one computing system to memory or other storage medium in computing system 1900. Some examples of a channel might include a phone line, a cellular link, an RF link, an optical link, a network interface, a local or wide area network, and other wired or wireless communications channels.

Computing module 1900 might also include a communications interface 1924. Communications interface 1924 might be used to allow software and data to be transferred between computing module 1900 and external devices. Examples of communications interface 1924 might include a modem or softmodem, a network interface (such as an Ethernet, network interface card, WiMAX, 802.XX or other interface), a communications port (such as for example, a USB port, IR port, RS232 port, Bluetooth interface, or other port), or other communications interface. Software and data transferred via communications interface 1924 might typically be carried on signals, which can be electronic, electromagnetic, optical or other signals capable of being exchanged by a given communications interface 1924. These signals might be provided to communications interface 1924 via a channel 1928. This channel 1928 might carry signals and might be implemented using a wired or wireless medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to physical storage media such as, for example, memory 1908, storage unit 1920, and media 1914. These and other various forms of computer program media or computer usable media may be involved in storing one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1900 to perform features or functions of the present invention as discussed herein.

While various embodiments of the present invention have been described above, it should be understood that they have been presented by way of example only, and not of limitation. The breadth and scope of the present invention should not be limited by any of the above-described exemplary embodiments. Where this document refers to technologies that would be apparent or known to one of ordinary skill in the art, such technologies encompass those apparent or known to the skilled artisan now or at any time in the future. In addition, the invention is not restricted to the illustrated example architectures or configurations, but the desired features can be implemented using a variety of alternative architectures and configurations. As will become apparent to one of ordinary skill in the art after reading this document, the illustrated embodiments and their various alternatives can be implemented without confinement to the illustrated example. One of ordinary skill in the art would also understand how alternative functional, logical or physical partitioning and configurations could be utilized to implement the desired features of the present invention.

Furthermore, although items, elements or components of the invention may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

What is claimed is:

1. A computer-implemented method of processing an image of a driver's license in order to verify identity in relation to a transaction, comprising:
   presenting through a user interface of a mobile device a menu related to the transaction;
   receiving via the user interface, a selection of an option related to the transaction;
   receiving an image of one or more documents or objects captured by a camera included in the mobile device;
   extract information from the images for use in the transaction;
   receiving an image of a driver's license captured by a mobile device;
   cropping the image of the driver's license to produce a cropped image of the driver's license, wherein cropping the image of the driver's license includes using a rounded corner detection test;
   determining whether the document is a driver's license based on whether one or more rounded corners are identified when cropping the image of the driver's license using the rounded corner detection test, wherein the rounded corner detection test comprises approximating connected points of edge pixels of the cropped image with a spline and estimating a curvature of the spline;
   when the document is determined to be a driver's license, identifying a layout of the driver's license,
      binarizing the cropped image to produce a binarized image,
      outputting the binarized image of the driver's license,
      performing an optical character recognition on the binarized image to extract text from the driver's license, and
      verifying the identity of the user in relation to the transaction, based on text extracted from the binarized image.

2. The method of claim 1, further comprising cropping the image of the driver's license through a rectangular shape detection test.

3. The method of claim 1, further comprising identifying the document in the image of the driver's license by performing the rounded corner detection test to identify at least one rounded corner of the driver's license.

4. The method of claim 1, wherein cropping the image of the driver's license around the driver's license further comprises determining coordinates of four corners of the driver's license based on results of: a rectangular shape detection test; a feature matching test; and the rounded corner detection test.

5. The method of claim 1, if the image is determined to be of a driver's license, the method further comprises determining an aspect ratio of the driver's license and comparing the aspect ratio of the driver's license to at least one stored aspect ratio of a driver's license.

6. The method of claim 1, wherein binarizing the cropped image includes identifying a photo area from an array of vertical contours and an array of horizontal contours and removing the photo area on the driver's license prior to binarizing the cropped image.

* * * * *